US012579109B2

(12) United States Patent
Kashi Visvanathan et al.

(10) Patent No.: US 12,579,109 B2
(45) Date of Patent: Mar. 17, 2026

(54) TECHNIQUES FOR MAINTAINING DATA CONSISTENCY DURING DISASTER RECOVERY

(71) Applicant: Oracle International Corporation, Redwood Shores, CA (US)

(72) Inventors: Satish Kumar Kashi Visvanathan, San Jose, CA (US); Viggnesh Venugopal, Santa Clara, CA (US); Victor Vladimir Golosovker, Union City, CA (US); Ravi Lingappa Shamanna, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/304,226

(22) Filed: Apr. 20, 2023

(65) Prior Publication Data

US 2023/0409442 A1 Dec. 21, 2023

Related U.S. Application Data

(60) Provisional application No. 63/378,486, filed on Oct. 5, 2022, provisional application No. 63/412,243, filed
(Continued)

(51) Int. Cl.
*G06F 11/00* (2006.01)
*G06F 9/50* (2006.01)
(Continued)

(52) U.S. Cl.
CPC .......... *G06F 11/1451* (2013.01); *G06F 9/505* (2013.01); *G06F 11/1417* (2013.01);
(Continued)

(58) Field of Classification Search
None
See application file for complete search history.

(56) References Cited

U.S. PATENT DOCUMENTS

| | | | |
|---|---|---|---|
| 5,806,075 | A | 9/1998 | Jain et al. |
| 6,615,333 | B1 | 9/2003 | Hoogerbrugge et al. |
| | | (Continued) | |

FOREIGN PATENT DOCUMENTS

| | | |
|---|---|---|
| CA | 2954888 A1 | 1/2007 |
| CN | 105245328 A | 5/2013 |
| | (Continued) | |

OTHER PUBLICATIONS

Google Scholar/Patents search—text refined (Year: 2024).*
(Continued)

*Primary Examiner* — Christopher S McCarthy
(74) *Attorney, Agent, or Firm* — Kilpatrick Townsend & Stockton LLP

(57) ABSTRACT

Techniques are described for maintaining data consistency when failure events occur during file storage replications between file systems in different cloud infrastructure regions. In certain embodiments, two generation numbers (or different identifications) are assigned to two groups of processed B-tree key-value pairs, one before and one after a failure event, within a key range. In some embodiments, the two generation numbers are assigned to a group of B-tree key-value pairs processed by a failed thread and another group of B-tree key-value pairs processed by a substitute thread taking over the failed thread to avoid potential data corruption.

17 Claims, 25 Drawing Sheets

Related U.S. Application Data on Sep. 30, 2022, provisional application No. 63/357,526, filed on Jun. 30, 2022, provisional application No. 63/352,992, filed on Jun. 16, 2022.

(51) Int. Cl.

| | |
|---|---|
| *G06F 11/14* | (2006.01) |
| *G06F 11/1446* | (2026.01) |
| *G06F 11/20* | (2006.01) |
| *G06F 16/11* | (2019.01) |
| *G06F 16/174* | (2019.01) |
| *G06F 16/178* | (2019.01) |
| *G06F 16/182* | (2019.01) |
| *G06F 16/185* | (2019.01) |
| *G06F 16/23* | (2019.01) |
| *G06F 16/27* | (2019.01) |
| *G06F 21/60* | (2013.01) |
| *G06F 21/62* | (2013.01) |
| *H04L 9/08* | (2006.01) |
| *H04L 9/32* | (2006.01) |
| *G06F 16/176* | (2019.01) |
| *G06F 16/22* | (2019.01) |

(52) U.S. Cl.

CPC ...... *G06F 11/1464* (2013.01); *G06F 11/2023* (2013.01); *G06F 11/2028* (2013.01); *G06F 16/128* (2019.01); *G06F 16/1756* (2019.01); *G06F 16/178* (2019.01); *G06F 16/1844* (2019.01); *G06F 16/185* (2019.01); *G06F 16/2365* (2019.01); *G06F 16/27* (2019.01); *G06F 21/602* (2013.01); *G06F 21/6218* (2013.01); *H04L 9/0836* (2013.01); *H04L 9/0891* (2013.01); *H04L 9/0894* (2013.01); *H04L 9/3228* (2013.01); *G06F 16/1774* (2019.01); *G06F 16/2246* (2019.01); *G06F 2201/84* (2013.01)

(56) References Cited

U.S. PATENT DOCUMENTS

| | | | |
|---|---|---|---|
| 7,278,049 B2 | 10/2007 | Bartfai et al. | |
| 7,308,545 B1 | 12/2007 | Kekre et al. | |
| 7,546,431 B2 | 6/2009 | Stacey et al. | |
| 8,271,992 B2 | 9/2012 | Chatley et al. | |
| 8,326,803 B1 | 12/2012 | Stringham | |
| 8,332,375 B2 | 12/2012 | Chatley et al. | |
| 8,336,056 B1 | 12/2012 | Gadir | |
| 8,464,101 B1 | 6/2013 | Natanzon et al. | |
| 8,522,252 B2 | 8/2013 | Chatley et al. | |
| 8,548,949 B2 | 10/2013 | Jennas, II et al. | |
| 8,700,855 B2 | 4/2014 | Revanuru | |
| 8,832,027 B1 | 9/2014 | Bushman | |
| 8,856,079 B1 | 10/2014 | Subramanian et al. | |
| 9,047,307 B1 | 6/2015 | Ghemawat et al. | |
| 9,189,495 B1 | 11/2015 | Hughes et al. | |
| 9,489,434 B1 | 11/2016 | Rath | |
| 9,535,746 B2 | 1/2017 | Gupta et al. | |
| 9,760,358 B2 | 9/2017 | Sapaliga et al. | |
| 9,916,203 B1 | 3/2018 | Pogde et al. | |
| 9,928,246 B1 | 3/2018 | Xu et al. | |
| 9,952,767 B2 | 4/2018 | Zheng et al. | |
| 10,089,230 B1 | 10/2018 | Koker et al. | |
| 10,459,632 B1* | 10/2019 | Chen | G06F 3/0616 |
| 10,503,753 B2 | 12/2019 | Mitkar et al. | |
| 10,514,986 B2 | 12/2019 | Bangalore et al. | |
| 10,572,452 B1 | 2/2020 | Singh et al. | |
| 10,664,358 B1 | 5/2020 | Chen et al. | |
| 10,698,941 B2 | 6/2020 | Maybee et al. | |
| 10,721,141 B1 | 7/2020 | Verma et al. | |
| 10,756,888 B2 | 8/2020 | Han | |
| 10,761,941 B1 | 9/2020 | Redko et al. | |

| | | | |
|---|---|---|---|
| 10,908,828 B1 | 2/2021 | Meiri et al. | |
| 10,922,132 B1 | 2/2021 | Shiramshetti et al. | |
| 11,005,935 B1 | 5/2021 | Littlefield et al. | |
| 11,036,677 B1 | 6/2021 | Grunwald et al. | |
| 11,080,041 B1 | 8/2021 | Ah Kun et al. | |
| 11,086,545 B1 | 8/2021 | Dayal et al. | |
| 11,151,092 B2 | 10/2021 | Chmiel et al. | |
| 11,372,725 B2 | 6/2022 | Bajaj | |
| 11,513,997 B2 | 11/2022 | Keller et al. | |
| 11,575,727 B1 | 2/2023 | Woodruff et al. | |
| 11,714,782 B2 | 8/2023 | Subramanian et al. | |
| 11,809,735 B1 | 11/2023 | Kumar et al. | |
| 11,836,110 B2 | 12/2023 | Matsushita et al. | |
| 11,860,673 B1 | 1/2024 | Kodakandla et al. | |
| 12,001,404 B2 | 6/2024 | Kashi Visvanathan et al. | |
| 12,147,394 B2 | 11/2024 | Kashi Visvanathan et al. | |
| 12,182,078 B2 | 12/2024 | Kashi Visvanathan et al. | |
| 12,197,790 B2 | 1/2025 | Nelson | |
| 12,271,625 B1 | 4/2025 | Astolfi | |
| 12,445,283 B2 | 10/2025 | Singhal et al. | |
| 12,455,861 B2 | 10/2025 | Kashi Visvanathan et al. | |
| 12,487,972 B2 | 12/2025 | Visvanathan et al. | |
| 12,530,262 B2 | 1/2026 | Kashi Visvanathan et al. | |
| 2002/0112123 A1 | 8/2002 | Becker et al. | |
| 2002/0129214 A1 | 9/2002 | Sarkar | |
| 2003/0182313 A1 | 9/2003 | Federwisch et al. | |
| 2004/0267836 A1* | 12/2004 | Armangau | G06F 11/1435 707/999.203 |
| 2005/0165862 A1* | 7/2005 | Loafman | G06F 16/16 |
| 2006/0271598 A1 | 11/2006 | Wong et al. | |
| 2008/0049254 A1 | 2/2008 | Phan et al. | |
| 2008/0109496 A1 | 5/2008 | Holenstein et al. | |
| 2008/0168218 A1 | 7/2008 | Arakawa et al. | |
| 2008/0172542 A1 | 7/2008 | Kaushik | |
| 2008/0250234 A1 | 10/2008 | Webber | |
| 2008/0256399 A1 | 10/2008 | Erdosi et al. | |
| 2009/0138480 A1 | 5/2009 | Chatley et al. | |
| 2009/0138481 A1 | 5/2009 | Chatley et al. | |
| 2009/0144224 A1 | 6/2009 | Phan et al. | |
| 2009/0144284 A1 | 6/2009 | Chatley et al. | |
| 2009/0144422 A1 | 6/2009 | Chatley et al. | |
| 2009/0307277 A1 | 12/2009 | Grubov et al. | |
| 2011/0213765 A1 | 9/2011 | Cui et al. | |
| 2011/0231172 A1 | 9/2011 | Gold | |
| 2012/0131595 A1 | 5/2012 | Kim et al. | |
| 2012/0173830 A1 | 7/2012 | Gundy et al. | |
| 2012/0180056 A1 | 7/2012 | Sander et al. | |
| 2012/0317079 A1 | 12/2012 | Shoens et al. | |
| 2012/0323844 A1 | 12/2012 | Chatley et al. | |
| 2013/0005491 A1 | 1/2013 | Cox et al. | |
| 2013/0061229 A1 | 3/2013 | Hamada et al. | |
| 2013/0110778 A1 | 5/2013 | Taylor et al. | |
| 2013/0339407 A1 | 12/2013 | Sharpe et al. | |
| 2014/0052692 A1 | 2/2014 | Zhang et al. | |
| 2015/0066857 A1 | 3/2015 | Dayal et al. | |
| 2015/0074536 A1 | 3/2015 | Varadharajan et al. | |
| 2015/0120893 A1 | 4/2015 | Sapaliga et al. | |
| 2015/0378636 A1 | 12/2015 | Yadav et al. | |
| 2016/0188380 A1 | 6/2016 | Eastep et al. | |
| 2016/0224259 A1 | 8/2016 | Ahrens et al. | |
| 2016/0335278 A1 | 11/2016 | Tabaaloute et al. | |
| 2016/0359963 A1 | 12/2016 | Chatley et al. | |
| 2016/0359976 A1 | 12/2016 | Chatley et al. | |
| 2017/0046093 A1 | 2/2017 | Butt | |
| 2017/0212680 A1 | 7/2017 | Waghulde | |
| 2018/0101311 A1 | 4/2018 | Koszewnik | |
| 2019/0171497 A1 | 6/2019 | Agarwal et al. | |
| 2019/0235917 A1 | 8/2019 | Koneru et al. | |
| 2019/0370239 A1 | 12/2019 | Gupta et al. | |
| 2019/0384743 A1 | 12/2019 | Lv et al. | |
| 2020/0065196 A1 | 2/2020 | Desai et al. | |
| 2020/0210223 A1 | 7/2020 | Saka et al. | |
| 2020/0210482 A1 | 7/2020 | Becker et al. | |
| 2020/0250684 A1 | 8/2020 | Puehse et al. | |
| 2020/0257700 A1 | 8/2020 | Xu et al. | |
| 2020/0301882 A1 | 9/2020 | Pogde et al. | |
| 2020/0310919 A1 | 10/2020 | Bajaj | |
| 2020/0333970 A1 | 10/2020 | Mukku et al. | |
| 2020/0334111 A1 | 10/2020 | Potnis et al. | |

(56) References Cited

U.S. PATENT DOCUMENTS

| | | | |
|---|---|---|---|
| 2020/0409974 | A1 | 12/2020 | Ayzenberg et al. |
| 2021/0034569 | A1 | 2/2021 | Xu et al. |
| 2021/0124611 | A1 | 4/2021 | Saillet et al. |
| 2021/0157504 | A1 | 5/2021 | Hinman |
| 2021/0173588 | A1 | 6/2021 | Kannan et al. |
| 2021/0173945 | A1 | 6/2021 | Karr et al. |
| 2021/0200771 | A1 | 7/2021 | Kuang et al. |
| 2021/0216625 | A1 | 7/2021 | Miller et al. |
| 2021/0226861 | A1 | 7/2021 | Barsalou et al. |
| 2021/0294775 | A1 | 9/2021 | Keller et al. |
| 2021/0342299 | A1 | 11/2021 | Kumarasamy et al. |
| 2021/0389883 | A1 | 12/2021 | Derryberry et al. |
| 2021/0390078 | A1 | 12/2021 | Aahlad et al. |
| 2021/0390113 | A1 | 12/2021 | Danilov et al. |
| 2022/0027241 | A1 | 1/2022 | Shrivastava et al. |
| 2022/0058094 | A1 | 2/2022 | Gunturu et al. |
| 2022/0060323 | A1 | 2/2022 | Payne et al. |
| 2022/0121365 | A1 | 4/2022 | Wang et al. |
| 2022/0147490 | A1 | 5/2022 | Shivani et al. |
| 2022/0182297 | A1 | 6/2022 | Verma et al. |
| 2022/0188267 | A1* | 6/2022 | Patil ..................... G06F 16/185 |
| 2022/0198322 | A1 | 6/2022 | Kuperman et al. |
| 2022/0222358 | A1 | 7/2022 | Sahita et al. |
| 2022/0229734 | A1 | 7/2022 | Seela et al. |
| 2022/0263657 | A1 | 8/2022 | Chang et al. |
| 2022/0308965 | A1 | 9/2022 | Gunda et al. |
| 2023/0020330 | A1 | 1/2023 | Schwerin et al. |
| 2023/0029677 | A1 | 2/2023 | Gupta et al. |
| 2023/0080691 | A1 | 3/2023 | Gupta et al. |
| 2023/0134314 | A1 | 5/2023 | Braganza et al. |
| 2023/0177069 | A1 | 6/2023 | Xiang et al. |
| 2023/0222096 | A1 | 7/2023 | Fan et al. |
| 2023/0297411 | A1 | 9/2023 | Tsirkin |
| 2023/0333777 | A1 | 10/2023 | Shveidel et al. |
| 2023/0385153 | A1 | 11/2023 | George et al. |
| 2023/0409442 | A1 | 12/2023 | Kashi Visvanathan et al. |
| 2023/0409522 | A1 | 12/2023 | Kashi Visvanathan et al. |
| 2023/0409535 | A1 | 12/2023 | Kashi Visvanathan et al. |
| 2023/0409559 | A1 | 12/2023 | Kashi Visvanathan et al. |
| 2023/0409597 | A1 | 12/2023 | Kashi Visvanathan et al. |
| 2023/0412375 | A1 | 12/2023 | Bisht et al. |
| 2024/0028466 | A1 | 1/2024 | Duggal et al. |
| 2024/0094937 | A1 | 3/2024 | Kashi Visvanathan et al. |
| 2024/0134828 | A1 | 4/2024 | Kashi Visvanathan et al. |
| 2024/0281413 | A1 | 8/2024 | Kashi Visvanathan et al. |

FOREIGN PATENT DOCUMENTS

| | | | |
|---|---|---|---|
| CN | 104641365 | A | 5/2015 |
| CN | 117215721 | A | 12/2023 |
| JP | 2017531256 | A | 10/2017 |
| WO | 2015110171 | A1 | 7/2015 |
| WO | 2023244601 | A1 | 12/2023 |

OTHER PUBLICATIONS

Google Scholar/Patents search—text refined (Year: 2025).*
International Application No. PCT/US2023/024235, International Search Report and Written Opinion mailed on Sep. 4, 2023, 13 pages.
International Application No. PCT/US2023/024236, International Search Report and Written Opinion mailed on Sep. 6, 2023, 10 pages.
International Application No. PCT/US2023/024239, International Search Report and Written Opinion mailed on Aug. 11, 2023, 14 pages.
International Application No. PCT/US2023/024835, International Search Report and Written Opinion mailed on Aug. 8, 2023, 14 pages.
International Application No. PCT/US2023/025194, International Search Report and Written Opinion mailed on Aug. 18, 2023, 13 pages.

U.S. Appl. No. 18/166,992, Non-Final Office Action mailed on Jun. 20, 2024, 9 pages.
U.S. Appl. No. 18/169,121, Non-Final Office Action mailed on Aug. 14, 2024, 29 pages.
U.S. Appl. No. 18/181,414, Final Office Action mailed on Aug. 12, 2024, 22 pages.
U.S. Appl. No. 18/181,414, Non-Final Office Action mailed on Mar. 14, 2024, 78 pages.
U.S. Appl. No. 18/304,161, Notice of Allowance mailed on Mar. 19, 2024, 20 pages.
U.S. Appl. No. 18/326,447, Non-Final Office Action mailed on Jun. 12, 2024, 8 pages.
U.S. Appl. No. 18/332,462, Final Office Action mailed on Jul. 25, 2024, 26 pages.
U.S. Appl. No. 18/332,462, Non-Final Office Action mailed on Apr. 25, 2024, 18 pages.
Chapman et al., "Provenance and the Price of Identity", Provenance and Annotation of Data and Process, 2008, 14 pages.
Mahajan et al., "Effective and Efficient Compromise Recovery for Weakly Consistent Replication", Microsoft Research, Silicon Valley, Apr. 1, 2009, pp. 131-144.
Tremel et al., "Reliable, Efficient Recovery for Complex Services with Replicated Subsystems", Institute of Electrical and Electronics Engineers, Jun. 2020, pp. 172-183.
"Announcing Amazon Elastic File System Replication" Available Online at: https://aws.amazon.com/about-aws/whats-new/2022/01/amazon-elastic-file-system-replication/, Jan. 25, 2022, 2 pages.
"Amazon EFS replication", Amazon Elastic File System, Available Online at: https://docs.aws.amazon.com/efs/latest/ug/efs-replication.html, Oct. 3, 2022, 18 pages.
"About Consistency Group Snapshot Restore", Working with consistency groups, Available Online at: https://sort.veritas.com/public/documents/HSO/2.0/linux/productguides/html/hfo_admin_ubuntu/ch07s10.htm, 2 pages.
"About HyperScale Consistency Groups", Working with consistency groups, Available Online at: https://sort.veritas.com/public/documents/HSO/2.0/linux/productguides/html/hfo_admin_ubuntu/ch07s02.htm, 1 page.
"AWS KMS concepts", AWS Key Management Service, Available Online at: https://docs.aws.amazon.com/kms/latest/developerguide/concepts.html#kms_keys, Oct. 3, 2022, 36 pages.
"Caringo's Swarm Hybrid Cloud Object Storage Platform Now Integrated with Reach Engine by Levels Beyond and Microsoft Azure Broadcast Beat", Production Industry Resource, Available Online at: https://www.broadcastbeat.com/caringos-swarm-hybrid-cloud-object-storage-platform-now-integrated-with-reach-engine-by-levels-beyond-and-microsoft-azure/, Oct. 3, 2022, 5 pages.
"Caringo Swarm Hybrid Cloud for Azure", Available Online at: https://azure.github.io/Storage/docs/storage-partners/partners/MultiProtocol/Caringo-Azure.pdf, 2017, 1 page.
"Create Amazon EBS Snapshots", Available Online at: https://docs.aws.amazon.com/AWSEC2/latest/UserGuide/ebs-creating-snapshot.html, 2022, 4 pages.
"Create Consistency Groups", Available Online at: https://library.netapp.com/ecmdocs/ECMP12404965/html/GUID-AA34DCF7-6827-4ACC-AA5E-63B1FEA8EFCE.html, Jan. 2016, 2 pages.
"How AWS DataSync works", AWS DataSync, Available Online at: https://docs.aws.amazon.com/datasync/latest/userguide/how-datasync-works.html, Oct. 3, 2022, 5 pages.
"How File Replicator works", Veritas, Available Online at: https://sort.veritas.com/public/documents/vie/7.0/linux/productguides/html/infoscale_replication_admin/ch02s02.html, Oct. 3, 2022, 1 page.
"Replication for File System Agents", Available Online at: https://documentation.commvault.com/v11/essential/129963_replication_for_file_system_agents.html, Dec. 7, 2021, 2 pages.
Mashtizadeh et al., "Replication, History, and Grafting in the Ori File System" https://www.scs.stanford.edu/~dm/home/papers/mashtizadeh:ori.pdf, Nov. 3-6, 2013, pp. 151-166.
"Snapshot Schedules and Snapshot Consistency Groups", Available Online at: https://thinksystem.lenovofiles.com/storage/help/index.jsp?topic=%2Fthinksystem_system_manager_11.50.1%2F34EADFOC-B783-4FED-B187-28B016EE22B_.html, 2 pages.

(56) References Cited

OTHER PUBLICATIONS

"Snapshotting a Consistency Group", Available Online at: https://www.ibm.com/docs/en/xiv-storage-system?topic=commands-snapshotting-consistency-group, Jun. 12, 2022, 5 pages.

"The Definitive Guide to Rubrik Cloud Data Management", Available Online at: https://www.rubrik.com/content/dam/rubrik/en/resources/white-paper/Definitive-guide-rubrik-cloud-data-management.pdf, Jun. 8, 2021, 41 pages.

"What is AWS DataSync", AWS, Available Online at: DataSynchttps://docs.aws.amazon.com/datasync/latest/userguide/what-is-datasync.html, Oct. 3, 2022, 3 pages.

"CephFS Mirroring", Ceph Internals, Available online at: https://docs.ceph.com/en/reef/dev/cephfs-mirroring/, 9 pages.

"SnapshotIQ", Available online at: https://infohub.delltechnologies.com/en-us/l/high-availability-and-data-protection-with-dell-powerscale-scale-out-nas/snapshots-116/, 4 pages.

U.S. Appl. No. 17/991,688 , Non-Final Office Action, Mailed on Nov. 19, 2024, 11 pages.

U.S. Appl. No. 18/094,302 , Notice of Allowance, Mailed on Nov. 29, 2024, 14 pages.

U.S. Appl. No. 18/162,459 , Notice of Allowance, Mailed on Dec. 9, 2024, 11 pages.

U.S. Appl. No. 18/166,992 , Notice of Allowance, Mailed on Nov. 5, 2024, 9 pages.

U.S. Appl. No. 18/181,414 , Notice of Allowance, Mailed on Sep. 30, 2024, 12 pages.

U.S. Appl. No. 18/326,447 , Notice of Allowance, Mailed on Aug. 29, 2024, 10 pages.

U.S. Appl. No. 18/332,475 , Non-Final Office Action, Mailed on Dec. 19, 2024, 15 pages.

U.S. Appl. No. 18/646,676 , Notice of Allowance, Mailed on Jan. 2, 2025, 21 pages.

Khurana et al., "Efficient Snapshot Retrieval Over Historical Graph Data", Institute of Electrical and Electronics Engineers, Jul. 24, 2012, pp. 997-1008.

LAPP , "Busting the Buffer Myth for Multicast Media Over IP", Available Online at: https://blogs.cisco.com/sp/busting-the-buffer-myth-for-multicast-media-over-ip, Feb. 22, 2021, 9 pages.

Application No. PCT/US2023/024235 , International Preliminary Report on Patentability, Mailed on Dec. 26, 2024, 9 pages.

Application No. PCT/US2023/024236 , International Preliminary Report on Patentability, Mailed on Dec. 26, 2024, 9 pages.

Application No. PCT/US2023/024239 , International Preliminary Report on Patentability, Mailed on Dec. 26, 2024, 11 pages.

Application No. PCT/US2023/024835 , International Preliminary Report on Patentability, Mailed on Dec. 26, 2024, 11 pages.

Application No. PCT/US2023/025194 , International Preliminary Report on Patentability, Mailed on Dec. 26, 2024, 10 pages.

U.S. Appl. No. 17/991,688, "Notice of Allowance", mailed Mar. 7, 2025, 8 pages.

U.S. Appl. No. 18/162,459, "Notice of Allowance", mailed Mar. 6, 2025, 10 pages.

U.S. Appl. No. 18/497,877, "Non-Final Office Action", mailed Mar. 3, 2025, 25 pages.

U.S. Appl. No. 18/508,990, "Non-Final Office Action", mailed Mar. 3, 2025, 11 pages.

U.S. Appl. No. 18/646,676, "Notice of Allowance", mailed Mar. 10, 2025, 19 pages.

Chang et al., "Job Scheduling and Data Replication on Data Grids", Future Generation Computer Systems, vol. 23, No. 7, Aug. 2007, pp. 846-860.

U.S. Appl. No. 18/094,302, Notice of Allowance mailed on Mar. 13, 2025, 14 pages.

U.S. Appl. No. 18/169,124, Notice of Allowance mailed on Mar. 20, 2025, 13 pages.

U.S. Appl. No. 18/169,121, Notice of Allowance, mailed on Feb. 14, 2025, 12 pages.

U.S. Appl. No. 18/332,462, Notice of Allowance, mailed on Feb. 12, 2025, 5 pages.

U.S. Appl. No. 18/536,067, Non-Final Office Action, mailed on Jan. 29, 2025, 17 pages.

"Google Scholar/patents Search—Text Refined", Filesystem Delta Snapshot Replication, 2025, 2 pages.

"Google Scholar/patents Search—Text Refined", Pipeline Thread Delete Stage, 2025, 2 pages.

U.S. Appl. No. 18/521,176, "Non-Final Office Action", filed Apr. 4, 2025, 6 pages.

U.S. Appl. No. 18/169,121, "Notice of Allowance", mailed Apr. 28, 2025, 6 pages.

U.S. Appl. No. 18/332,462, Notice of Allowance, mailed on Jun. 13, 2025, 5 pages.

U.S. Appl. No. 18/332,475, Final Office Action, mailed on Jun. 18, 2025, 14 pages.

U.S. Appl. No. 18/508,990, Notice of Allowance, mailed on Jul. 15, 2025, 9 pages.

U.S. Appl. No. 18/536,067, Final Office Action, mailed on Jul. 1, 2025, 14 pages.

U.S. Appl. No. 18/536,072, Notice of Allowance, mailed on Jun. 27, 2025, 12 pages.

U.S. Appl. No. 18/943,779, Non-Final Office Action, mailed on May 30, 2025, 56 pages.

U.S. Appl. No. 18/497,877, "Notice of Allowance", mailed Aug. 12, 2025, 9 pages.

U.S. Appl. No. 18/916,393, "Non-Final Office Action", mailed Aug. 13, 2025, 16 pages.

U.S. Appl. No. 18/969,186, "Non-Final Office Action", mailed Sep. 5, 2025, 23 pages.

U.S. Appl. No. 18/969,190, "Non-Final Office Action", mailed Aug. 22, 2025, 8 pages.

"Pipeline Delete Target Source", Google Scholar/Patents search text refined 2025, Accessed from Internet on Sep. 19, 2025, pp. 1-2.

U.S. Appl. No. 18/497,877, "Supplemental Notice of Allowability", Mailed on Oct. 1, 2025, 6 pages.

U.S. Appl. No. 18/521,176, Notice of Allowance, Mailed on Oct. 2, 2025, 9 pages.

Chinese Patent Application No. CN202380043794.7 , Office Action, Mailed on Oct. 9, 2024, 20 pages (10 pages of English translation and 10 pages of official language copy).

European Patent Applicaton No. EP23738250.2, "Intention to Grant", Oct. 14, 2025, 5 pages.

U.S. Appl. No. 18/943,779, Final Office Action, Mailed on Nov. 7, 2025, 34 pages.

U.S. Appl. No. 18/332,475 , Notice of Allowance, Mailed On Jan. 7, 2026, 9 pages.

U.S. Appl. No. 18/536,067 , Notice of Allowance, Mailed On Feb. 3, 2026, 9 pages.

U.S. Appl. No. 18/916,393 , "Corrected Notice of Allowability", Jan. 27, 2026, 2 pages.

U.S. Appl. No. 18/916,393 , "Corrected Notice of Allowability", Dec. 19, 2025, 4 pages.

U.S. Appl. No. 18/916,393 , Notice of Allowance, Mailed On Nov. 24, 2025, 10 pages.

U.S. Appl. No. 18/969,190 , Notice of Allowance, Mailed On Jan. 29, 2026, 8 pages.

Chinese Patent Application No. CN202380043794.7 , Office Action, Mailed On Nov. 29, 2025, 16 pages (8 pages of English translation and 8 pages of official language copy).

Chinese Patent Application No. CN202380043794.7 , Office Action, Mailed On Jan. 7, 2026, 18 pages (9 pages of English translation and 9 pages of official language copy).

Indian Patent Application No. IN202447074607 , "First Examination Report", Jan. 20, 2026, 9 pages.

* cited by examiner

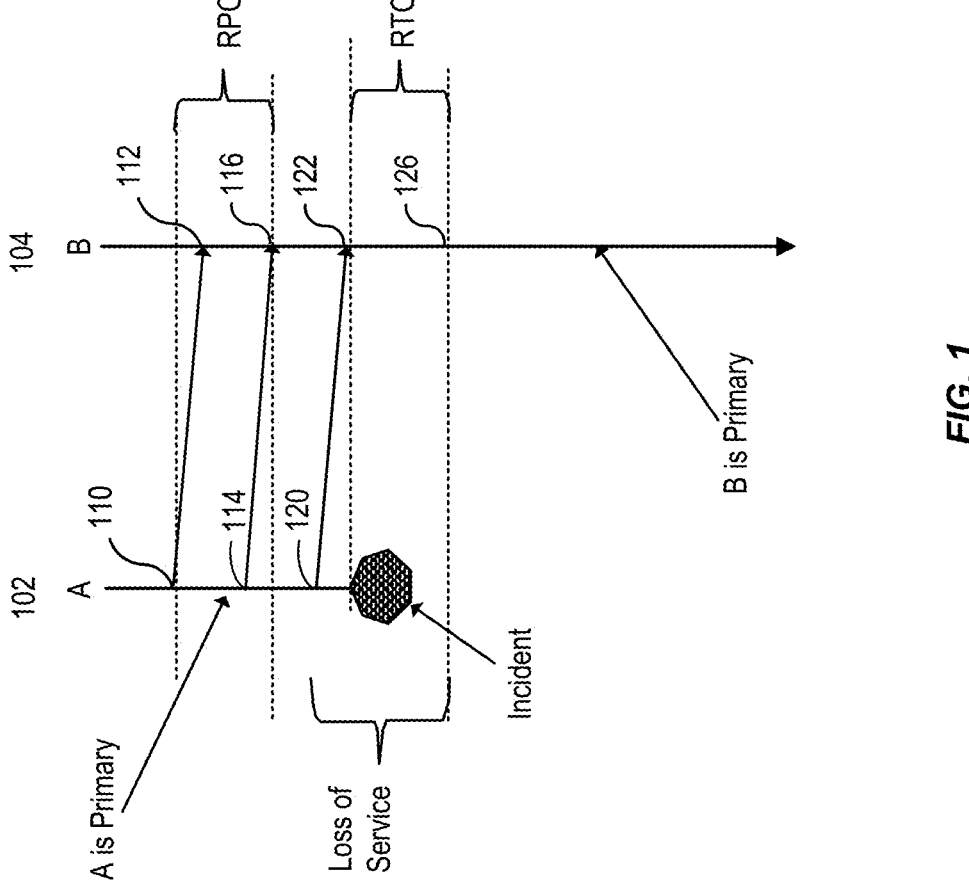
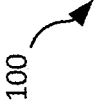
*FIG. 1*

Delta generator 620

GETKEYVAL 640

Range threads 612a-n

Send FMAPs 644

DASD IO threads 614a-n

Enqueue READY 646

Object threads 616a-n

Checkpoint 642

SDB 622

600

8-16 Object threads 616a-n

Enqueue to Upload 8-16 DASD IO threads 614a-n

Enqueue DASD IO 8-16 Range threads 612a-n

Enqueue to Range worker

Main threads 610a-n

Replication Source Job

Figure 9:
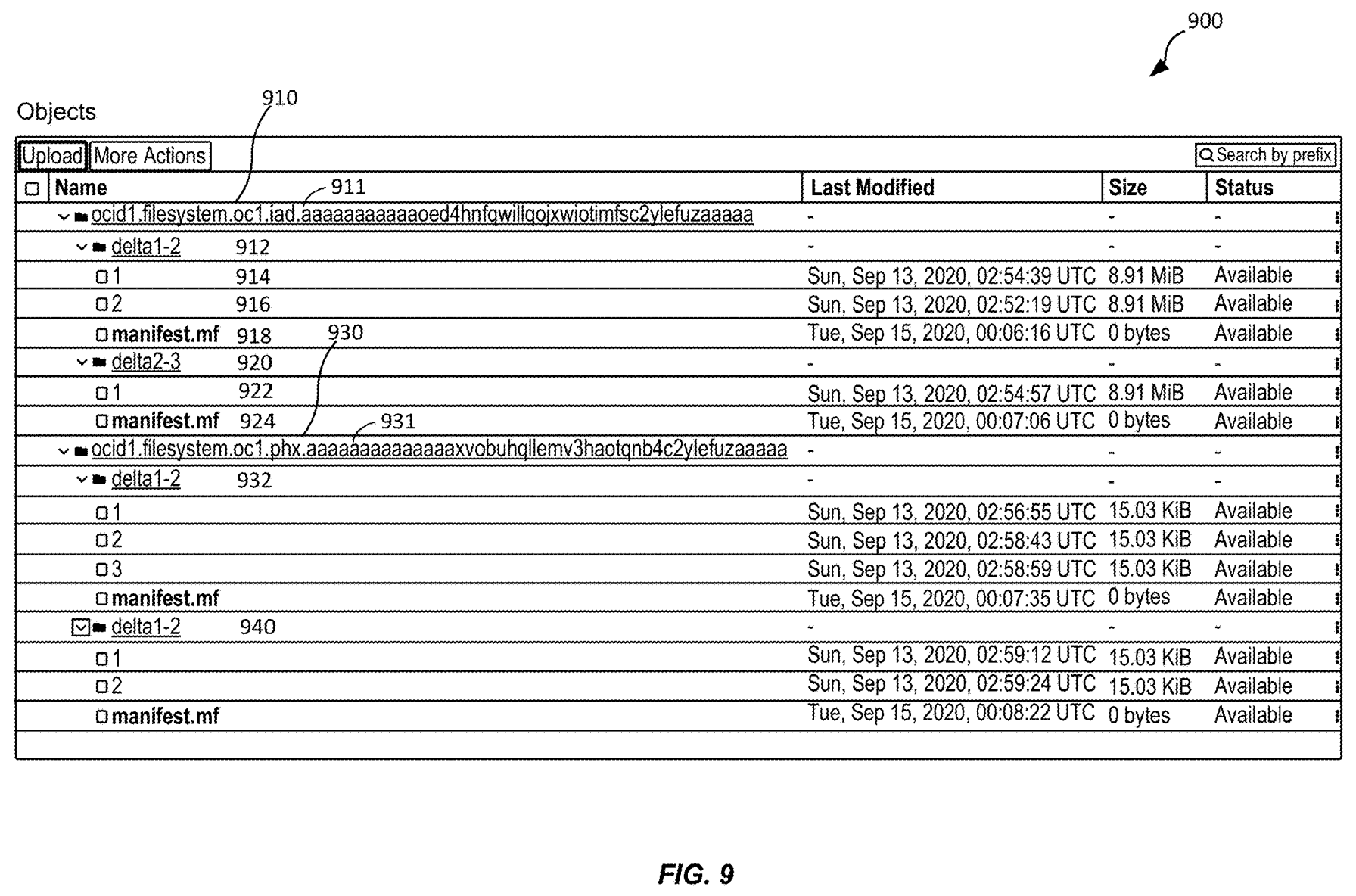

Objects

| □ Name | Last Modified | Size | Status |
|---|---|---|---|
| ⌄ ▪ ocid1.filesystem.oc1.iad.aaaaaaaaaoed4hnfqwiiigqjxwiotimfsc2ylefuzaaaaa | - | - | - |
| ⌄ ▪ delta1-2 | - | - | - |
| □ 1 | Sun, Sep 13, 2020, 02:54:39 UTC | 8.91 MiB | Available |
| □ 2 | Sun, Sep 13, 2020, 02:52:19 UTC | 8.91 MiB | Available |
| □ manifest.mf | Tue, Sep 15, 2020, 00:06:16 UTC | 0 bytes | Available |
| ⌄ ▪ delta2-3 | - | - | - |
| □ 1 | Sun, Sep 13, 2020, 02:54:57 UTC | 8.91 MiB | Available |
| □ manifest.mf | Tue, Sep 15, 2020, 00:07:06 UTC | 0 bytes | Available |
| ⌄ ▪ ocid1.filesystem.oc1.phx.aaaaaaaaaaaxvobuhqllemv3haotqnb4c2ylefuzaaaaa | - | - | - |
| ⌄ ▪ delta1-2 | - | - | - |
| □ 1 | Sun, Sep 13, 2020, 02:56:55 UTC | 15.03 KiB | Available |
| □ 2 | Sun, Sep 13, 2020, 02:58:43 UTC | 15.03 KiB | Available |
| □ 3 | Sun, Sep 13, 2020, 02:58:59 UTC | 15.03 KiB | Available |
| □ manifest.mf | Tue, Sep 15, 2020, 00:07:35 UTC | 0 bytes | Available |
| ☑ ▪ delta1-2 | - | - | - |
| □ 1 | Sun, Sep 13, 2020, 02:59:12 UTC | 15.03 KiB | Available |
| □ 2 | Sun, Sep 13, 2020, 02:59:24 UTC | 15.03 KiB | Available |
| □ manifest.mf | Tue, Sep 15, 2020, 00:08:22 UTC | 0 bytes | Available |

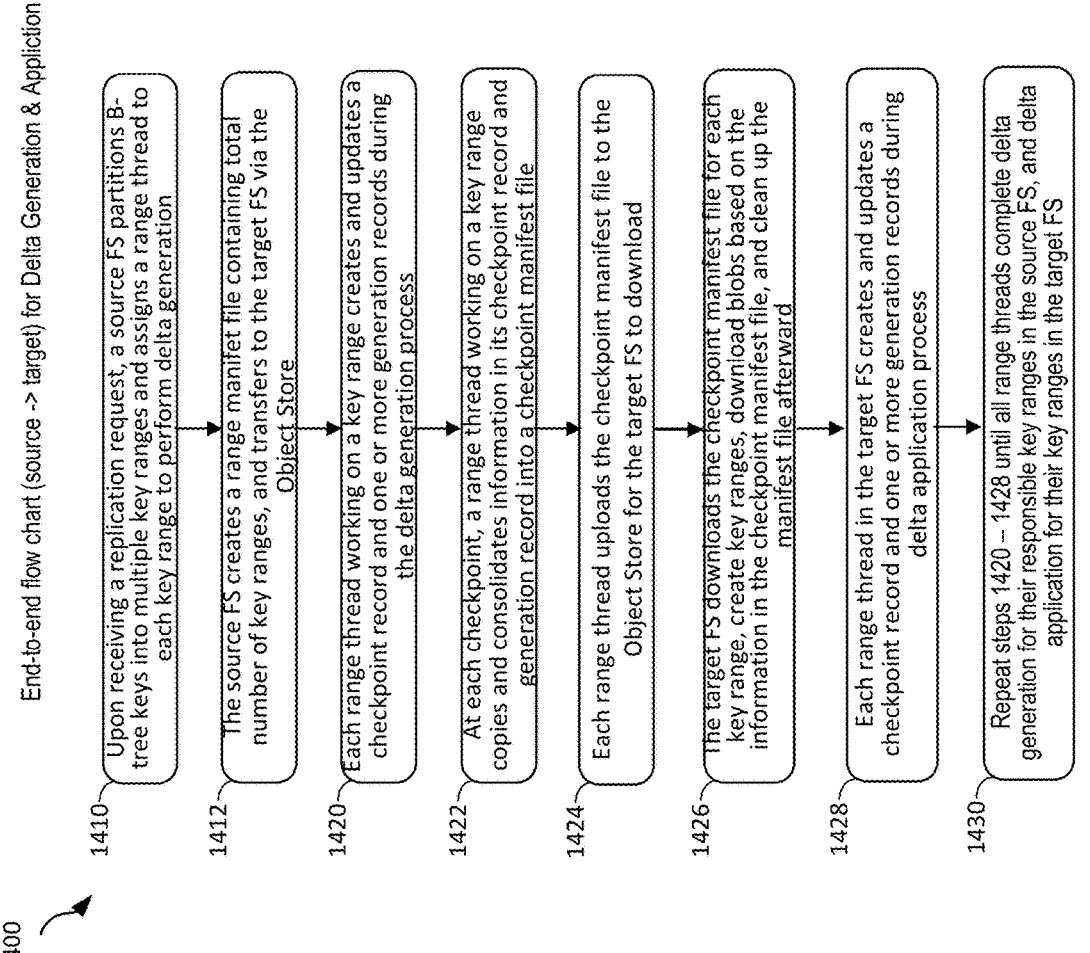

End-to-end flow chart (source -> target) for Delta Generation & Appliction

1410 — Upon receiving a replication request, a source FS partitions B-tree keys into multiple key ranges and assigns a range thread to each key range to perform delta generation 1412 — The source FS creates a range manifet file containing total number of key ranges, and transfers to the target FS via the Object Store 1420 — Each range thread working on a key range creates and updates a checkpoint record and one or more generation records during the delta generation process 1422 — At each checkpoint, a range thread working on a key range copies and consolidates information in its checkpoint record and generation record into a checkpoint manifest file 1424 — Each range thread uploads the checkpoint manifest file to the Object Store for the target FS to download 1426 — The target FS downloads the checkpoint manifest file for each key range, create key ranges, download blobs based on the information in the checkpoint manifest file, and clean up the manifest file afterward 1428 — Each range thread in the target FS creates and updates a checkpoint record and one or more generation records during delta application process 1430 — Repeat steps 1420 – 1428 until all range threads complete delta generation for their responsible key ranges in the source FS, and delta application for their key ranges in the target FS

Key-Value Pairs for Generation Record

1500

Table 1530
(for Thread T1 of key range 1)

| Gen. Record No. | Key | Value |
|---|---|---|
| 1 | Range ID = R1 <br> Gen num = G1 | (1, 35) |
| 2 | Rane ID = R1 <br> Gen num = G2 | (36, 70) |
| 3 | Range ID = R1 <br> Gen num = G3 | (71, 100) |

Table 1532
(for Thread T2 of key range 2)

| Gen. Record No. | Key | Value |
|---|---|---|
| 1 | Range ID = R2 <br> Gen num = G1 | (1, 35) |
| 2 | Range ID = R2 <br> Gen num = G2 | (36, 85) |

Table 1534
(for Thread T4 of key range 2)

| Gen. Record No. | Key | Value |
|---|---|---|
| 3 | Range ID = R2 <br> Gen num = G3 | (71, 100) |

Key = {
  REPLICATION_TYPE,　(source or target)
  REPLICATION_ID,
  RANGE_ID,
  GENNUM, (generation number)
  ...
}

1510

Value = {
  START_BLOB_SEQNO,
  LAST_BLOB_SEQNO,
  ...
}

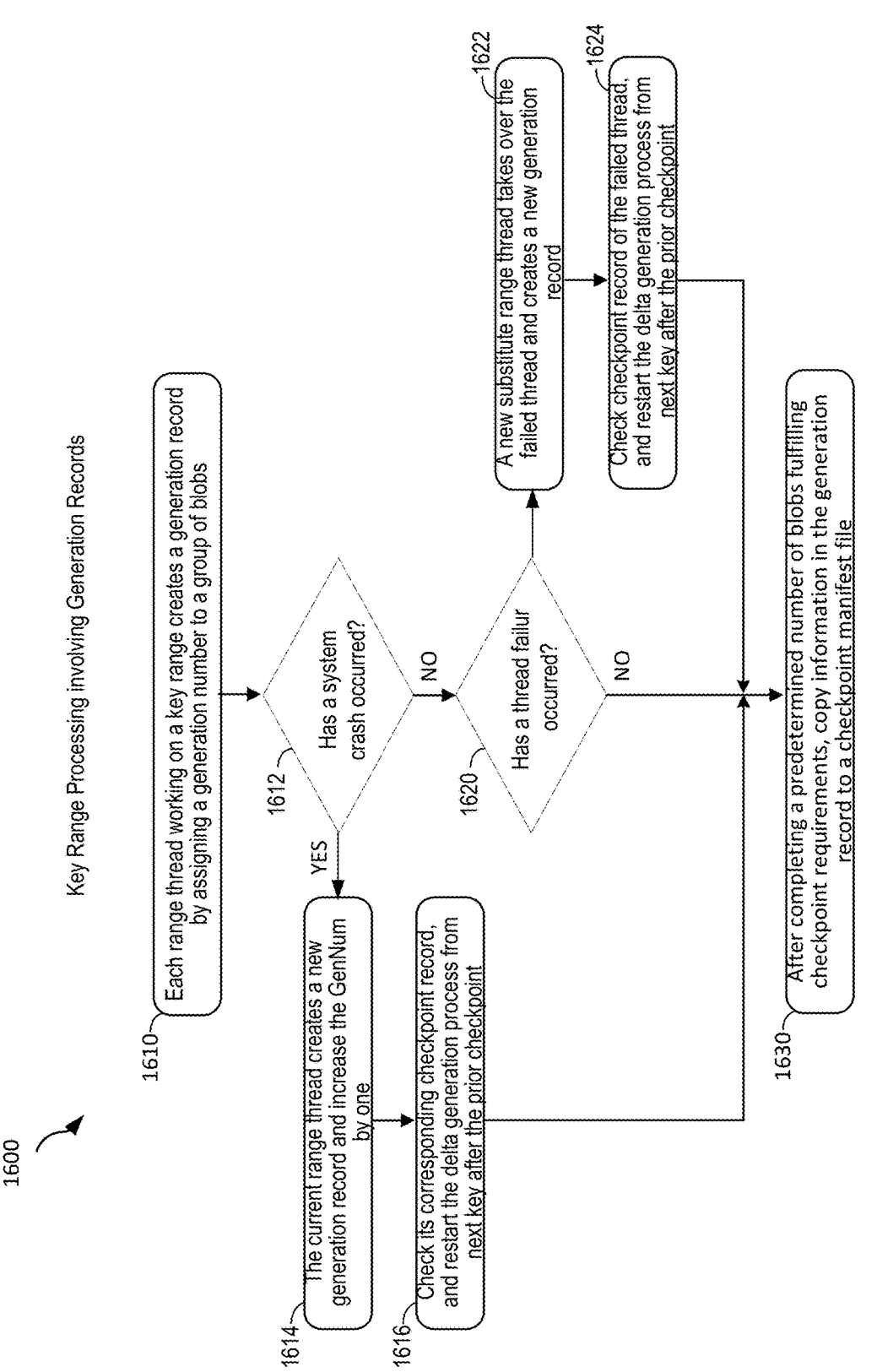

1600

Key Range Processing involving Generation Records

1610 — Each range thread working on a key range creates a generation record by assigning a generation number to a group of blobs 1612 — Has a system crash occurred?

YES

1614 — The current range thread creates a new generation record and increase the GenNum by one 1616 — Check its corresponding checkpoint record, and restart the delta generation process from next key after the prior checkpoint

NO

1620 — Has a thread failur occurred?

1622 — A new substitute range thread takes over the failed thread and creates a new generation record 1624 — Check checkpoint record of the failed thread, and restart the delta generation process from next key after the prior checkpoint

NO

1630 — After completing a predetermined number of blobs fulfilling checkpoint requirements, copy information in the generation record to a checkpoint manifest file

FIG. 16

Figure 17:
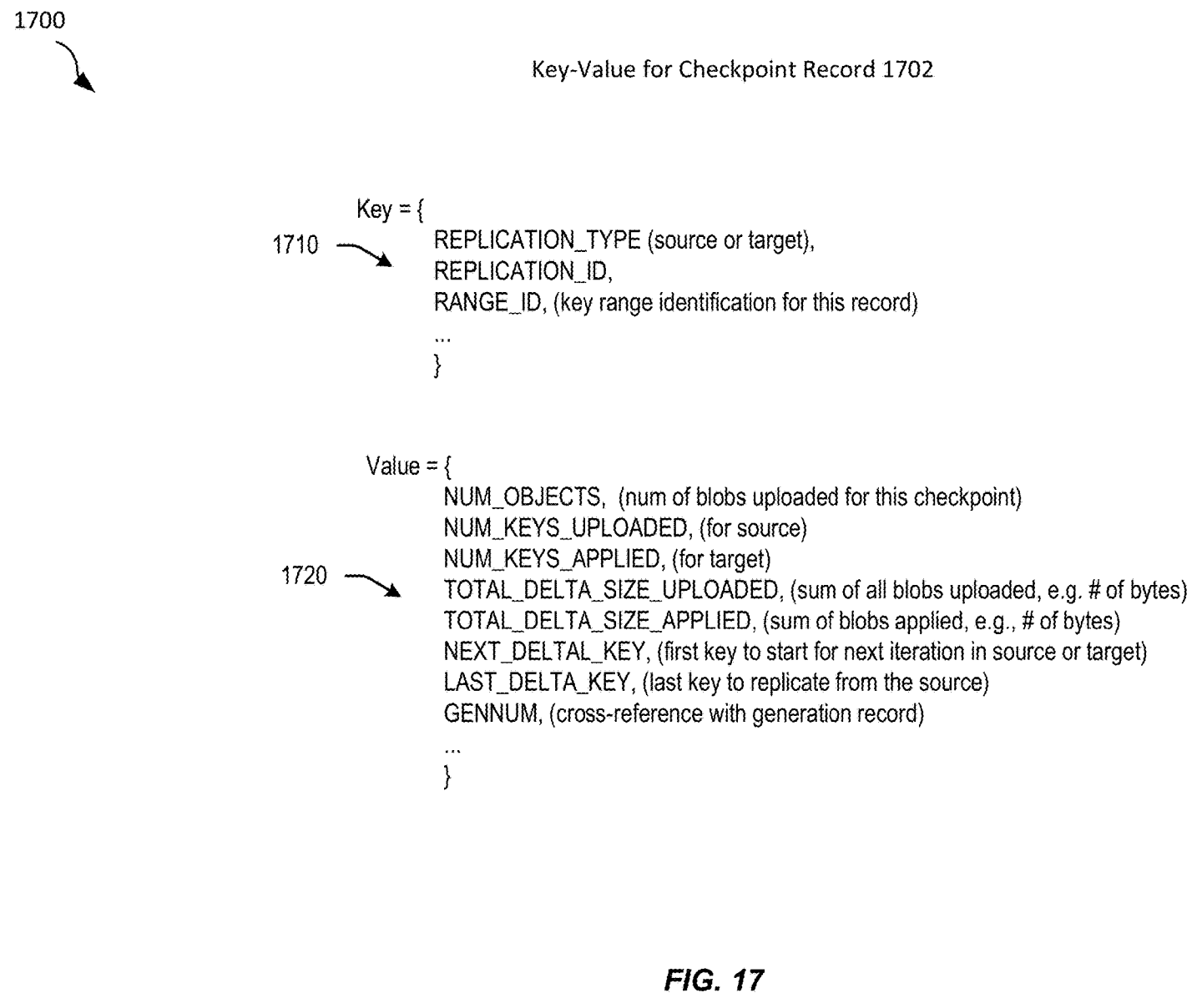

Key-Value for Checkpoint Record 1702

Key = {
    REPLICATION_TYPE (source or target),
    REPLICATION_ID,
    RANGE_ID, (key range identification for this record)
    ...
}

1710

Value = {
    NUM_OBJECTS, (num of blobs uploaded for this checkpoint)
    NUM_KEYS_UPLOADED, (for source)
    NUM_KEYS_APPLIED, (for target)
    TOTAL_DELTA_SIZE_UPLOADED, (sum of all blobs uploaded, e.g. # of bytes)
    TOTAL_DELTA_SIZE_APPLIED, (sum of blobs applied, e.g., # of bytes)
    NEXT_DELTAL_KEY, (first key to start for next iteration in source or target)
    LAST_DELTA_KEY, (last key to replicate from the source)
    GENNUM, (cross-reference with generation record)
    ...
}

Table 1810
(for Key range 1, and
Thread T1)

| Chkpt No. | Key | Value |
|---|---|---|
| C1 | Range_ID = R1 | Num_objects = 25 blobs<br>Total_delta_size_uploaded = 2500 bytes<br>Next_delta_key = K251 (for 10 keys/blob)<br>GenNum = G1 |
| C2 | Range_ID = R1 | Num_objects = 25<br>Total_delta_size_uploaded = 5000<br>Next_delta_key = K501<br>GenNum = G2 |
| C3 | Range_ID = R1 | Num_objects = 25<br>Total_delta_size_uploaded = 7500<br>Next_delta_key = K751<br>GenNum = G3 |
| C4 | Range_ID = R1 | Num_objects = 25<br>Total_delta_size_uploaded = 10000<br>Next_delta_key = N/A<br>GenNum = G3 |

Table 1820
(for Key range 2, and
Threads T2 -> T4)

| Chkpt No. | Key | Value |
|---|---|---|
| C1 | Range_ID = R2 | Num_objects = 25 blobs<br>Total_delta_size_uploaded = 2500 byte<br>Next_delta_key = K1251 (for 10 keys/blob)<br>GenNum = G1 |
| C2 | Range_ID = R2 | Num_objects = 25<br>Total_delta_size_uploaded = 5000<br>Next_delta_key = K1501<br>GenNum = G2 |
| C3 | Range_ID = R2 | Num_objects = 25<br>Total_delta_size_uploaded = 7500<br>Next_delta_key = K1751<br>GenNum = G3 |
| C4 | Range_ID = R2 | Num_objects = 25<br>Total_delta_size_uploaded = 10000<br>Next_delta_key = N/A<br>GenNum = G3 |

FIG. 18

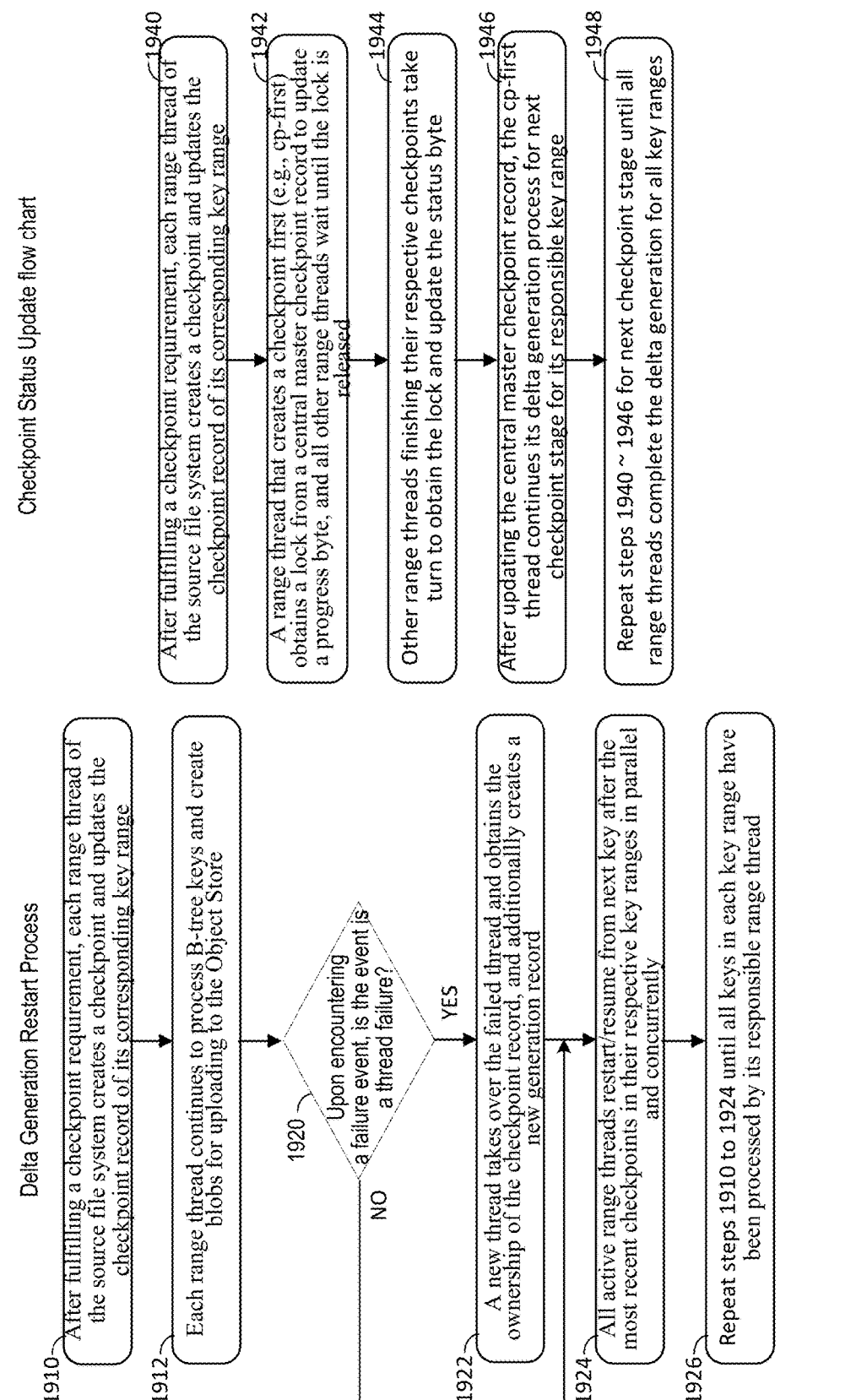

Checkpoint Status Update flow chart

After fulfilling a checkpoint requirement, each range thread of the source file system creates a checkpoint and updates the checkpoint record of its corresponding key range — 1940

A range thread that creates a checkpoint first (e.g., cp-first) obtains a lock from a central master checkpoint record to update a progress byte, and all other range threads wait until the lock is released — 1942

Other range threads finishing their respective checkpoints take turn to obtain the lock and update the status byte — 1944

After updating the central master checkpoint record, the cp-first thread continues its delta generation process for next checkpoint stage for its responsible key range — 1946

Repeat steps 1940 ~ 1946 for next checkpoint stage until all range threads complete the delta generation for all key ranges — 1948

FIG. 19B

Delta Generation Restart Process

1900

After fulfilling a checkpoint requirement, each range thread of the source file system creates a checkpoint and updates the checkpoint record of its corresponding key range — 1910

Each range thread continues to process B-tree keys and create blobs for uploading to the Object Store — 1912

1920 — Upon encountering a failure event, is the event is a thread failure?

NO

YES

A new thread takes over the failed thread and obtains the ownership of the checkpoint record, and additionally creates a new generation record — 1922

All active range threads restart/resume from next key after the most recent checkpoints in their respective key ranges in parallel and concurrently — 1924

Repeat steps 1910 to 1924 until all keys in each key range have been processed by its responsible range thread — 1926

FIG. 19A

Figure 20:
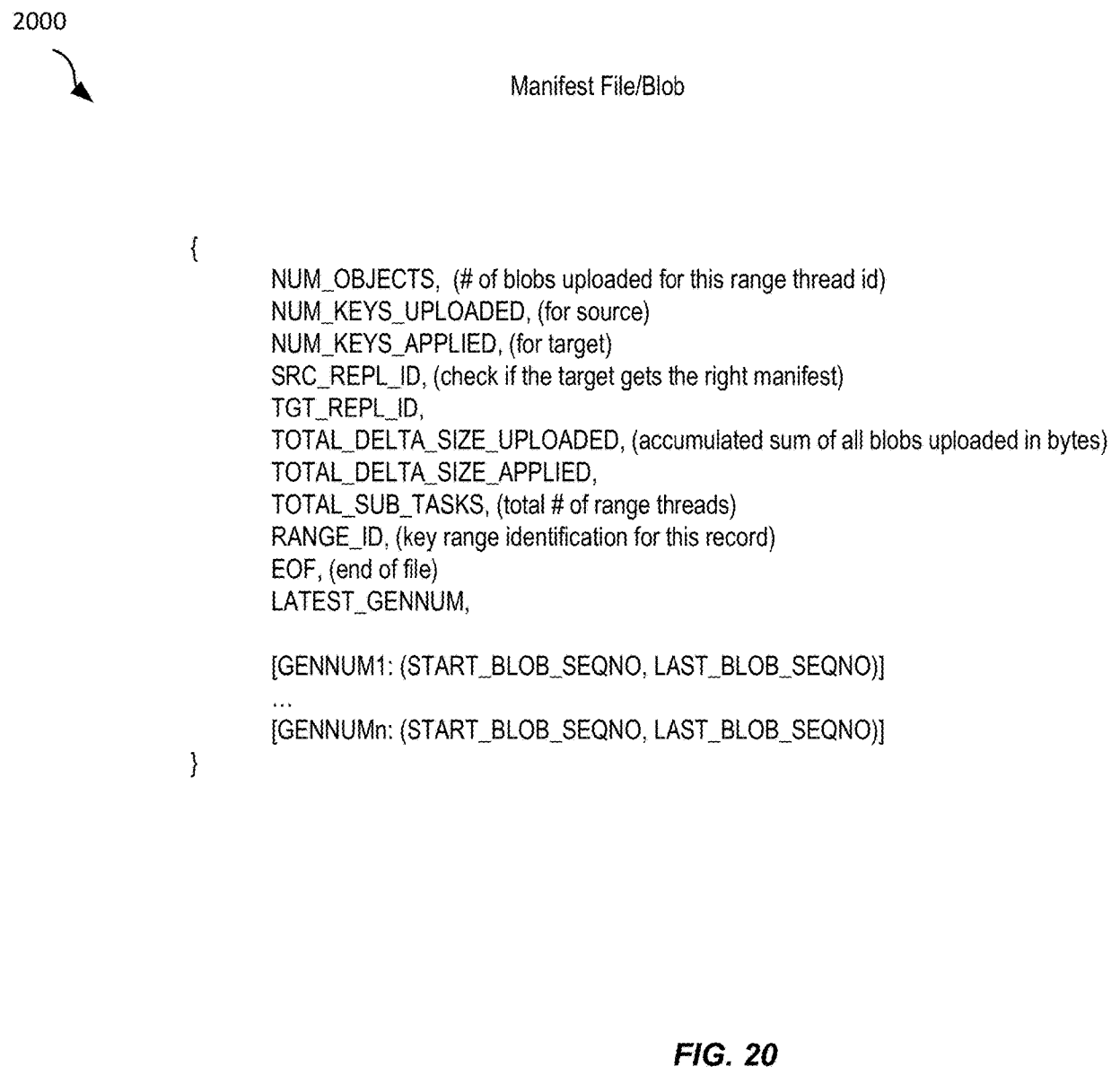

Manifest File/Blob

{

NUM_OBJECTS, (# of blobs uploaded for this range thread id)
NUM_KEYS_UPLOADED, (for source)
NUM_KEYS_APPLIED, (for target)
SRC_REPL_ID, (check if the target gets the right manifest)
TGT_REPL_ID,
TOTAL_DELTA_SIZE_UPLOADED, (accumulated sum of all blobs uploaded in bytes)
TOTAL_DELTA_SIZE_APPLIED,
TOTAL_SUB_TASKS, (total # of range threads)
RANGE_ID, (key range identification for this record)
EOF, (end of file)
LATEST_GENNUM,

[GENNUM1: (START_BLOB_SEQNO, LAST_BLOB_SEQNO)]
...
[GENNUMn: (START_BLOB_SEQNO, LAST_BLOB_SEQNO)]

TECHNIQUES FOR MAINTAINING DATA CONSISTENCY DURING DISASTER RECOVERY

CROSS-REFERENCES TO RELATED APPLICATIONS

This application is a non-provisional of and claims the benefit and priority under 35 U.S.C. 119(e) of U.S. Provisional Application No. 63/352,992, filed on Jun. 16, 2022, U.S. Provisional Application No. 63/357,526, filed on Jun. 30, 2022, U.S. Provisional Application No. 63/412,243, filed on Sep. 30, 2022, and U.S. Provisional Application No. 63/378,486, filed on Oct. 5, 2022, which are incorporated herein by reference in their entirety for all purposes.

This application is related to U.S. Non-Provisional application Ser. No. 18/304,161, filed Apr. 20, 2023, now U.S. Pat. No. 12,001,404, entitled "TECHNIQUES FOR REPLICATION CHECKPOINTING DURING DISASTER RECOVERY," the disclosure of which is incorporated by reference in its entirety for all purposes.

FIELD

The present disclosure generally relates to file systems. More specifically, but not by way of limitation, techniques are described for maintaining data consistency in case of a failure event during file storage replications between file systems in different cloud infrastructure regions.

BACKGROUND

A replication process for disaster recovery may fail for various reasons, including crashes, lease expire, object storage failure, unsuccessful deployment, patching, etc. Checkpoint plays an important role during a file system replication process by preserving necessary information periodically, and allowing to minimize the risk of data loss or corruption and resume from a consistent point without having to start from the beginning to save time. Additionally, parallel processing is used to improve performance. However, there is a need to enhance checkpointing and data consistency during replication.

BRIEF SUMMARY

The present disclosure generally relates to file systems. More specifically, but not by way of limitation, techniques are described for maintaining data consistency in case of a failure event during file storage replications between file systems in different cloud infrastructure regions. Various embodiments are described herein, including methods, systems, non-transitory computer-readable storage media storing programs, code, or instructions executable by one or more processors, and the like.

In certain embodiments, techniques are provided including a method that comprises receiving, by a computing system, a request for a file system replication between a source file system and a target file system, the source file system and the target file system being in different regions; processing, by the computing system, a plurality of binary tree (B-tree) key-value pairs that are different between two snapshots of a source file system; assigning, by the computing system, a first identifier to a first group of key-value pairs of the plurality of B-tree key-value pairs; and assigning, by the computing system, a second identifier to a second group of key-value pairs of the plurality of B-tree key-value pairs upon detecting a failure event during the file system replication.

In yet another embodiment, the processing comprises identifying and uploading the plurality of B-tree key-value pairs to an object storage.

In yet another embodiment, if the failure event is caused by a failure of a first processing thread, then the first group of key-value pairs of the plurality of B-tree key-value pairs is processed by the first processing thread, and the second group of key-value pairs of the plurality of B-tree key-value pairs is processed by a second processing thread.

In yet another embodiment, if the failure event is caused by the failure of a first processing thread, then the method further comprises creating a record associated with the second processing thread for tracking the second group of key-value pairs of the plurality of B-tree key-value pairs, the record associated with the second processing thread is different from a record associated with the first processing thread for tracking the first group of key-value pairs of the plurality of B-tree key-value pairs.

In yet another embodiment, if the failure event is caused by a system crash, then both the first and second groups of key-value pairs of the plurality of B-tree key-value pairs are processed by a single process thread.

In yet another embodiment, the first identifier and the second identifier are numeric numbers, and the second identifier has higher number than the first identifier.

In yet another embodiment, the method further comprises discarding an overlap portion of the first group of key-value pairs of the plurality of B-tree key-value pairs by the target file system if the first group and the second group have overlap key-value pairs based, at least in part, on the second identifier having higher number than the first identifier.

In yet another embodiment, the plurality of B-tree key-value pairs belong to a key range of a plurality of key ranges.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a computer-program product is provided that is tangibly embodied in a non-transitory machine-readable medium and that includes instructions configured to cause one or more data processors to perform part or all of one or more methods disclosed herein.

BRIEF DESCRIPTION OF THE DRAWINGS

Features, embodiments, and advantages of the present disclosure are better understood when the following Detailed Description is read with reference to the accompanying drawings.

FIG. 1 depicts an example concept of recovery time objective (RTO) and recovery point objective (RPO), according to certain embodiments.

FIG. 9 depicts an example replication bucket format, according to certain embodiments.

FIG. 13 is a simplified example diagram illustrating key-range processing for delta generation during a cross-region replication, according to certain embodiments.

FIG. 14 is a flow chart illustrating an end-to-end process flow for delta generation and delta application during a cross-region replication, according to certain embodiments.

FIG. 15 illustrates a generation record for the delta generation and application processes, according to certain embodiments.

FIG. 16 is a flow chart illustrating key-range processing involving generation records for delta generation and application during a cross-region replication, according to certain embodiments.

FIG. 17 illustrates a checkpoint record for the delta generation and application processes, according to certain embodiments.

FIG. 18 is an example checkpoint record in a table format, according to certain embodiments.

FIG. 19A is a flow chart illustrating a delta generation restart process utilizing checkpoints, according to certain embodiments.

FIG. 19B is a flow chart illustrating a synchronization mechanism for checkpoint status updates among all key ranges, according to certain embodiments.

FIG. 20 is an example checkpoint manifest file, according to certain embodiments.

DETAILED DESCRIPTION

Figure 2:
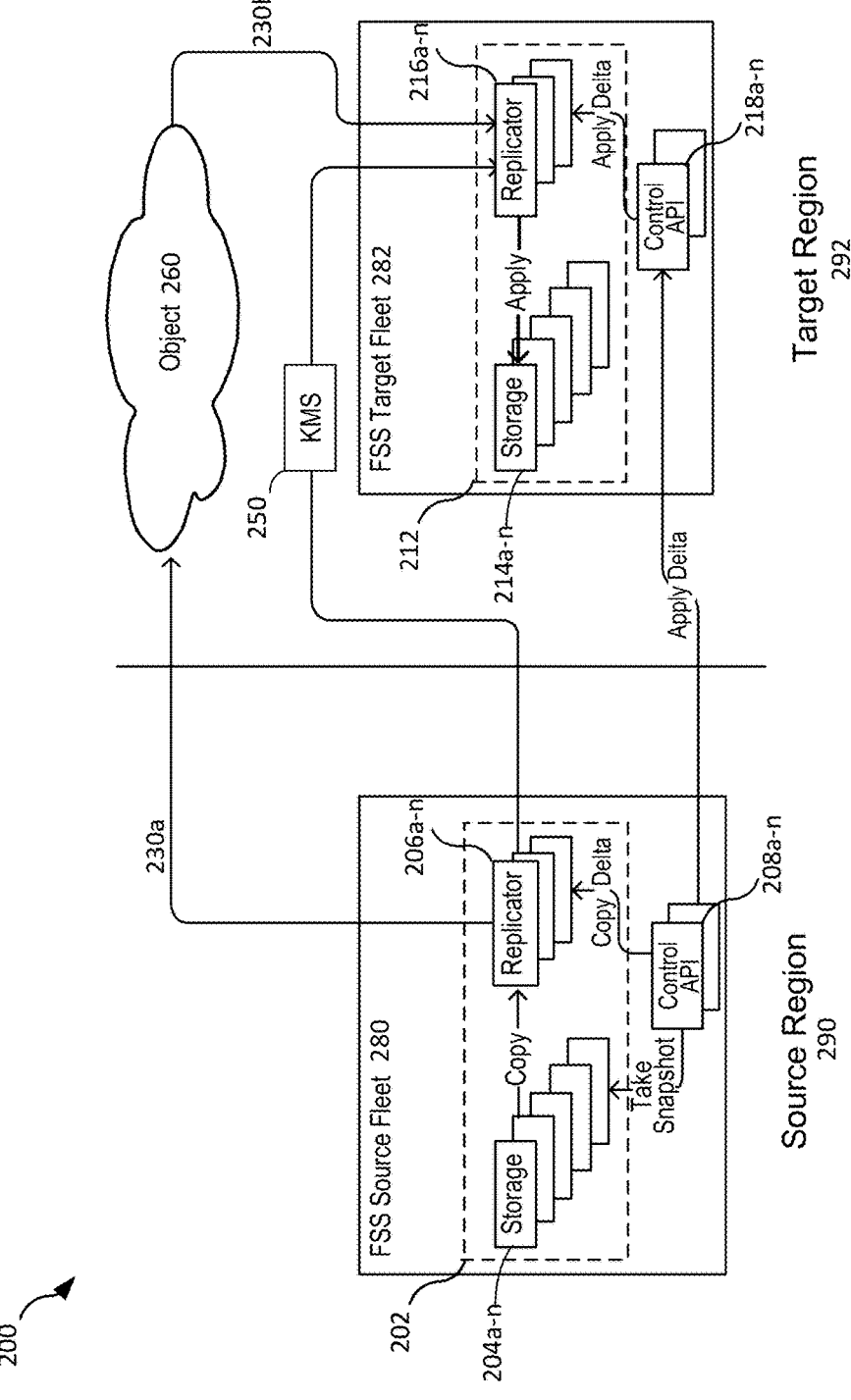
FIG. 2 is a simplified block diagram illustrating an architecture for cross-region remote replication, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive.

The present disclosure generally relates to file systems. More specifically, but not by way of limitation, techniques are described for checkpointing multiple key ranges in parallel and concurrently during file storage replications between file systems in different cloud infrastructure regions. There are a few challenges when a system crashes during the replication process. One is how to resume from the last point and complete it without repeating the whole process. The second challenge is potential data corruption because a failed thread may suddenly wake up unexpectedly and collide with another thread that has taken over the failed thread. The third challenge is how to persist the checkpoint information somewhere that is still accessible after the crash without performance problems for recovery.

The techniques disclosed in the present disclosure create an efficient recovery scheme by dividing a B-tree into multiple key ranges, each with its own checkpoints. As a result, all these key ranges can restart and recover in parallel and concurrently from their respective most recent checkpoints. Thus, the recovery performance is much better than only one checkpoint for a big key range. Additionally, one range thread is assigned to process a key range, and all range threads operate independently. Each key range may have a checkpoint record to track the processed information. The checkpoint record may have a range-level lock for updating this record by one or more range threads processing that key range. Additionally, all range threads may update a central master checkpoint record about their respective status to achieve synchronization among the threads. The central master checkpoint record may have a replication job-level lock for updating this master record by all range threads.

Furthermore, in certain embodiments, the techniques use a generation number (GenNum) to distinguish different generations of processed delta during delta generation (in the source file system) or delta application (in the target file system) processes when failure events occur. The generation number can prevent a potential data corruption or collision problem leading to data inconsistency that a thread failure may cause during replication when both the unreliable failed thread and a substitute thread (i.e., a thread taking over the failed thread) update the same record because they process the same key range.

Finally, in some embodiments, the proposed solution condenses information for recovery into a concise format, such as a manifest file, for each checkpoint to pass from the source file system (FS) to the target file system. Thus, the concise information can be stored in memory with a small footprint to increase recovery performance.

Explanation of Terms in Certain Embodiments

"Recovery time objective" (RTO), in certain embodiments, refers to the time duration users require for their replica to be available in a secondary (or target) region after a failure occurs in a primary (or source) region's availability domain (AD), whether the failure is planned or unplanned.

"Recovery point objective" (RPO), in certain embodiments, refers to a maximum acceptable tolerance in terms of time for data loss between the failure of a primary region (typically due to unplanned failure) and the availability of a secondary region.

A "replicator," in certain embodiments, may refer to a component (e.g., a virtual machine (VM)) in a file system's data plane for either uploading deltas to a remote Object Store (i.e., an object storage service) if the component is located in a source region or downloading the deltas from the Object Storage for delta application if the component is located in a target region. Replicators may be formed as a fleet (i.e., multiple VMs or replicator threads) called replicator fleet to perform cross-region (or x-region) replication process (e.g., uploading deltas to target region) in parallel.

A "delta generator" (DG), in certain embodiments, may refer to a component in a file system's data plane for either extracting the deltas (i.e., the changes) between the key-values of two snapshots if the component is located in a source region or applying the deltas to the latest snapshot in a B-tree of the file system if the component is located in a target region. The delta generator in the source region may uses several threads (delta generator threads) to perform the extraction of deltas (or B-tree walk) in parallel. The delta generator in the target region may use several threads to apply the downloaded deltas to its latest snapshot in parallel.

A "shared database" (SDB), for the purpose of the present disclosure and in certain embodiments, may refer to a key-value store through which components in both the control plane and data plane (e.g., replicator fleet) of a file system can read and write to communicate with each other. In certain embodiments, the SDB may be part of a B-tree.

A "file system communicator" (FSC), in certain embodiments, may refer to a file manager layer running on the storage nodes in a file system's data plane. The service help with file create, delete, read and write requests, and works with a NFS server (e.g., Orca) to service IOs to clients. Replicator fleet may communicate with many storage nodes thereby distributing the work of reading/writing the file system data among the storage nodes.

A "blob," in certain embodiments, may refer to a data type for storing information (e.g., a formatted binary file) in a database. Blobs are generated during replication by a source region and uploaded to an Object Store (i.e., an object storage) in a target region. A blob may include binary tree (B-tree) keys and values and file data. Blobs in the Object Store are called objects. B-tree key-value pairs and their associated data are packed together in blobs to be uploaded to the Object Store in a target region.

A "manifest," in certain embodiments, may refer to information communicated by a file system in a source region (referred to herein as source file system) to a file system in a target region (referred to herein as target file system) for facilitating a cross-region replication process. There are two types of manifest files, master manifest and checkpoint manifest. A range manifest file (or master manifest file) is created by a source file system at the beginning of a replication process, describing information (e.g., B-tree key ranges) needed by the target file system. A checkpoint manifest file is created after a checkpoint in a source file system informing a target file system of the number of blobs included in a checkpoint and uploaded to the Object Store, such that the target file system can download the number of blobs accordingly.

"Deltas," in certain embodiments, may refer to the differences identified between two given snapshots after replicators recursively visiting every node of a B-tree (also referred to herein walking a B-tree). A delta generator identifies B-tree key-value pairs for the differences and traverses the B-tree nodes to obtain file data associated with the B-tree keys. A delta between two snapshots may contain multiple blobs. The term "deltas" may include blobs and manifests when used in the context of uploading information to an Object Store by a source file system and downloading from an Object Store by a target file system.

An "object," in certain embodiments, may refer to a partial collection of information representing the entire deltas during a cross-region replication cycle and is stored in an Object Store. An object may be a few MBs in size stored in a specific location in a bucket of the Object Store. An object may contain many deltas (i.e., blobs and manifests). Blobs uploaded to and stored in the Object Store are called objects.

A "bucket," in certain embodiments, may refer to a container storing objects in a compartment within an Object Storage namespace (tenancy). In the present disclosure, buckets are used by source replicators to store secured deltas using server-side encryption (SSE) and also by target replicators to download for applying changes to snapshots.

"Delta application," in certain embodiments, may refer to the process of applying the deltas downloaded by a target file system to its latest snapshot to create a new snapshot. This may include analyzing manifest files, applying snapshot metadata, inserting the B-tree keys and values into its B-tree, and storing data associated with the B-tree keys (i.e., file data or data portion of blobs) to its local storage. Snapshot metadata is created and applied at the beginning of a replication cycle.

A "region," in certain embodiments, may refer to a logical abstraction corresponding to a geographic area. Each region can include one or more connected data centers. Regions are independent of other regions and can be separated by vast distances.

End-to-End Cross-Region Replication Architecture

End-to-end cross-region replication architecture provides novel techniques for end-to-end file storage replication and security between file systems in different cloud infrastructure regions. In certain embodiments, a file storage service generates deltas between snapshots in a source file system, and transfers the deltas and associated data through a high-throughput object storage to recreate a new snapshot in a target file system located in a different region during disaster recovery. The file storage service utilizes novel techniques to achieve scalable, reliable, and restartable end-to-end replication. Novel techniques are also described to ensure a secure transfer of information and consistency during the end-to-end replication.

In the context of the cloud, a realm refers to a logical collection of one or more regions. Realms are typically isolated from each other and do not share data. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region.

Current practices for disaster recovery can include taking regular snapshots and resyncing them to another filesystem in a different Availability Domain (AD) or region. Although resync is manageable and maintained by customers, it lacks a user interface for viewing progress, is a slow and serialized process, and is not easy to manage as data grow over time.

Accordingly, different approaches are needed to address these challenges and others. The cloud service provider (e.g., Oracle Cloud Infrastructure (OCI)) file storage replication disclosed in the present disclosure is based on incremental snapshots to provide consistent point-in-time view of an entire file system by propagating deltas of changing data from a primary AD in a region to a secondary AD, either in the same or different region. As used herein, a primary site (or source side) may refer to a location where a file system is located (e.g., AD, or region) and initiates a replication process for disaster recovery. A secondary site (or target side) may refer to a location (e.g., AD or region) where a file system receives information from the file system in the primary site during the replication process to become a new operational file system after the disaster recovery. The file system located in the primary site is referred to as the source file system, and the file system located in the secondary site is referred to as the target file system. Thus, the primary site, source side, source region, primary file system or source file system (referring to one of the file systems on the source side) may be used interchangeably. Similarly, the secondary site, target side, target region, secondary file system, or target file system (referring to one of the file systems on the target side) may be used interchangeably.

The File Storage Service (FSS) of the present disclosure supports full disaster recovery for failover or failback with minimal administrative work. Failover is a sequence of actions to make a secondary/target site become primary/ source (i.e., start serving workloads) and may include planned and/or unplanned failover. A planned failover (may also refer to as planned migration) is initiated by a user to execute a planned failover from the source side (e.g., source region) to the target side (e.g., a target region) without data loss. An unplanned failover is when the source side stops unexpectedly due to, for example, a disaster, and the user needs to start using the target side because the source side is lost. A failback is to restore the primary/source side before failover to become the primary/source again. A failback may occur when, after a planned or unplanned failover and the trigger event (e.g., an outage) has ended, users like to reuse the source side as their primary AD by reversing the failover process. The users can resume either from the last point-in-time on the source side prior to the triggering event, or resume from the latest changes on the target side. The replication process described in the present disclosure can preserve the file system identity after a round-trip replication. In other words, the source file system, after performing a failover and then failback, can serve the workload again.

The techniques (e.g., methods, computer-readable medium, and systems) disclosed in the present disclosure include a cross-region replication of file system data and/or metadata by using consistent snapshot information to replicate the deltas between snapshots to multiple remote (or target) regions from a source region, then walking through (or recursively visit) all the keys and values in one or more file trees (e.g. B-trees) of the source file system (sometimes referred to herein as "walking a B-tree" or "walking the keys") to construct coherent information (e.g., the deltas or the differences between keys and values of two snapshots created at different time). The constructed coherent information is put into a blob format and transferred to a remote side (e.g., a target region) using object interface, for example Object Store (to be described later), such that the target file system on the remote side can download immediately and start applying the information once it detects the transferred information on the object interface. The process is accomplished by using a control plane, and the process can be scaled to thousands of file systems and hundreds of replication machines. Both the source file system and the target file system can operate concurrently and asynchronously. Operating concurrently means that the data upload process by the source file system and the data download process by the target file system may occur at the same time. Operating asynchronously means the source file system and the target file system can each operates at their own pace without waiting for each other at every stage, for example, different start time, end time, processing speed, etc.

In certain embodiments, multiple file systems may exist in the same region and are represented by the same B-tree. Each of these file systems in the same region may be replicated across regions independently. For example, file system A may have a set of parallel running replicator threads walking a B-tree to perform replication for file system A. File system B represented by the same B-tree may have another set of such parallel running replicator threads walking the same B-tree to perform replication for file system B.

With respect to security, the cross-region replication is completely secure. Information is securely transferred, and securely applied. The disclosed techniques provide isolation between the source region and the target region such that keys are not shared unencrypted between the two. Thus, if the source keys are comprised, the target is not affected. Additionally, the disclosed techniques include how to read the keys, convert them into certain formats, and upload and download them securely. Different keys are created and used in different regions, so separate keys are created on the target and applied to information in a target-centric security mechanism. For example, the FSS generates a session key, which is valid for only one replication cycle or session, to encrypt data to be uploaded from the source region to the Object Store, and decrypt the data downloaded from the Object Store to the target region. Separate keys are used locally in the source region and the target region.

In the disclosed techniques, each upload and download process through the Object Store during replication has different pipeline stages. For example, the upload process has several pipeline stages, including walking a B-tree to generate deltas, accessing storage IO, and uploading data (or blobs) to the Object Store. The download process has several pipeline stages, including downloading data, applying deltas to snapshots, and storing data in storage. Each of these pipelines also has parallel processing threads to increase the throughput and performance of the replication process. Additionally, the parallel processing threads can take over any failed processing threads and resume the replication process from the point of failure without restarting from the beginning. Thus, the replication process is highly scalable and reliable.

FIG. 1 depicts an exemplary concept of recovery point objective (RPO) and recovery time objective (RTO) for an unplanned failover, according to certain embodiments. RPO is the maximum tolerance for data loss (usually specified as minutes) between the failure of a primary site and the availability of a secondary site. As shown in FIG. 1, the primary site A 102 encounters an unplanned incident at time 110, which triggers a failover replication process by copying the latest snapshot and its deltas to the secondary site B 104. The initially copied information reaches the secondary site B 104 at time 112. The primary site A 102 completes its copying of information to the secondary site B 104 at time 114, and the secondary site B 104 completes its replication process at time 116. Thus, the secondary site B 104 becomes fully operational at time 116. As a result, the user's data is not accessible in the primary site A 110, starting from point 110 until point 116, when that data is available again. Therefore, RPO is the time between point 110 and point 116. For example, if there is 10-minute worth of data that a user does not care about, then RPO is 10 minutes. If the data loss is more than 10 minutes, the RPO is not met. A zero RPO means a synchronous replication.

RTO is the time it takes for the secondary to be fully operational (usually specified as minutes), so a user can access the data again after the failure happens. It is considered from the secondary site's perspective. Referring back to FIG. 1, the primary site A 102 starts the failover replication process at time 120. However, the secondary site B 104 is still operational until time 122 when it is aware of the incident (or outage) at the primary site A 102. Therefore, the secondary site B 104 stops its service at time 122. Using the similar failover replication process described for RPO, the secondary site B 104 becomes fully operational at time 126. Therefore, the RTO is the time between 122 and 126. The secondary site B 104 can now assume the role of the primary site. However, for customers who use primary site A 102, the loss of service is between time 120 and 126.

The primary (or source) site is where the action is happening, and the secondary (or target) site is inactive and not usable until there is a disaster. However, customers can be provided some point in time for them to continue to use for testing-related activities in the secondary site. It's about how customers set up the replication and how they can start using the target when something goes wrong, and how they come back to the source once their sources have failover.

FIG. 2 is a simplified block diagram illustrating an architecture for cross-region remote replication, according to certain embodiments. In FIG. 2, the end-to-end replication architecture illustrated has two regions, a source region 290 and a target region 292. Each region may contain one or more file systems. In certain embodiments, the end-to-end replication architecture includes data planes 202 & 212, control planes (only control APIs 208a-n & 218a-n are shown), local storages 204 & 214, Object Store 260, and Key Management Service (KMS) 250 for both source region 290 and target region 292. FIG. 2 illustrates only one file system 280 in the source region 290, and one file system 282 in the target region 292 for simplicity. If there is more than one file system in a region, the same replication architecture applies to each pair of source and target file systems. In certain embodiments, multiple cross-region replications may occur concurrently between each pair of source and target file systems by utilizing parallel processing threads. In some embodiments, one source file system may be replicated to different target file systems located in the same target region. Additionally, file systems in a region may share resources. For example, KMS 250, Object Store 260, and certain resources in data plane may be shared by many file systems in the same region depending on implementations.

The Data planes in the architecture includes local storage nodes 204a-n & 214a-n and replicators (or a replicator fleet) 206a-n & 216a-n. A control API host in each region does all the orchestration between different regions. The FSS receives a request from a customer to set up a replication between a source file system 280 and a target file system 282 to which the customer wants to move its data. The control plane 208 gets the request, does the resource allocation, and informs the replicator fleet 206a-n in the source data plane 202 to start uploading the data 230a (or may be referred to as deltas being uploaded) from different snapshots to an object storage 260. APIs are available to help customers set replication time objective and recovery time objective (RTO). The replication model disclosed in the present disclosure is a "push based" model based on snapshot deltas, meaning that the source region initiates the replication.

As used herein, the data 230a and 230b transferred between the source file system 280 and the target file system 282 is a general term, and may include the initial snapshot, keys and values of a B-tree that differ between two snapshots, file data (e.g., fmap), snapshot metadata (i.e., a set of snapshot B-tree keys that reflect various snapshots taken in the source file system), and other information (e.g., manifest files) useful for facilitating the replication process.

Turning to the data planes of the cross-region replication architecture, a replicator is a component in the data plane of a file system. It performs either delta generation or delta application for that file system depending on the region where the file system locates. For example, replicator fleet 206 in a source region file system 280 performs delta 230a generation and replication. Replicator fleet 216 in a target region file system 282 downloads deltas 230b and applies them to the latest snapshot in the target region file system 282. The target region file system 282 can also use its control plane and workflows to ensure end-to-end transfer.

All the incremental work is based on the snapshot, an existing resource in file storage as a service. A snapshot is a point in time, data point, or picture of what is happening in the file system, and performed periodically in the source region file system 280. For a very first replication, the FSS takes the base snapshot (e.g., no replication has ever been taken), which is a snapshot of all the content of the source file system, and transfers all of that content to the target system. In other words, replicators read from the storage layer for that specific file system and puts all the data in the object storage buckets.

Once the data plane 202 of the source file system 280 uploads all the data 230a to the object storage (or Object Store) 260, the source side control plane 208 will notify the target side control plane 218 that there is a new work to be done on the target side, which is then relayed to the replicators of the target side. Target side replicators 216a-n then start downloading the objects (e.g., initial snapshot and deltas) from the object storage bucket 260 and applying the deltas captured on the source side.

If it is a base copy (e.g., the whole file system content up to the point of time, for example, ranging from past five days to five years), the upload process may take longer. To help achieve service level objective about time and performance, the source system 280 can take replication snapshot at a specific duration, such as one hour. The source side 280 can then transfer all data within that one hour to the target side 282, and take a new snapshot every one hour. If there are some caches with a lot of changes, the replication may be set to a lower replication interval.

To illustrate the above discussion, consider a scenario that a first snapshot is created in a file system in a source region (called source file system). Replication is performed regularly; thus, the first snapshot is replicated to a file system in a target region (called the target file system). When some updates are performed in the source file system afterward, a second snapshot is created. If an unplanned outage occurs after the second snapshot is created, the source file system will try to replicate the second snapshot to the target file system. During the failover, the source file system may identify the differences (i.e., deltas) between the first and second snapshots, which include the B-tree keys and values and their associated file data in a B-tree representing both the first and second snapshots. The deltas 230a & 230b are then transferred from the source file system to the target file system through an Object Store 260 in the target region for the target file system to re-create the second snapshot by applying the deltas to its previously established first snapshot in the target region. Once the second snapshot is created in the target file system, the replication process of the failover completes, and the target file system is ready to operate.

Turning to control plan and its Application Programming Interfaces ("API"), a control plane provides instructions for data plane which includes replicators as the executor that performs the instructions. Both storage (204 & 214) and replicator fleet (206 & 216) are in the data planes. Control plane is not shown in FIG. 2. As used herein a "cycle" may refer to a time duration beginning at the time when a source file system 280 starts transferring data 230a to a target file system 282 and ending at the time when the target file system 282 receives all data 230b and completes its application of the received data. The data 230a-b is captured on the source side, and then applied on the target side. Once all changes on the target side are applied for a cycle, the source file system 280 takes another snapshot and starts another cycle.

Control APIs (208a-n & 218 a-n) are a set of hosts in the control plane's overall architecture, and perform file system configuration. Control APIs are responsible for communicating state information among different regions. State machines that keep track of various state activities within regions, such as the progress of jobs, locations of keys and future tasks to be performed, are distributed among multiple regions. All of these information is stored in control plane of each region, and are communicated among regions through the control APIs. In other words, the state information is about the lifecycle details, details of the delta, and the lifecycle of the resources. The state machines can also track the progress of the replication and work with the data plan to help estimate the time taken for replication. Thus, the state machines can provide status to the users on whether replications are proceeding on time and the health of jobs.

Additionally, the communication between control APIs (208a-n) of the source file system 280 and control APIs (218a-n) of target file system 218 in different regions includes the transfer of snapshots, and metadata to make exact copies from the source to the target. For example, when a customer takes snapshots periodically in the source file system, the control plane can ensure the same user snapshots are created on the target file system, including metadata tracking, transferring, and recreation.

Object Store 260 (also referred to herein as "Object") in FIG. 2 is an object storage service (e.g., Oracle's object storage service) allowing to read blobs, and write files for archival purposes. The benefits of using Object Store are: first, it is easy to configure; second, it is easy to stream data into the Object Store; and third, it has the benefit of security streaming as a reliable repository to keep information; all because there is no network loss, the data can be immediately downloaded and is permanently there. Although direct communication between Replicators in the source and target regions is possible, direct communication requires a cross-region network setup, which is not scalable and hard to manage.

For example, if there is a large amount of data to be moved from source to target, the source can upload it to the Object Store 260, and the target 282 does not have to wait for all the information to be uploaded to the Object Store 260 to start downloading. Thus, both source 280 and target 282 can operate concurrently and continuously. The use of Object Store allows the system to scale and achieve faster throughput. Furthermore, key management service (KMS) 250 can control the access to the Object Store 260 to ensure security. In other words, the source tries to move the data out of the source region as fast as possible, and persist it somewhere before the data can be applied to the target such that the data is not lost.

Compared to using a network pipe which has packet loss and recovery issues, the utilization of Object Store 260 between the source and target regions enables continuous data streaming that allows hundreds of file systems from the source region to write to the Object Store, while at the same time, the target region can apply hundreds of files concurrently. Thus, the data streaming through the Object Store can achieve high throughput. Additionally, both the source and target regions can operate at their own rates for uploading and downloading.

Whenever a user changes certain data in the source file system 280, a snapshot is taken, and deltas before and after the change is updated. The changes may be accumulated on the source file system 280 and streamed to the Object Store 260. The target file system 282 can detect that data is available in the Object Store 260 and immediately download and apply the changes to its file system. In some embodiments, only the deltas are uploaded to the object storage after the base snapshot.

In some embodiments, replicators can communicate to many different regions (e.g., Phoenix to Ashburn to other remote regions), and the file system can manage many different endpoints on replicators. Each replicator 206 in the source file system 280 can keep a cache of these object storage endpoints, and also works with KMS 250 to generate transfer keys (e.g., session keys) to encrypt data address for the data in the Object Storage 260 (e.g., Server Side Encryption or SSE) to secure data stored in the buckets. One master bucket is for every AD in a target region. A bucket is a container storing objects in a compartment within an Object Storage namespace (tenancy). All remote clients can communicate to a bucket and write information in a particular format so that each file system's information can be uniquely identified to avoid mixing up the data for different customers or file systems.

The Object Store 260 is a high-throughput system and the techniques disclosed in the present disclosure can utilize the Object Store. In certain embodiments, the replication process has several pipeline stages, B-tree walk in the source file system 280, storage IO access, data upload to the Object Store 260, data download from the Object Store 260, and delta application in the target file system 282. Each stage has parallel processing threads involved to increase the performance of data streaming from the source region 290 to a target region 292 through the Object Store 260.

In certain embodiments, each file system in the source region may have a set of replicator threads 206a-n running in parallel to upload deltas to the Object Store 260. Each file system in the target region may also have a set of replicator threads 216a-n running in parallel to download deltas from the Object Store 260. Since both the source side and the target side operate concurrently and asynchronously, the source can upload at fast as possible, while the target can start downloading once it detects the deltas are available in the Object Store. The target file system then applies the deltas to the latest snapshot and deletes the deltas in the Object Store after its application. Thus, the FSS consumes very little space in the Object Store, and the Object Store has very high throughput (e.g., gigabytes of transfer).

In certain embodiments, multiple threads also run in parallel for storage IO access (e.g., DASD) 204a-n & 214a-n. Thus, all processing related to the replication process, including accessing the storage, uploading snapshots and data 230a from the source file system 280 to the Object Store 260, and downloading the snapshots and data 230*b* to the target file system 282, have multiple threads running in parallel to perform the data streaming.

File storage is an AD local service. When a file system is created, it is in a specific AD. For a customer to transfer or replicate data from one file system to another file system within the same region or different regions, an artifact (also referred to as manifest) transfer may need to be used.

As an alternative to transferring data using Object Store, VCN peering may be used to set up network connections between remote machines (e.g., between replicator nodes of source and target) and use Classless Inter-Domain Routing ("CIDR") for each region.

Referring back to FIG. 2, Key Management System (KMS) 250 is a security for the replication, and provides storage service for cloud service providers (e.g., OCI). In certain embodiments, the file systems 280 at the source (or primary) side and target (or secondary) side use separate KMS keys, and the key management is hierarchical. The reason for using separate keys is that if the source is compromised, the bad actor cannot use the same keys to decrypt the target. The FSS has a three-layer key architecture. Because the source and target use different keys when transferring data, the source needs to decrypt the data first, re-encrypt with an intermediate key, and then re-encrypt the data on the target side. FSS defines sessions, and each session is one data cycle. A key is created for that session to transfer data. In other words, a new key is used for each new session. In other embodiments, a key may be used for more than one session (e.g., more than one data transfer) before creating another key. No key is transferred through the Object Store 260, and the keys are available only in the source side, and not visible outside the source for security reasons.

A replication cycle (also referred to as a session) is periodic and adjustable. For example, once every hour, the replicators (206*a-n* & 216*a-n*) perform a replication. A cycle starts when a new snapshot is created in the source side 280, and ends when all deltas 230*b* have been applied in the target side 282 (i.e., the target reaches DONE state). Each session completes before another session starts. Thus, only one session exists at any time, and there is no overlap between sessions.

Secret management (i.e., replication using KMS) handles secret material transfer between the source (primary) file system 290 and the target (or secondary) file system 292 utilizing KMS 250. The source file system 280 computes deltas, reads file data, and then uses local file system encryption keys, and works with Key Management Service to decrypt the file data. Then, the source file system 280 generates a session key (called delta encryption key (DEK)), encrypts it to become an encrypted session key (called delta transfer key (DTK)), and transfers the DTK to the target file system 282 through their respective control planes 208 & 218. The source file system 280 also uses DEK to encrypt data 230*a* and upload them to the Object Store 260 through Transport Layer Security (TLS) protocol. The Object Store 260 then uses server side encryption (SSE) to ensure the security of the data (e.g., deltas, manifests, and metadata) 230*a* for storing.

The target file system 282 obtains the encrypted session key DTK securely through its control plane 218 (using HTTPS via cross-region API communication), decrypts it via KMS 250 to obtain DEK, and places it in a location in the target region 292. When a replication job is scheduled in the target file system 282, the DEK is given to the replicator (one of the replication fleet 216*a-n*), and the replicator uses the key to decrypt the data (e.g., deltas including file data) 230*b* download from the Object Store 260 for application and re-encrypts file data with its local file system keys.

The replication between the source file system 280 and target file system 282 is a concurrent process, and both the source file system 280 and target file system 282 operate at their own pace. When the source side completes the upload, which may occur earlier than the target's download process, the source side cleans up its memory and remove all the keys. When the target completes its application of the deltas to its latest snapshot, it cleans up its memory and removes all keys as well. The FSS service also releases the KMS key. In other words, there are two copies of the session key, one in the source file system 280 and another in the target file system 282. Both copies are removed by the end of each session, and a new session key is generated in the next replication cycle. This process ensures that the same keys are not used for different purposes. Additionally, the session key is encrypted by a file system key to create a double protection. This is to ensure only a particular file system can use this session key.

Figure 3:
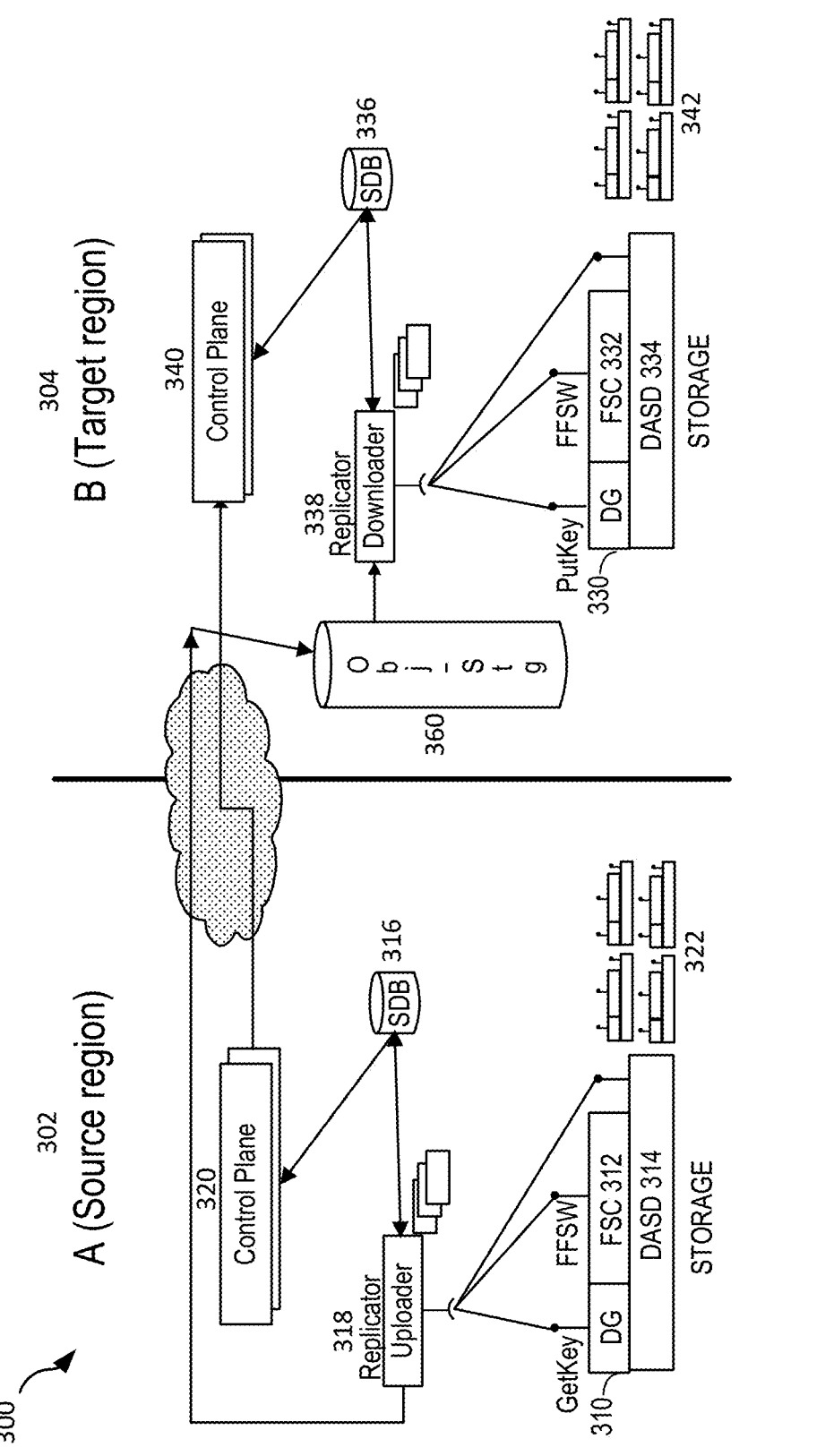
FIG. 3 is a simplified schematic illustration of components involved in cross-region remote replication, according to certain embodiments.

FIG. 3 is a simplified schematic illustration of components involved in cross-region remote replication, according to certain embodiments. In certain embodiments, a component called delta generator (DG) 310 in source region A 302 and 330 in target region B 304 is part of the replicator fleet 318 and runs on thousands of storage nodes in the fleet. A replicator 318 in source region A does Remote Procedural Call (RPC) (e.g., getting key-value set, lock blocks, etc.) to a delta generator 310 to collect B-tree keys and values, and data pages from Direct-Access Storage Device (DASD) 314, which is a replication storage service for accessing the storage, and considered a data server. The DG 310 in source region A is a helper to the replicator 318 to break the key ranges for a delta and pack all the key/values for a given range into a blob to be sent back to the replicator 318. There are multiple storage nodes 322 & 342 attached to DASDs 314 & 334 in both regions, where each node has many disks (e.g., 10 TBs or more).

In certain embodiments, the file system communicators (FSC) 312 & 332 in both regions is a metadata server that helps update the source file system for user updates to the system. FSCs 312 & 332 is used for file system communication, and the delta generator 310 is used for replication. Both the DGs 310 & 330 and the FSCs 312 & 332 are metadata servers. User traffic goes through the FSCs 312 & 332 and DASDs 314 & 334, while replication traffic goes through the DGs. In an alternative embodiment, the FSC's function may be merged into that of DG.

In certain embodiment, a shared databases (SDBs) 316 & 336 of both regions are key-value stores that the components through which both the control plane and data plane (e.g., replicator fleet) can read and write for them to communicate with each other. Control planes 320 & 340 of both regions may queue a new job into their respective shared databases 316 & 336, and replicator fleet 318 & 338 may read the queues in the shared databases 316 & 336 constantly and start file system replication once the replicator fleet 318 & 338 detect the job request. In other words, The shared databases 316 & 336 are a conduit between the replicator fleet and the control planes. Further, the shared databases 316 & 336 are a distributed resource throughout different regions, and the IO traffic to/from the shared databases 316 & 336 should be minimized. Similarly, the IO traffic to/from DASD needs to be minimized to avoid affecting the user's performance. However, the replication process may occasionally be throttled because it is a secondary service, compared to the primary service.

Replicator fleet 318 in source region A can work with DG 310 to start walking B-tree in the file system in source region A to collect key-values and convert them into flat files or blobs to be uploaded to the Object Store. Once the data blobs (including key-values and actual data) are uploaded, the target can immediately apply them without waiting for a large number of blobs to be present in the Object Store 360. The Object Store 360 is located in the target region B for disaster recovery reasons. The goal is to push from source to the target region B as soon as possible and keep the data safe.

There are many replicators to replicate thousands of file systems by utilizing low-cost machines with smaller footprints to optimize the space, and scheduling as many replications as possible while ensuring a fair share of bandwidth among them. Replicator fleet 318 & 338 in both regions run on virtual machines that can be scaled up and down automatically to build an entire fleet for performing replication. The replicators and replication service can dynamically adjust based on the capacity to support each job. If one replicator is heavily loaded, another can pick up to share the load. Different replicators in the fleet can balance load among themselves to ensure the jobs can continue and do not stop due to overloading individual replicators.

Figure 4:
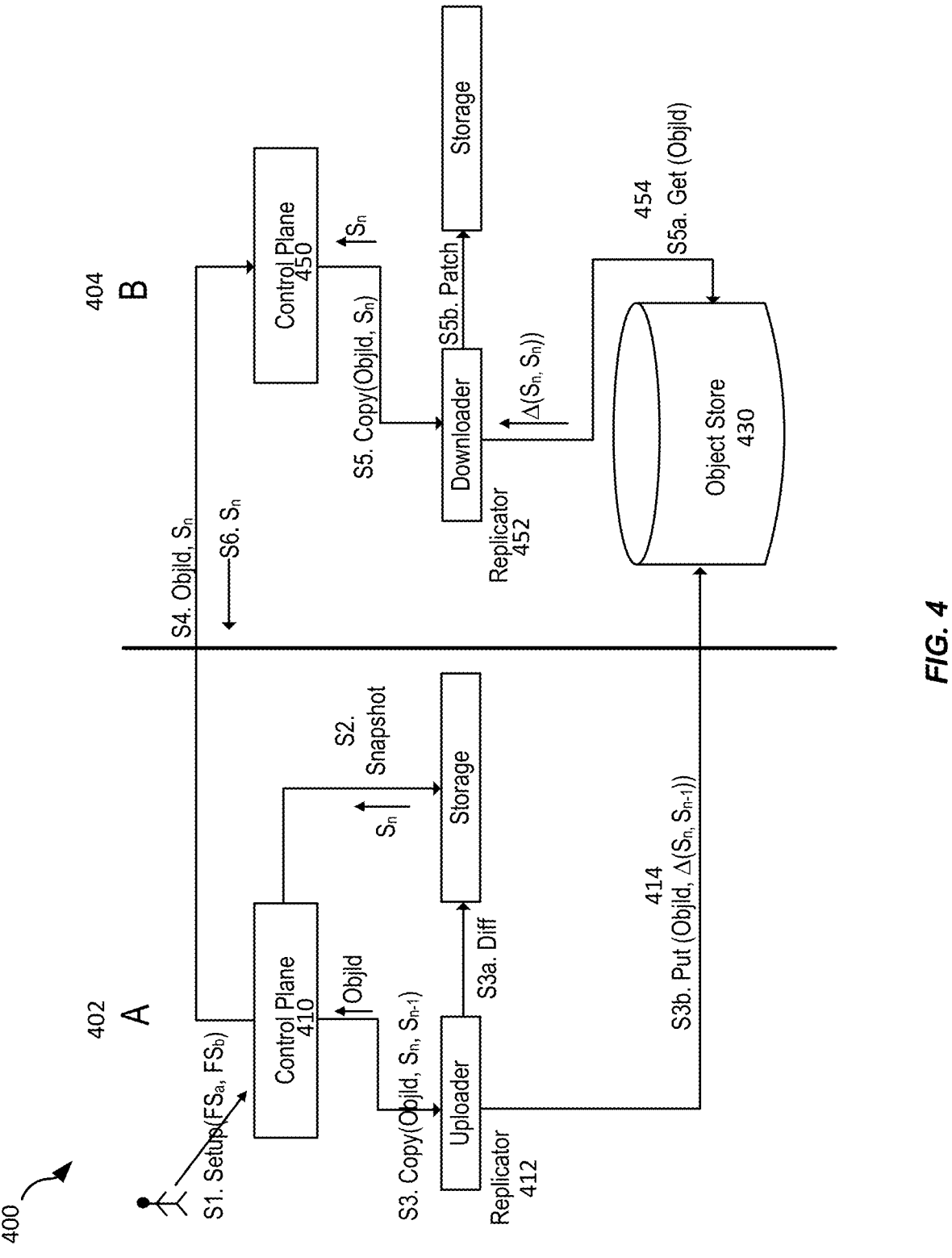
FIG. 4 is a simplified flow diagram illustrating the steps executed during cross-region remote replication, according to certain embodiments.

FIG. 4 is a simplified flow diagram illustrating the steps executed during cross-region remote replication, according to certain embodiments.

Step S1: When a customer sets up replication, the customer provides the source (or primary) file system (A) 402, target (or secondary) file system (B) 404 and the RPO. A file system is uniquely identified by a file system identification (e.g., Oracle Cloud ID or OCID), a globally unique identifier for a file system. Data is stored in the file storage service ("FSS") control plane database.

Step S2: Source (A) control plane (CP-A) 410 orchestrates creating system snapshots periodically at an interval (smaller than RPO) and notifies the data plane (including replicator/uploader 412) the latest snapshot, and the last snapshot that was successfully copied to the target (B) file system 404.

Step S3: CP-A 410 notifies replicator 412 (or uploader), a component in the data plane, to copy the latest snapshot:

S3*a*: Replicator 412 in Source (A) walks the B-Tree to compute the deltas between the two given snapshots. The existing key infrastructure is used to decrypt the file system data.

S3*b*: These deltas 414 are uploaded to the Object Store 430 in target (B) region (the data may be compressed, and/or de-duplicated during the copy). This upload may be performed by multiple replicator threads 412 in parallel.

Step S4: CP-A 410 notifies the target (B) control plane (CP-B) 450 about the completion of the upload.

Step S5: CP-B 450 calls the target replicator-B 452 (or downloader) to apply the deltas:

S5*a*: Replicator-B 452 downloads the data 454 from Object Store 430.

S5*b*: Replicator-B 452 applies these deltas to the target file system (B).

Step S6: CP-A 410 is notified of the new snapshot now available on target (B) after the delta application is complete.

Step 7: The cross-region remote replication process repeats from step S2 to step S6.

Figure 5:
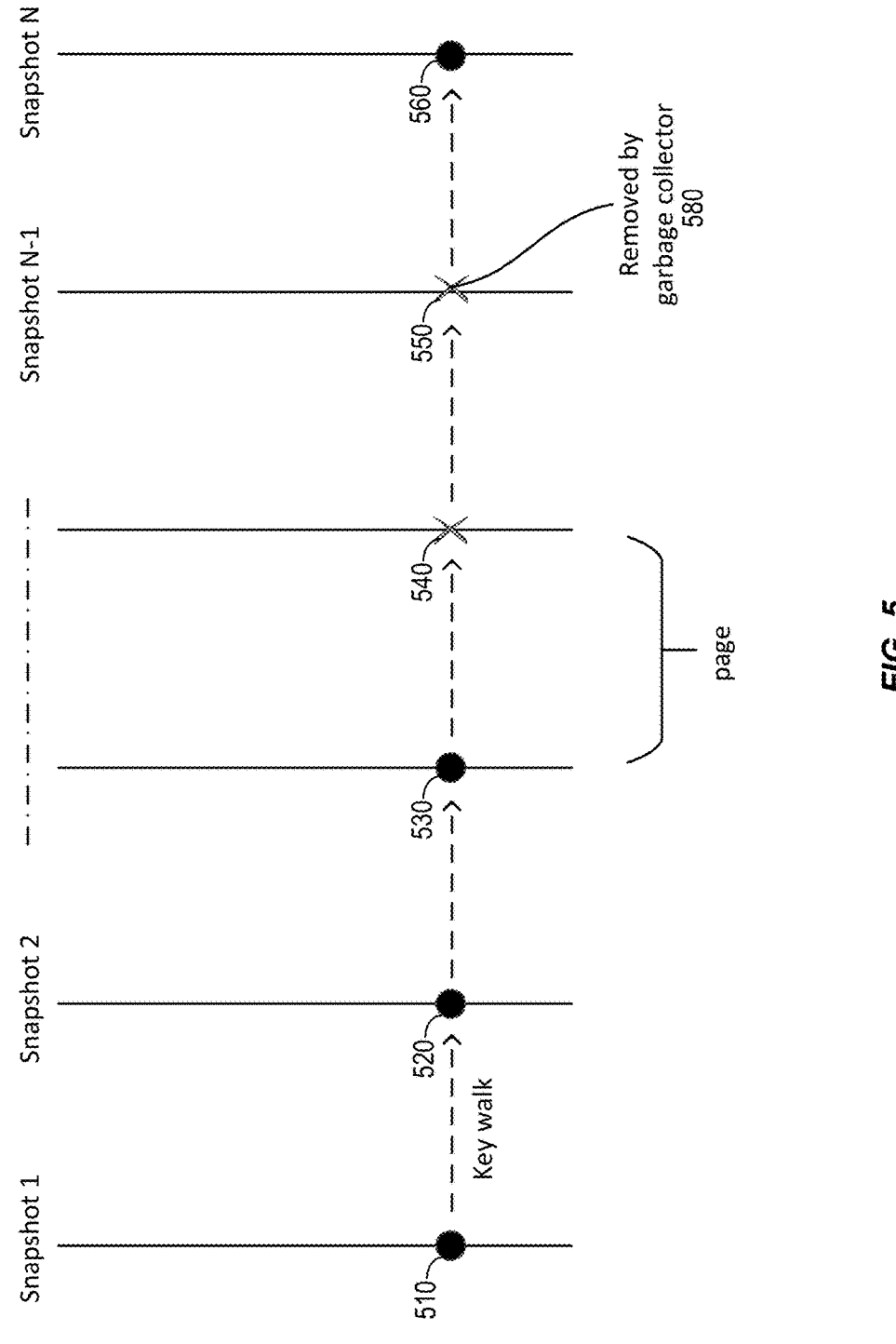
FIG. 5 is a simplified diagram illustrating the high-level concept of B-tree walk, according to certain embodiments.

FIG. 5 is a simplified diagram illustrating the high-level concept of B-tree walk, according to certain embodiments. B-tree structure may be used in a file system. A delta generator walks the B-tree and guarantees consistency for the walk. In other words, the walk ensures that the key-values are what is expected at the end of the walk and captures all information between any two snapshots, such that no data corruption may occur. The file system is a transactional type of file system that may be modified, and the users need to know about the modification and redo the transactions because another user may update the same transaction or data.

Key-values and snapshots are immutable (e.g., cannot be modified except garbage collector can remove them). As illustrated in FIG. 5, there are many snapshots (snapshot 1~snapshot N) in the file systems. When a delta generator is walking the B-tree keys (510~560) in a source file system, snapshots may be removed because a garbage collector 580 may come in to clean the keys of the snapshots that deem as garbage. When a delta generator walks the B-tree keys, it needs to ensure the keys associated with the remaining snapshots (e.g., not removed by the garbage collector) are copied. When keys, for example, 540 and 550, are removed by garbage collector 580, the B-tree pages may shrink, for example from two pages before garbage collection down to one page after garbage collection. The way a delta generator can ensure consistency when walking B-tree keys is to confirm that the garbage collector 580 has not modified or deleted any keys for the page (or a section between two snapshots) that the delta generator has just walked (e.g., between two keys). Once the consistency is confirmed, the delta generator collects the keys and sends them to replicator to process and upload.

The B-tree keys may give a picture of what has changed. The techniques disclosed in the present disclosure can determine what B-tree keys are new and what have been updated between two snapshots. A delta generator may collect the metadata part, keys and values, and associated data, then send to the target. The target can figure out that the received information is between two snapshot ranges and applies in the target file system. After the delta generator (or delta generator threads) walks a section between two keys and confirms its consistency, it uses the last ending key as the next starting key for its next walk. The process is repeated until all keys have been checked, and the delta generator collects the associated data every time consistency is confirmed.

For example, in a file system, when a file is modified (e.g., created, deleted, and then re-created), this process creates several versions of corresponding file directory entries. During a replication process, the garbage collector may clean up (or remove) a version of the file directory entry corresponding to the deleted file and cause a consistency problem called whiteout. Whiteout occurs if there is an inconsistency between the source file system and the target file system, because the target file system may fail to reconstruct the original snapshot chain involving the modified file. The disclosed techniques can ensure the consistency between the source file system and the target file system by detecting a whiteout file (i.e., a modified file affected by garbage collector) during B-tree walk, retrieving an unaffected version of the modified file, and providing relevant information to the target file system during the same replication cycle to properly reconstruct the correct snapshot chain.

Figures 6A, 6B:
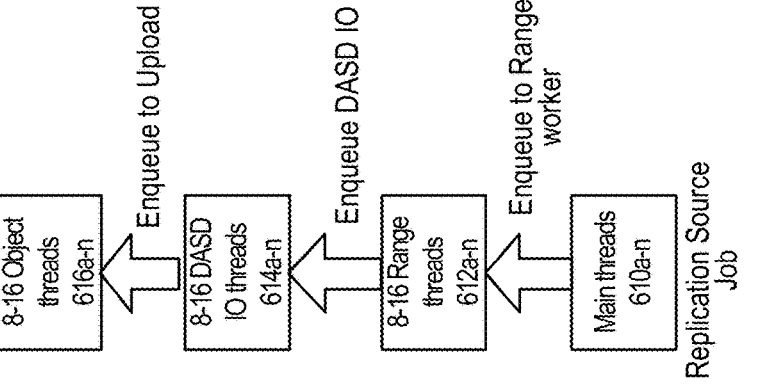
FIG. 6A is a diagram illustrating pipeline stages of cross-region replication, according to certain embodiments.
FIG. 6B is a diagram illustrating pipeline stages of cross-region replication, according to certain embodiments.

FIGS. 6A and 6B are diagrams illustrating pipeline stages of cross-region replication, according to certain embodiments. The cross-region replication for a source file system disclosed in the present disclosure has four pipeline stages, namely initiation of the cross-region replication, B-tree walk in the source file system (i.e., delta generation pipeline stage), storage IO access for retrieving data (i.e., data read pipeline stage), data upload to the Object Store (i.e., data upload pipeline stage), in the source file system. The target file system has similar four pipeline stages but in reverse order, namely preparation of cross-region replication, data download from the Object Store, delta application in the target file system, and storage IO access for storing data. FIG. 6A illustrates the four pipeline stages in the source file system, but a similar concept applies to the target file system. FIG. 6B illustrates the interaction among the processes and components involved in the pipeline stages. All of these pipeline stages may operate in parallel. Each pipeline stage may operate independently and hand off information to the next pipeline stage when the processing in the current stage completes. Each pipeline stage is ensured to take a share of the entire bandwidth and not use more than necessary. In other words, resources are allocated fairly among all jobs. If no other job is working in the system, the working job can get as many resources as possible.

The threads in each pipeline stage also perform their tasks in parallel (or concurrently) and independently of each other in the same pipeline stage (i.e., if a thread fails, it will not affect other threads). Additionally, the tasks (or replication jobs) performed by the threads in each pipeline stage are restartable, which means when a thread fails, a new thread (also referred to as substitute thread) may take over the failed thread to continue the original task from the last successful point.

In some embodiments, a B-tree walk may be performed with parallel processing threads in the source file system 280. A B-tree may be partitioned into multiple key ranges between the first key and the last key in the file system. The number of key ranges may be determined by customers. Multiple range threads (e.g., around 8 to 16) per file system may be used for the B-tree walk. One range thread can perform the B-tree walk for a key range, and all range threads operate concurrently and in parallel. The number of threads to be used depends on factors such as the size of the file system, availability of resources, and bandwidth in order to balance the resource and traffic congestion. The number of key ranges is usually more than the number of range threads available to utilize the range threads fully. Thus, the B-tree walk can be scalable and processed by concurrent parallel walks (e.g., with multiple threads).

If some keys are not consistent after the delta generator walks a page because some keys do not exist, the system may drop a transaction that is in progress and has not been committed yet, and go back to the starting point to walk again. During the repeat B-tree walk due to inconsistency, the delta generator may ignore the missing keys and their associated data by not collecting them to minimize the amount of information to be processed or uploaded to the target side since these associated data are deemed garbage. Thus, the B-tree walk and data transfer can be more efficient. Additionally, a delta generator does not need to wait for the garbage collector to remove the information to be deleted before walking the B-tree keys. For example, keys have dependencies on each other. If a key or an iNode points to a block that is deleted or should be deleted by the garbage collector, the system (or delta generators) can figure out by itself that the particular block is garbage and delta generators do not need to carry it.

Delta generators typically do not modify anything on the source side (e.g., does not delete the keys or blocks of data deemed garbage) but simply does not copy them to the target side. The B-tree walk process and garbage collection are asynchronous processes. For example, when a block of data that a key points to no longer exists, the file system can flag the key as garbage and note that it should not be modified (e.g., immutable), but only the garbage collector can remove it. A delta generator can continue to walk the next key without waiting for the garbage collector. In other words, delta generators and garbage collectors can proceed at their own pace.

In FIG. 6A, when a source region initiates a cross-region replication process, which may involve many file systems, main threads 610*a-n* pick up the replication jobs, one job per file system. A main thread (e.g., 610*a* or 610 for later use) of a file system in the source region (i.e., source file system) communicates to delta generator 620 (shown in FIG. 6B) to obtain the number of key ranges requested by a customer, and update a corresponding record in SDB 622. Once the main thread 610 of the source file system figures out the required number of key ranges, it further creates a set of range threads 612*a-n* based on the required number of key ranges. These range threads 612*a-n* are performed by the delta generator 620. They initialize their GETKEYVAL buffers 640 (shown in FIG. 6B), update their checkpoint records 642 in SDB 622 (shown in FIG. 6B), and perform storage IO access 644 by interacting with DASD IO threads 614*a-n*.

In certain embodiments, each main thread 610 is responsible for overseeing all the range threads 612*a-n* it creates. During the replication, the main thread 610 may generate a master manifest file outlining the whole replication. The range threads 612*a-n* generate a range manifest file including the number of key ranges (i.e., a sub-division of the whole replication), and then checkpoint manifest (CM) files for each range to provide updates to the target file system about the number of blobs per checkpoint, where checkpoints are created during the B-tree walk. One checkpoint is created by a range thread 612. Once the main thread 610 determines all the range threads 612*a-n* have been completed, it creates a final checkpoint manifest (CM) file with an end-of-file marking, and then uploads the CM file to the Object Store for the target file system to figure out the progress in the source file system. The CM file contains a summary of all individual ranges, such as range count, the final state of checkpoint record, and other information.

The range threads 612*a-n* are used for parallel processing to reduce time significantly for the B-tree walk for a big source file system. In certain embodiments, the B-tree keys are partitioned into roughly equal-sized ranges. One range thread can perform the B-tree walk for a key range. The number of range threads 612*a-n* to be used depends on factors such as the size of the file system, availability of resources and bandwidth to balance the resource, amount of data to generate and traffic congestion. The number of key ranges are usually more than the number of range threads 612*a-n* available to fully utilize the range threads, around 2× to 4× ratio. Each of the range threads 612*a-n* has a dedicated buffer (GETKEYVAL) 640 containing available jobs to work on. Each range thread 612 operates independent of other range threads, and updates its checkpoint records 642 in SDB 622 periodically.

When the range threads 612*a-n* are walking the B-tree (i.e., recursively visiting every node of the B-tree), they may need to collect file data associated (e.g., FMAP) with B-tree keys and request IO access 644 to storage. These IO requests are enqueued by each range thread 612 to allow DASD IO threads 614a-n (i.e., data read pipeline stage) to work on them. These DASD IO threads 614a-n are common threads shared by all range threads 612a-n. After DASD IO threads 614a-n have obtained the requested data, the data is put into an output buffer 646 to serialize it into blobs for object threads 616a-n (i.e., data upload pipeline stage) of the replicators to upload to the Object Store located in the target region. Each object thread picks up an upload job that may contain a portion of all data to be uploaded, and all object threads perform the upload in parallel.

Figure 7:
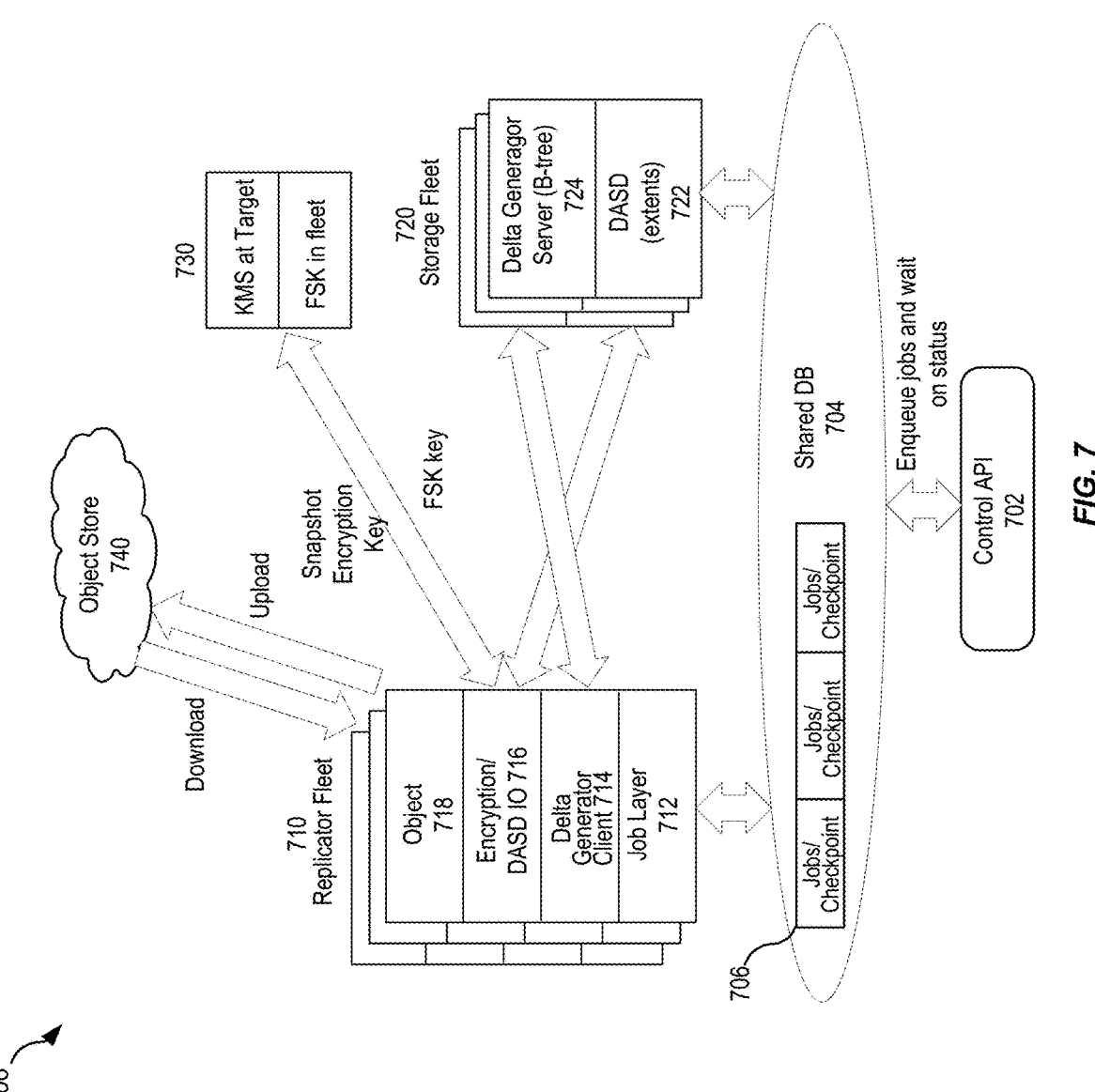
FIG. 7 is a diagram illustrating a layered structure in file storage service (FSS) data plane, according to certain embodiments.

FIG. 7 is a diagram illustrating a layered structure in the FSS data plane, according to certain embodiments. In FIG. 7, the replicator fleet 710 has four layers, job layer 712, delta generator client 714, encryption/DASD IO 716, and Object 718. The replicator fleet 710 is a single process responsible for interacting with the storage fleet 720, KMS 730, and Object Storage 740. In certain embodiments, the job layer 712 polls the SDB 704 for enqueued jobs 706, either upload jobs or download jobs. The replicator fleet 710 includes VMs (or threads) that pick up the enqueue replication jobs to their maximum capacity. Sometimes, a replicator thread may own a part of a replication job, but it will work together with another replicator thread that owns the rest of the same replication job to complete the entire replication job concurrently. The replication jobs performed by the replicator fleet 710 are restartable in that if a replicator thread fails in the middle of replication, another replicator thread can take over and continue from the last successful point to complete the job the failed replicator thread initially owns. If a strayed replicator thread (e.g., fails and wakes up again) conflicts with another replicator thread, FSS can use a mechanism called generation number to avoid the conflict by making both replicator threads update different records.

The delta generator client layer 714 performs B-tree walking by accessing the delta generator server 724, where the B-tree locates, in storage fleet 720. The encryption/DASD IO layer 716 is responsible for security and storage access. After the B-tree walk, the replicator fleet 710 may request IO access through the encryption/DASD IO layer 716 to access DASD extents 722 for file data associated with the deltas identified during the B-tree walk. Both the replicator fleet 710 and storage fleet 720 update control API 702 their status (e.g., checkpoints and leasing for replicator fleet 710) through SDB 704 regularly to allow the control API 702 to trigger alarms or take actions when necessary.

The encryption/DASD IO layer 716 interacts with KMS and FSK fleet 730 at the target side to create session keys (or snapshot encryption key) during a cross-region replication process, and use FSK for encrypting and decrypting the session keys. Finally, object layer 718 is responsible for uploading deltas and file data from the source file system to the Object Store 740 and downloading them to the target file system from the Object Store 740.

The Data plane of FSS is responsible for delta generation. The data plane uses B-tree to store FSS data, and the B-tree has different types of key-value pairs, including but not limited to, leader block, superblock, iNode, file name keys, cookie map (cookie related to directory entries), and block map (for file contents data, also referred to as FMAP).

These B-tree keys are processed by replicators and delta generators in the data plane together. Algorithms for computing the changed key-value pairs (i.e., part of deltas) between two given snapshots in a file system can continuously read the keys, and return the keys back to replicators using transaction budgets, and ensure that transactions are confirmed at the end to get consistent key-value pairs for processing.

In other embodiments, the delta generation and calculation may be scalable. The scalable approach can utilize multiple threads to compute deltas (i.e., the changes of key-value pairs) between two snapshots by breaking a B-tree into many key ranges. A pool of threads (i.e., the delta generators) can perform the scanning of the B-tree (i.e., walking the B-tree) and calculate the deltas in parallel.

Figure 8:
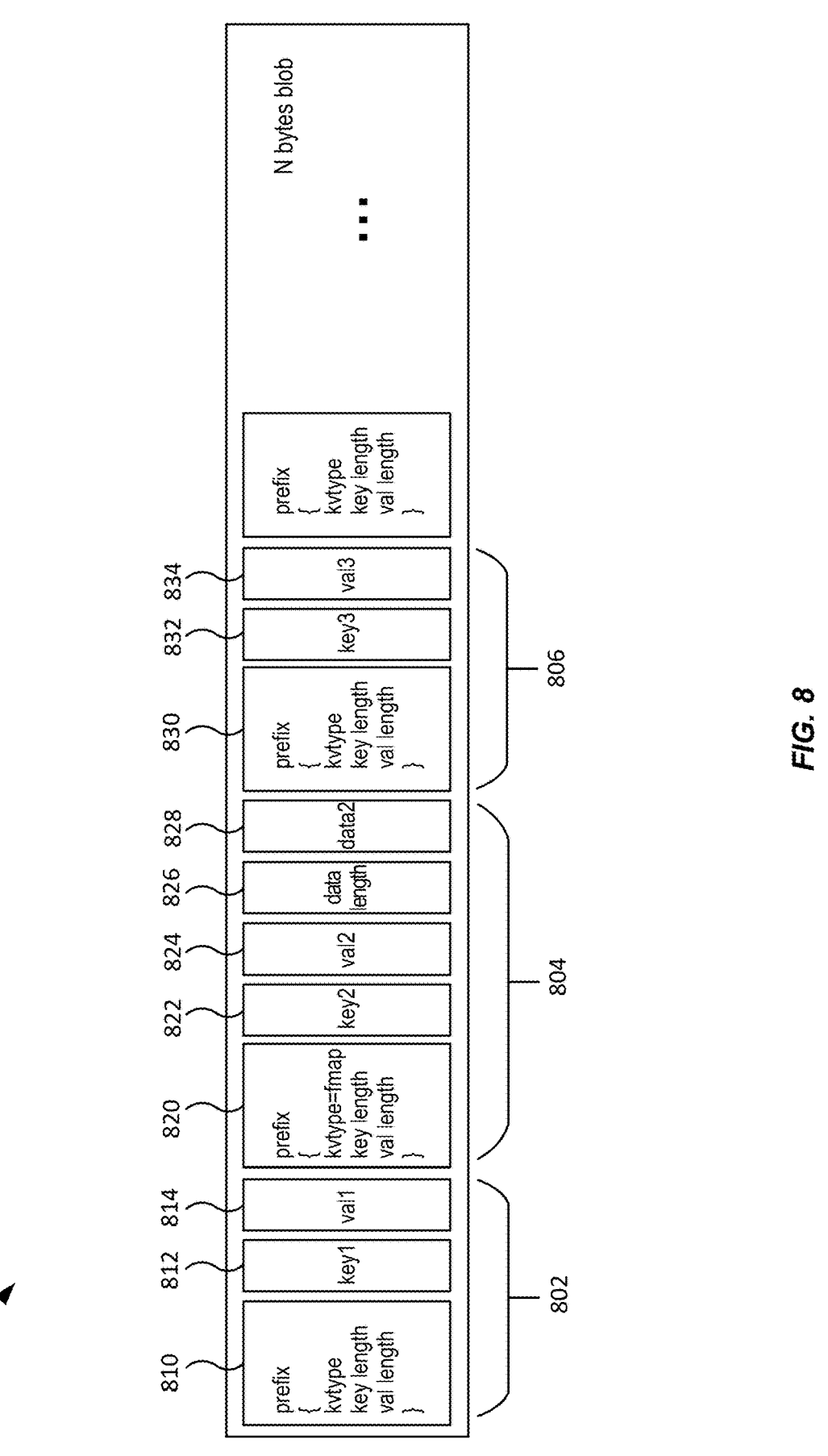
FIG. 8 depicts a simplified example binary large object (BLOB) format, according to certain embodiments.

FIG. 8 depicts a simplified exemplary binary large object (BLOB) format, according to certain embodiments. A blob is a data type for storing information (e.g., binary data) in a database. Blobs are generated during replication by the source region and uploaded to the Object Store. The target region needs to download and apply the blobs. Blobs and objects may be used interchangeably depending on the context.

During the B-tree walk, when a delta generator encounters an iNode and its block map (also referred to as FMAP, data associated with a B-tree key) for a given file (i.e., the data content), the delta generator works with replicators to traverse all the pages in the blocks (FMAP blocks) inside DASD extent that the FMAP points to and read them into a data buffer, decrypt the data using local encryption file key, put into an output buffer to serialize it into blob for replicators to upload to the Object Store. In other words, the delta generators need to collect all FMAPs for an identified delta to get all the data related to the differences between the two snapshots.

A snapshot delta stored in the Object Store may span over many blobs (or objects if stored in the Object Store). The blob format for these blobs has keys, values, and data associated with the keys if they exist. For example, in FIG. 7, the snapshot delta includes at least three blobs, 802, 804 and 806. The first blob 802 has a prefix 810 indicating the key-value type, key length and value length, followed by its key 812 (key1) and value 814 (val1). The second blob 804 has a prefix 820 (key-value type, key length and value length), key 822 (key2), value 824 (val2), data length 826 and data 828 (data2). In the prefix 820 of this second blob 804, its key-value type is fmap because this blob has additional data 828 associated with the key 822. The third blob 830 has a similar format to that of the first blob 810, for example, prefix 830, key 832 (key3), and value 834 (val3).

Data is decrypted, collected, and then written into the blob. All processes are performed parallelly. Multiple blobs can be processed and updated at the same time. Once all processes are done, data can be written into the blob format (shown in FIG. 8), then uploaded to the Object Store with a format or path names (illustrated in FIG. 9).

FIG. 9 depicts an exemplary replication bucket format, according to certain embodiments. A "bucket" may refer to a container storing objects in a compartment within an object storage namespace. In certain embodiments, buckets are used by source replicators to store secured data using server-side encryption (SSE) technique and also used by target replicators to download for applying changes to snapshots. The replication data for all filesystems for a target region may share a bucket in that region.

The data layout of a bucket in the Object Store has a directory structure that includes, but not limited to, file system ID (e.g., Oracle Cloud ID), deltas with starting snapshot number and ending snapshot number, manifest describing the content of the information in the layout of the objects, and blobs. For example, the bucket in FIG. 9 contains two objects 910 & 930. The first object 910 has two deltas 912 & 920. It starts with a path name 911 using the source file system ID as a prefix (e.g., ocid1.filesystem.oc1.iad . . . ), the first delta 912 that is generated from snapshot 1 and snapshot 2, and a second snapshot 920 generated from snapshot 2 and snapshot 3. Each delta has one or more blobs representing the content for that delta. For the first delta 912, it has two blobs 914 & 916 stored in the sequence of their generation. For the second delta 920, it has only one blob 922. Each delta also has a manifest describing the content of the information in the layout of this delta, for example, manifest 918 for the first delta 912 and manifest 924 for the second delta 920. Manifest in a bucket is content that describes the deltas, for example, the file system numbers and snapshot ranges, etc. The manifest may be a master manifest, range manifest or checkpoint manifest, depending on the stage of replication process.

The second object 930 also has two deltas 932 & 940 with a similar format starting with a path name 931. The two objects 910 & 930 in the bucket come from different source regions, IAD for object 910 and PHX for object 930, respectively. Once a blob is applied, the corresponding information in the layout can be removed to reduce space utilization.

A final manifest object (i.e., the checkpoint manifest, CM file) is uploaded from the source region to the Object Store to indicate to the target region that the source file system has completed the snapshot delta upload for a particular object. The source CP will communicate this event to the target CP, where the target CP can inform the target DP via SDB to trigger the download process for that object by target replicators.

The Control plane in a source region or target region orchestrates all of the replication workflows, and drives the replication of data. The control plane performs the following functions: 1) creating system snapshots that are the basis for creating the deltas; 2) deciding when such snapshots need to be created; 3) initiating replication based on the snapshots; 4) monitoring the replication; 5) triggering the deltas to be downloaded by the secondary (or target side), and; 6) indicating to the primary (or source) side that snapshot has reached the secondary.

A file system has a few operations to handle its resources, including, but not limited to, creating, reading, updating, and deleting (CRUD). These operations are generally synchronous within the same region, and take up workflows as the file system gets HTTPS request from API servers, make changes in the backend for creating resources, and get responses back to customers. The resources are split between source and target regions. The states are maintained for the same resources between the source and target regions. Thus, asynchronous communication between the source and target regions exists. Customers can contact the source region to create or update resources, which can be automatically reflected to the secondary or auxiliary resources in the target region. The state machine in control plane also covers recovery in many aspects, including but not limited to, failure in the fleet, key management failure, disk failure, and object failure, etc.

Turning to Application Programming Interface (API) in the control plane, there are different APIs for users to configure the replication. Control APIs for any new resource work only in the region where the object is created. In a target file system, a field called "IsTargetable" in its APIs can be set to ensure that the target file system undergoing replication cannot be accidentally used by a consumer. In other words, setting this field to be false means that although a consumer can see the target file system, no one can export the target file system or access any data in the live system. Any export may change the data because the export is a read/write permission to export, not read-only permission. Thus, export is not allowed to prevent any change to the target file system during the replication process. The consumer can only access data in old snapshots that have already been replicated. All newly created or cloned file systems can have this field set to true. The reason is that a target can only get data from a single source. Otherwise, a collision may occur when data is written or deleted. The system needs to know whether or not the target file system being used is already part of some replication. A "true" setting for the "IsTargetable" field means no replication is on-going, and a "false" setting means the target file system cannot be used.

Regarding cross-region communication between control plane components, a primary resource on the source file system is called application, and an auxiliary (or secondary) source on the target file system is called an application target. When a source object and a target object are created, they have a single replication relationship. Both objects can only be updated from the source side, including changing compartments, editing or deleting details. When a user wants to delete the target side, the replication can be deleted by itself. For a planned failover, the source side can be deleted, and both the source side and target replication are deleted. For an unplanned failover, the source side is not available, so only the target replication can be deleted. In other words, there are two resources for a single replication, and they should be kept in sync. There are various workflows for updating metadata on both the source and target sides. Additionally, retries, failure handling, and cross-region APIs for failover are also part of the cross-region communication process.

When the source creates necessary security and other related artifacts, it uploads to the Object Store, and initiates a job on the target (i.e., notifies the target that a job is available), and the target can start downloading the artifacts (e.g., snapshots or deltas). Thereafter, the target continues to keep looking in the Object Store for an end-of-file marker (also referred to herein as checkpoint manifest (CM) file). The CM file is used as a mechanism for the source side and target side to communicate the completion of the upload of an object during the replication process. At every checkpoint, the source side uploads this CM file containing information, such as the number of blobs that have been uploaded up to this checkpoint, such that the target side can download this number of blobs to apply to its current snapshot. This CM file is a mechanism for the source side to communicate to the target side that the upload of an object to the Object Store is complete for the target to start working on that object. In other words, the target will continue to download until there are no more objects in the Object Storage. Thus, this scheme enables the concurrent processing of both the source side and the target side.

Figure 10:
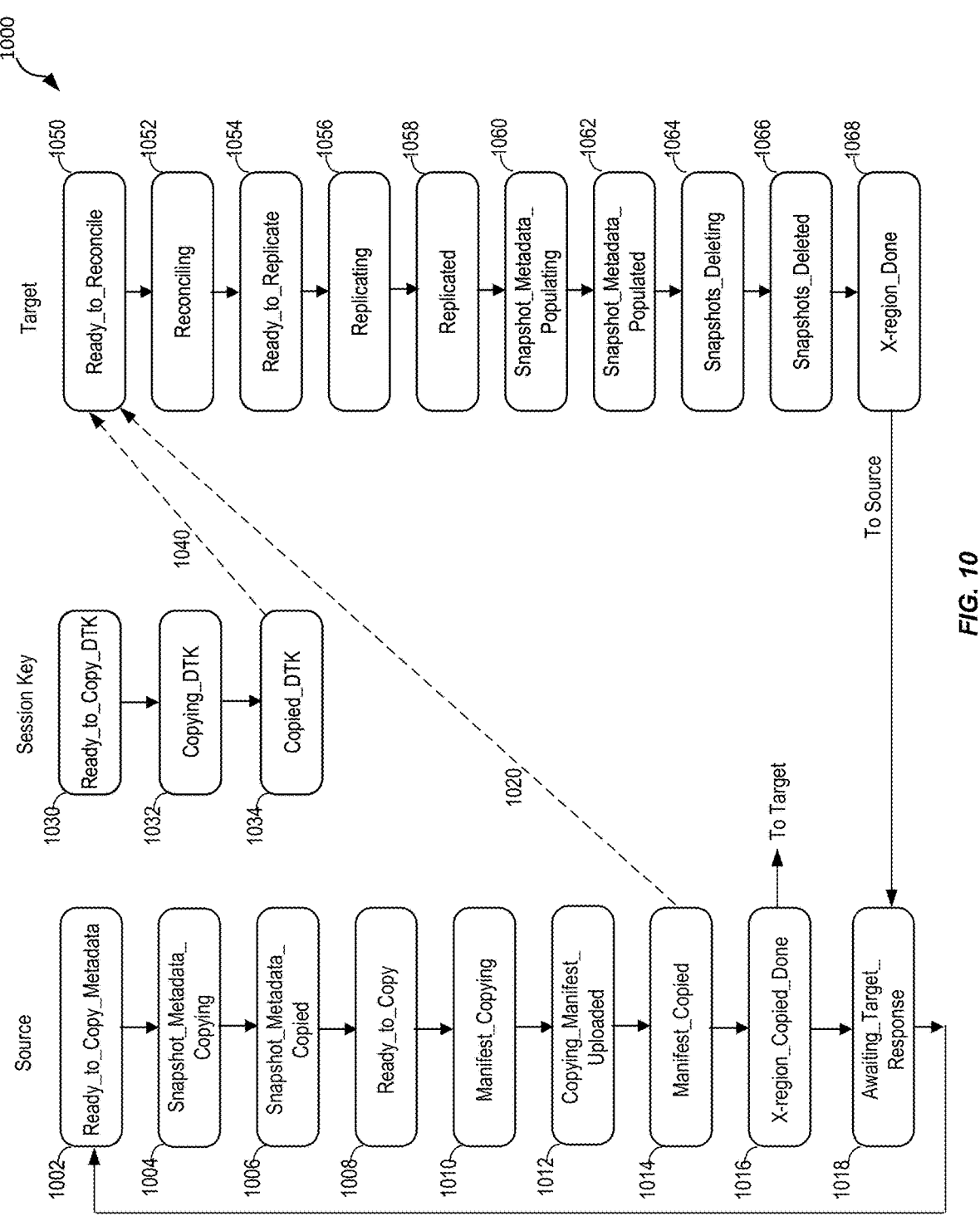
FIG. 10 is a flow chart illustrating state machines for concurrent source upload and target download, according to certain embodiments.

FIG. 10 is a flow chart illustrating state machines for concurrent source upload and target download, according to certain embodiments. As discussed earlier, both the source file system and the target system can perform the replication concurrently and thus have their respective state machines. In certain embodiments, each file system may have its own state machine while sharing some common job level states. In FIG. 10, the source file system has states 1002 to 1018 for performing the data upload plus states 1030 to 1034 for session key generation and transfer. The target file system has states 1050 to 1068 for data download. A session key may be generated at any time in the source file system while the deltas are being uploaded to the Object Storage. Thus, the session key transfer has its own state sequence 1030 to 1034. In FIG. 10, the target file system cannot start the replication download process (i.e., Ready_to_Reconcile state 1050) until it has received the indication that at least an object has been uploaded by the source file system to the Object Storage (i.e., Mainfest_Copied state 1014) and that a session key is ready for it to download (i.e., Copied_DTK state 1034).

In a source file system, several functional blocks, such as snapshot generator, control API and delta monitor, are part of the CP. Replicator fleet is part of the DP. The snapshot generator is responsible for periodically generating snapshots. The delta monitor monitors the progress of the replicators on replication-related tasks, including snapshot creation and replication schedule on a periodic basis. Once the delta monitor detects that the replicator has completed the replication jobs, it moves the states to copied state (e.g., Manifest_Copied state 1014) on the source side or replicated state (e.g., Replicated state 1058) on the target side. In certain embodiments, several file systems can perform replication at the same time from a source region to a target region.

Referring to FIG. 10, in certain embodiments, the source file system, in a concurrent mode state machine, a snapshot generator after creating a snapshot signal to a delta monitor that a snapshot has been generated. The delta monitor, which runs a CP replication state (CpRpSt) workflow, is responsible for initiating snapshot metadata upload to the Object Store on the target side. Snapshot metadata may include snapshot type, snapshot identification information, snapshot time, etc. The CpRpSt workflow sets Ready_to_Copy_Metadata state 1002 for the replicator fleet to begin copying metadata. When a replicator gets a replication job, it makes copies of snapshot metadata (i.e., Snapshot_Metadata_Copying state 1004) and uploads the copies to the Object Store. When all replicators complete the snapshot metadata upload, the state is set to Snapshot_Metadata_Copied state 1006. The CpRpSt workflow then continues polling the source SDB for a session key.

Now the CpRtSt workflow hands over control back to the delta monitor to monitor the delta upload process to move into Ready_to_Copy state 1008, which indicates that the delta computation has been scheduled. Then the source CP API sends a request to a replicator to start the next stage of replication by making copies of manifests along with uploading deltas. A replicator that picks up a replication job can start making copies of manifests (i.e., Mainfest_Copying state 1010). When the source file system completes the manifest copying, it moves to Manifest_Copied state 1014 and, at the same time, notifies the target file system that it can start its internal state (Ready_to_Reconcile state 1050).

As discussed above, the session key may be generated by the source file system while the data upload is in progress. The replicator of the source file system communicates with the target KMS vault to obtain a master key, which may be provided by customers, to create a session key (referred to herein as delta encryption key or DEK). The replicator then uses a local file system key (FSK) to encrypt the session key (now becomes encrypted DEK which is also referred to herein as delta transfer key (DTK)). DTK is then stored in SDB in the source region for reuse by replicator threads during a replication cycle. The state machine moves to Ready_to_Copy DTK state 1030.

The source file system transfers DTK and KMS's resource identification to the target API, which then puts them into SDB in the target region. During this transfer process, the state machine is set to Copying_DTK state 1032. When the CpRpSt workflow in the source file system finishes polling the source SDB for the session key, it sends a notification to the target side signaling the session key (DTK) is ready for the target file system to download and use it to decrypt its downloaded deltas for application. The state machine then moves to Copied_DTK state 1034. The target side replicator retrieves DTK from its SDB and requests KMS's API to decrypt it to become a plain text DEK (i.e., decrypted session key).

When the source file system completes the upload of data for a particular replication cycle, including the session key transfer, its delta monitor notifies the target control API of such status as validation information and enters X-region_Copied_Done state 1016. This may occur before the target file system completes the data download and application. The source file system also cleans up its memory and removes all the keys. The source file system then enters Awaiting_Target_Response state 1018 to wait for a response from the target file system to start a new replication cycle.

As mentioned earlier, the target file system cannot start the replication download process until it has received the indication that at least an object has been uploaded by the source file system (i.e., Mainfest_Copied state 1014) to the Object Storage and that a session key is ready for it to download (i.e., Copied_DTK state 1034). Once these two conditions are satisfied, the state machine moves to Ready_To_Reconcile state 1050. Then, at Reconciling state 1052, the target file system starts a reconciliation process with the source side, such as synchronizing snapshots of the source file system and the target file system, and also performs some internal CP administrative works, including taking snapshots and generating statistics. This internal state involves communication within the target file system between its delta monitor and CP API.

After the reconciliation process is complete, the replication job is passed to the target replicator (i.e., Ready_to_Replicate state 1054). The target replicator monitors a checkpoint manifest (CM) file that will be uploaded by the source file system. The CM file is marked by the target. The target replicator threads then start downloading the manifests and applying the downloaded and decrypted deltas (i.e., Replicating state 1056). The target replicator threads also read the FMAP data blocks from the blobs downloaded from the Object Store, and communicates to local FSK services to get file system key FSK, which is used to re-encrypt each FMAP data block and store it in its local storage.

If the source file system has finished the data upload, it will update a final CM file by setting an end-of-file (eof) field to be true and upload it to the Object Store. As soon as the target file system detects this final CM file, it will finish the download of blobs, apply them, and the state machine moves to Replicated state 1058.

After the target file system applied all deltas (or blobs), it continues to download snapshot metadata from the Object Store and populates the target file system's snapshots with the information of the source file system's snapshots (i.e., Snapshot_metadata_Populating state 1060). Once the target file system's snapshots are populated, the state machine moves to Snapshot_Metadata_Populated state 1062.

At Snapshot_Deleting state 1064, the target file system deletes all the blobs in the Object Store for those that have been downloaded and applied to its latest snapshot. The target control API will then notify the target delta monitor once the blobs in the Object Store have been deleted, and proceeds to Snapshot_Deleted state 1066. The target file system also cleans up its memory and removes all keys as well. The FSS service also releases the KMS key.

When the target DP finishes the delta application and the clean-up, it validates with the target control API about the status of the source file system and whether it has received the X-region_Copied_Done notification from the source file system. If the notification has been received, the target delta monitor enters X-region DONE state 1068 and sends X-region DONE notification to the source file system. In some embodiments, the target file system is also able to detect whether the source file system has completed the upload by checking whether the end of files have been present for all the key ranges and all the upload processing threads because every object uploaded to the Object Store has a special marker, such as end-of-file marker in a CM file.

Referring back to the source file system state machine. While the source file system is in the Awaiting_Target_Response state 1018, it checks whether the status of the target CP has changed to complete to indicate that the application of all downloaded deltas by the target has been applied and file data has been stored locally. If it does, this concludes a cycle of replication.

The source side and target side operate asynchronously. When the source file system completes its replication upload, it notifies the target control API with X-region_Copied_Done notification. When the target file system later completes its replication process, its delta monitor target communicates back to the source control API with X-region DONE notification. The source file system goes back to Ready_to_Copy_Metadata state 1002 to start another replication cycle.

Figure 11:
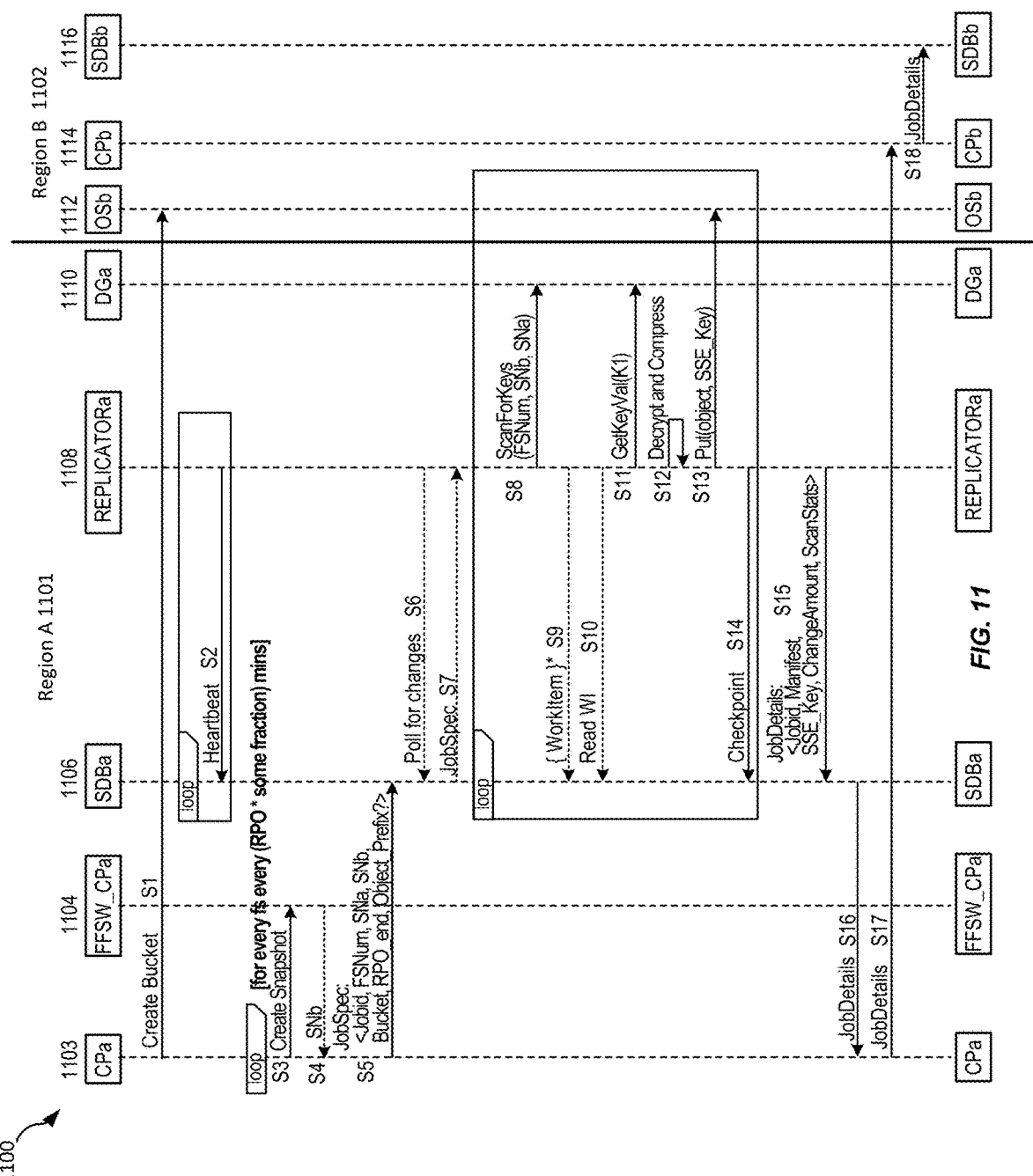
FIG. 11 is an example flow diagram illustrating the interaction between the data plane and control plane in a source region, according to certain embodiments.

FIG. 11 is an exemplary flow diagram illustrating the interaction between the data plane and control plane in a source region, according to certain embodiments. Data plane components and control plane components communicate with each other using a shared database (SDB), for example, 1106. The SDB is a key-value store that both control plane components and data plane components can read and write. Data plane components include replicators and delta generators. The interaction between components in source region A 1101 and target region B 1102 is also illustrated.

In FIG. 11, at step S1, a source control plane (CPa) 1103 requests the Object Store in target region B (OSb) 1112 to create a bucket. At step S2, a source replicator (REPLICATORa) 1108 updates its heartbeat status to the source SDB (SDBa) 1106 regularly. Heartbeat is a concept used to track the replication progress performed by replicators. It uses a mechanism called leasing in which a replicator can keep on updating the heartbeat whenever it works on a job to allow the control plane to be aware of the whole leasing information; for example, the byte count is continuously moving on the job. If a replicator fails to work properly, the heartbeat may become stale, and then another replicator can detect and take over to continue to work on the job left behind. Thus, if a system crash in the middle, the system can start exactly from the last-point-in-time based on the checkpoint mechanism. Checkpoint helps the system know where the last point of progress is to allow it to continue from that point without re-performing the entire work.

At step S3, CPa 1103 also requests file system service workflow (FSW_CPa) 1104 to create a snapshot periodically, and at step S4, FSW_CPa 1104 informs CPa 1103 about the new snapshot. At step S5, CPa 1103 then stores snapshot information in SDBa 1106. At step S6, REPLICATORa 1108 polls SDB 1106 for any changes to existing snapshots, and retrieves job spec at step S7 if a change is detected. At step S8, once REPLICATORa 1108 detects a change to snapshots, this kicks off the replication process. At step S8, REPLICATORa 1108 provides information about two snapshots (SNa and SNb) with changes between them to delta generator (DGa) 1110. At step S9, REPLICATORa 1108 put work items information, such as the number of key ranges, into the SDBa 1106. At step 10, REPLICATORa 1108 checks the replication job queue in SDBa 1106 to obtain work items, and at step S11, assign them to delta generator (DGa) 1110 to scan the B-tree keys of the snapshots (i.e., walking the B-tree) to compute deltas and the corresponding key-value pairs. At step 12, REPLICATORa 1108 decrypts file data associated with the identified B-tree keys, and pack them together with the key-value pairs into blobs. A step 13, REPLICATORa 1108 encrypts the blobs with a session key and uploads them to the OSb 1112 as objects. At step S14, REPLICATORa performs a checkpoint and stores the checkpoint record in SDBa 1106. This replication process (S8 to S14) repeats (as a loop) until all deltas have been identified and data has been uploaded to OSb 1112. At step S15, REPLICATORa 1108 then notifies SDBa 1106 with the replication job details, which is then passed to CPa 1103 at step S16, and further relayed to CPb 1114 as the final CM file at step S17. At step S18, CPb 1114 stores the job details in SDBb 1116.

The interaction between the data plane and control plane in target region B is similar. At the end of the application of deltas to the target file system, the control plane in target region B notifies the control plane in source region A that the snapshot is successfully applied. This enables the control plane in source region A to start all over again with a new snapshot.

Authentication is performed on every component. From replicators to file system key (FSK), an authentication mechanism exists by using replication ID and file system number. The key can be given to a replicator only when it provides the right content. Thus, the authentication mechanism can prevent an imposter from obtaining decryption keys. Other security mechanisms include blocking network ports. A component called file system key server (FSKS) is a gatekeeper for checking appropriator requesters by checking metadata such as the jobs the requesters will perform and other information. For example, suppose a replicator tries to request a key for a file system. In that case, the FSKS can check whether the replicator is associated with a particular job (e.g., a replication is actually associated with that file system) to validate the requester.

Availability addresses the situation that a machine can be restarted automatically after going down or a service continues to be available while software deployments are going on. For example, all replicators are stateless, so losing a replicator is transparent to customers because another replicator can take over to continue working on the jobs. The states of the jobs are kept in a shared database and other reliable locations, not locally. The shared database is a database-like service that the control plane uses to preserve information about file systems, and is based on B-tree.

Storage availability in the FSS of the present disclosure is high because the system has thousands of storage nodes to allow any storage node to perform delta replication. Control plane availability is high by utilizing many machines that can take over each other in case of any failures. For example, replication progress is not hindered simply due to one control plane's failure. Thus, there is no single point of failure. Network access availability utilizes congestion management involving various types of throttling to ensure source nodes are not overloaded.

Replication is durable by utilizing checkpointing, where replication states are written to a shared database, and the replicators are stateless. The replication process is idempotent. Idempotency may refer to deterministic re-application that when an operation fails, the retry of the same operation should work and lead to the same result, by using, for example, the same key, upload process or walking process, etc.

Operations in several areas are idempotent. In the control plane, an action that has been taken needs to be remembered. For example, if an HTTP request repeats itself, an idempotency cache can help remember that the particular operation has been performed and is the same operation. In the data plane, for example, when a block is allocated, the block and the file system file map key are written together. Thus, when the block is allocated again, it can be identified. If the block has been sealed, a write operation will fail. The idempotent mechanism can know that the block was sealed in the past, and the write operation needs not be redone. In yet another example, the idempotent mechanism remembers the chain of the steps required to be performed for a particular key-value processing. In other words, idempotency mechanism allows to check every operation to see if it is in the right state. Therefore, the system can just move on to the next step without repeating.

Atomic replay allows the application of deltas to start as soon as the first delta object reaches the Object Store when snapshots are rolled back, for example, from snapshot 10 back to snapshot 5. To make a replay atomic, the entire deltas need to be preserved in the Object Store before the deltas can be applied.

With respect to scaling of the replicator, the FSS of the present disclosure allows to add as many replication machines (e.g., replicator virtual machines ("VMs")) as needed to support many file systems. The number of replicators may dynamically increase or decrease by taking into account the bandwidth requirement and availability of resources. With respect to scaling storage, thousands of storage can be used to parallelize the process and increase the speed of work. With respect to inter-region bandwidth, bandwidth rationing ensures each workload does not overuse or cross its predefined throughput limit by automatically throttling, such as, throttling all inter-region bandwidth by figuring out the latency increase and slowing down requests. All replicator processors (or threads) have this capability.

For checkpoint storage scaling, uploaders and downloaders checkpoint their progress to persistent storage, and the shared storage is used as a work queue for splitting key range. If checkpoint workloads overwhelm the shared database, checkpoint storage functionality can be added to delta generators for scaling purposes. Current shared database workloads may consume less than 10 IOPs.

Figure 12:
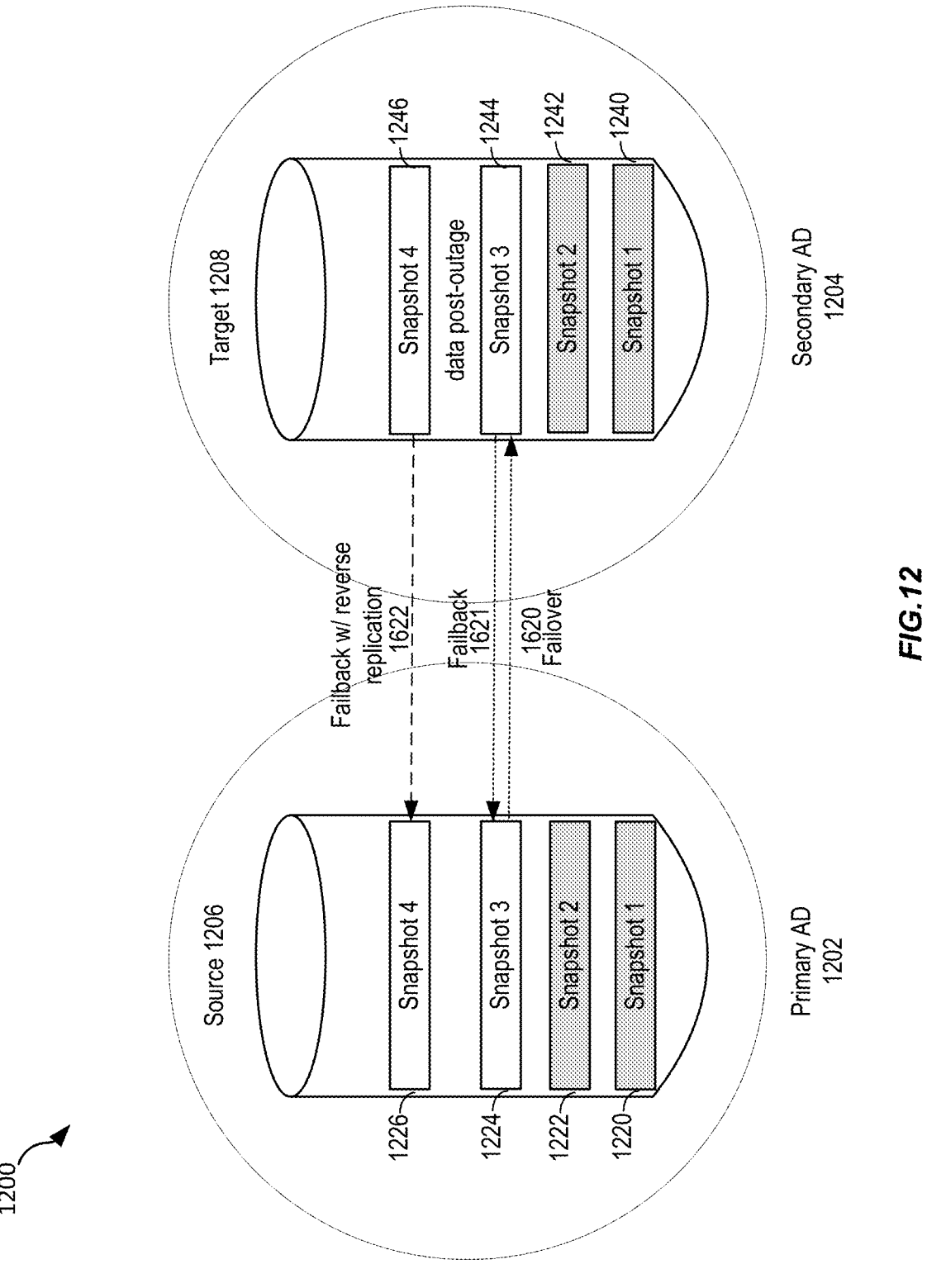
FIG. 12 is a simplified diagram illustrating failback mode, according to certain embodiments.

FIG. 12 is a simplified diagram illustrating failback mode, according to certain embodiments. Failback mode allows restoring the primary/source side before failover to become primary/source again. As shown in FIG. 12, the primary AD 1202 includes a source file system 1206, and the secondary AD 1204 includes a target file system 1208. The secondary AD 1204 may be in the same region or a different region as that of primary AD 1202.

In FIG. 12, snapshot 1 1220 and snapshot 2 1222 in the source file system 1206 exist prior to failover due to an outage event. Similarly, snapshot 1 1240 and snapshot 2 1242 in the target file system 1208 exist prior to failover. When the outage occurred in the primary AD 1202 at snapshot 3 1224, FSS made an unplanned failover 1620, and snapshot 3 1224 in the source file system 1206 was replicated to the target file system 1208 to become a new snapshot 3 1224. After the target file system 1208 went live, a customer might make changes to the target file system 1208, which created a snapshot 4 1246.

If the customer decides to use the source file system again, the FSS service may perform a failback. The user has two options when performing the failback—1) the last point-in-time in the source file system prior to the triggering event 1621, or 2) the latest changes in the target file system 1622.

For the first option, the user can resume from the last point-in-time (i.e., snapshot 3 1224) in the source file system 1206 prior to the triggering event. In other words, snapshot 3 1224 will be the one to use after failback because it previously successfully failed over to the target file system 1208. To perform the failback 1621, the state of the source file system 1206 is changed to not accessible. Then, FSS services identify the last point-in-time in the source file system 1206 prior to the successful failover, which is snapshot 3 1224. FSS may perform a clone (i.e., a duplicate in the same region) of snapshot 3 1224 in the primary AD 1202. Now the primary AD 1202 is back to its initial setup before the outage, and the user can reuse the source file system 1206 again. Because snapshot 3 1224 is already in the file system to be used, no data transfer is required from the secondary AD 1204 to the primary AD 1202.

For the second option, the user wants to reuse the source file system with the latest changes in the target file system 1208. In other words, snapshot 4 1246 in the target file system 1208 will be to one to use after failback because it was the latest change in the target file system 1208. The failback process 1622 for this option involves reverse replication (i.e., reversing the roles of the source file system and the target file system for a replication process), and FSS performs the following steps:

Step 1. the state of the source file system 1206 is changed to not accessible.

Step 2. Then, FSS services identify the latest snapshot in the target file system 1208 that has been successfully replicated, for example, snapshot 3 1244.

Step 3. The FSS services also find the corresponding snapshot 3 1224 in the source file system 1206, and perform a clone (i.e., a duplicate in the same region).

Step 4. The FSS services start a reverse replication 1622 with a similar process as discussed in relation to FIG. 4 but in the reverse direction. In other words, both the source file system 1206 and the target file system 1208 need to synchronize, then the target file system 1208 can upload deltas to an Object Store in the primary AD 1202. The source file system 1206 can download the deltas from the Object Store to complete the application to snapshot 3 1224 to create a new snapshot 4 1226.

Now the primary AD 1202 is back to its initial setup before the outage, and the user can reuse the source file system 1206 again without transferring data that is already in both the source file system 1206 and the target file system 1208, for example, snapshots 1-3 (1220-1224) in the source file system 1206. This saves time and avoids unnecessary bandwidth.

Replication Checkpointing and Data Consistency For Disaster Recovery

As discussed above, delta generation is a time-consuming task, especially for a big file system. When B-tree keys of a source file system are partitioned into many roughly equal size key ranges, each key range may be processed by a range thread of a delta generator of the data plane. Each range thread processing a key range may maintain an active checkpoint record and one or more generation records for tracking the B-tree walk and blob upload process. Both the checkpoint record and generation record for delta generation may be stored in a source shared database (SDB). A checkpoint may refer to and represent the state of the processed deltas at a given point in time for both the source and target file systems, and the delta generation in the source FS or delta application in the target FS should succeed from that point. Both the source FS and target FS are checkpoint-able, meaning both file systems are capable of creating checkpoints after processing a predetermined amount of deltas (e.g., B-tree key-value pairs or converted blobs) or a predetermined time period (e.g., a few minutes), whichever comes first, because the progress and pace of each range thread processing a key range may be different. This disclosure may use the predetermined amount of deltas for simplicity. A generation record may contain generation numbers, where each generation number (GenNum) is associated with a group of blobs processed and uploaded by the range thread. In other words, a generation number may refer to or indicate how many generations a delta generation or application job has gone through in terms of the number of restarts or crashes, or thread ownership changes during the delta generation and application processes of replication. The generation number (GenNum) may be stored in a central location (e.g., source SDB or a central master checkpoint record) that all range threads can access, and use the same GenNum for their respective generation records. Once the delta generation for a key range is completed, the memory space storing the checkpoint record and one or more generation records may be freed up.

Figure 13:
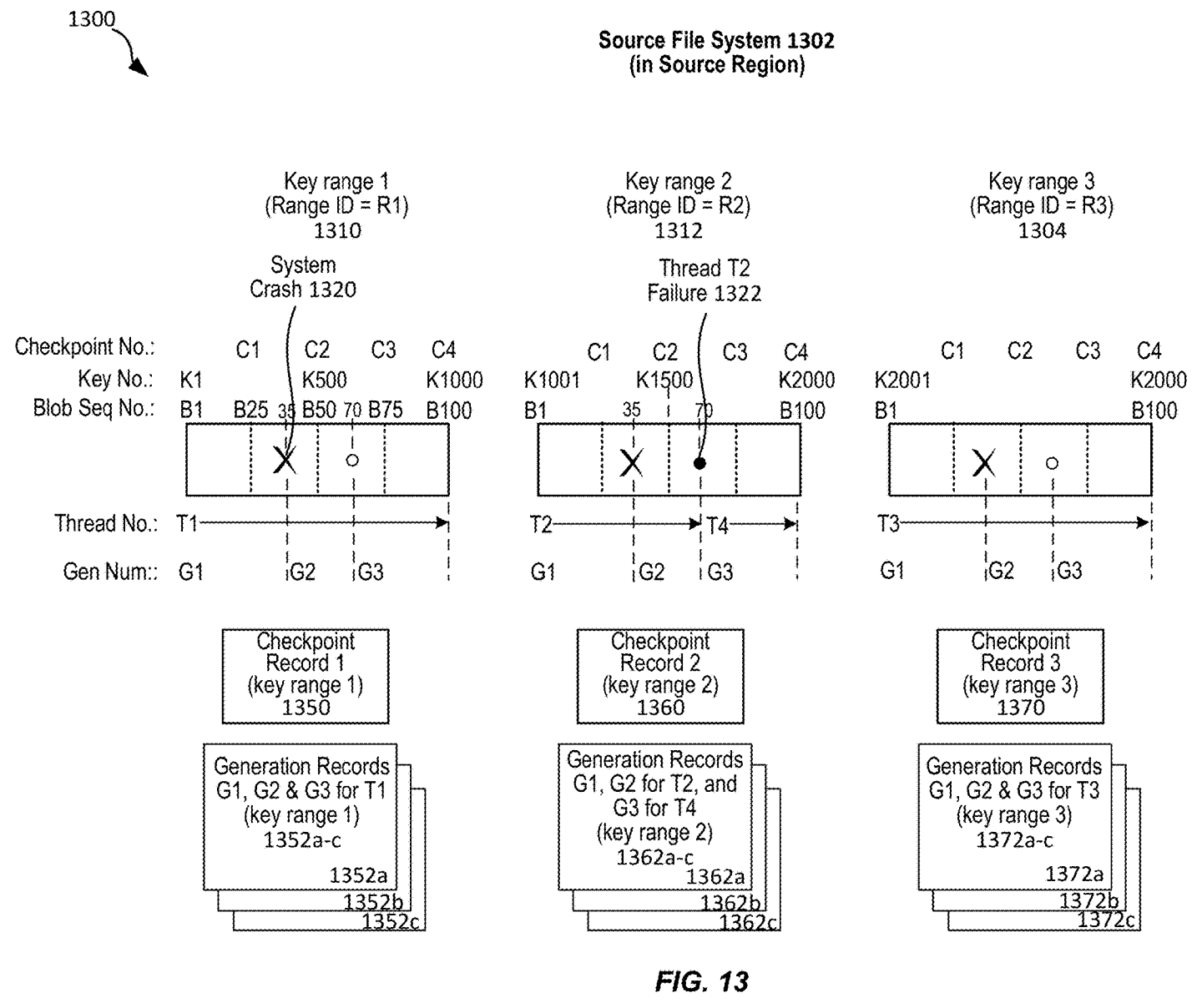

FIG. 13 is a simplified example diagram illustrating key-range processing for delta generation during a cross-region replication, according to certain embodiments. In FIG. 13, the B-tree keys (i.e., the key portion of a key-value pair) of a source file system (FS) 1302 in a source region may have been partitioned into three key ranges, key range 1 (1310), key range 2 (1312), and key range 3 (1314). In some embodiments, each key range may contain 1000 keys, for example, key number K1~K1000 for key range 1. Keys may be converted into blobs for uploading to the Object Store as objects. As discussed earlier in relation to FIG. 8, a blob may contain multiple B-tree key-value pairs (may be simply referred to as keys in the key ranges). Some B-tree keys may have associated file data, and could take up more space in their corresponding blobs. Because each blob size may be fixed, each converted blob may contain a different number of key-value pairs (or keys). As a result, even if each key range has roughly the same number of keys, the same number of keys may be converted into a different number of blobs for different key ranges. For example, a key range with 1000 keys may be converted into 100 blobs for upload. Another key range with 1000 keys may be converted to only 50 blobs for upload because some keys in this key range may have a larger associated data sizes. Yet another key range with 1000 keys may be converted into 200 blobs for upload because most keys in this key range have little associated data. In some embodiments, the key numbers are contiguous after being partitioned into many key ranges. However, the blob sequence numbers for each key range may start from B1 and continue until all keys in that key range are processed because range threads working on different key ranges operate independently and convert keys into blobs for upload at their own pace. Each blob may have a field called key value count (kv_count) to indicate the number of B-tree keys it holds to help the target FS figure out the number of keys the target FS has downloaded and the relation between the downloaded blobs and keys.

For simplicity, FIG. 13 assumes one blob contains 10 keys. Thus, there are 100 blobs per key range, for example, B1-B100 for key range 1, B1-B100 for key range 2, and B1-B100 for key range 3. The key numbers are contiguous with K1-K1000 for key range 1, K1001-2000 for key range 2, and K2001-3000 for key range 3. Each key range is processed by a range thread of a delta generator, and all range threads (T1-T3) process the key ranges concurrently, in parallel, and independently. If a thread fails (e.g., thread T2 1322), a new range thread (e.g., T4) may take over. The range threads work independently because they may not communicate with each other when processing their respective key ranges. The range threads work concurrently and in parallel, because each range thread may process the keys in its corresponding key range simultaneously and without waiting for other range threads since the keys in different key ranges are different. Thus, each range thread can proceed at its own pace for its corresponding key range. Additionally, each blob may include a fixed number of keys. As a result, the source FS can know the equivalent number of keys processed. Furthermore, all key ranges start with generation number (GenNum) G1. The GenNum increases by one whenever the source FS encounters a failure event. In FIG. 13, all key ranges have three GenNums (G1, G2 and G3) because of two failure events, a system crash 1320 and a thread failure 1322.

In some embodiments, each range thread also maintains a checkpoint record (or called range checkpoint record to distinguish from a central master checkpoint record) and one or more generation records created when the delta generation process starts. When a failure event occurs (either a system crash or a thread failure), a new generation record may be created with a new GenNum increased by one from the previous GenNum. Thus, one generation record corresponds to a GenNum. For example, range thread T1 has a checkpoint record 1 (1350) and three generation records (1353a, 1352b and 1352c) for key range 1 because two failure events occur, a system crash and a thread failure in another key range.

Referring to FIG. 13, range thread T2 has a checkpoint record 2 (1360) and three generation records (1362a-c) for key range 2. Two of the generation records (1362a-b) are for T2 because of a system failure, and one (1362c) is for T4 because of thread T2 failure. Range thread T3 has a checkpoint record 3 (1370) and three generation records (1372a-c) for key range 3 because two failure events occur. In each key range, there are four checkpoints (C1, C2, C3 and C4) with each checkpoint covering 25 blobs. For example, checkpoint record 1 is created at point C1 when the range thread T1 for key range 1 has processed 25 blobs (i.e., up to blob number B25). The checkpoint record 1 is updated at point C2 when the range thread T1 processes another 25 blobs to B50, and so on. Because each range thread processes at its own pace and is independent of each other, the checkpoint time for each key range may be different, but the number of blobs processed for each checkpoint is the same; for example, 25 blobs at C1 for key range 1, 25 blobs at C1 for key range 2, and 25 blobs at C1 for key range 3. In some embodiments, a checkpoint may be created after a predetermined time period, rather than a predetermined number of processed blobs.

In certain embodiments, the generation record of each range thread is updated (i.e., increasing generation number, GenNum, by one) whenever there is either a system crash 1320 (or an event that affects all key ranges), for example, between the checkpoints C1 and C2, or a thread failure 1322, for example between checkpoints C2 and C3 for key range 2 only. In both situations, the delta generation process may restart from the most recent checkpoints in all key ranges by all range threads in parallel and concurrently. A system failure affects the whole system and, thus, all key ranges. Therefore, all key ranges are marked with a system failure (i.e., an 'X'). However, a thread failure may occur only for a range thread processing a particular key range. In FIG. 13, range thread T2 fails (i.e., 1322) between checkpoints C2 and C3 (i.e., marked as a solid black dot) in range 2, but no thread failure occurs in other key ranges (i.e., marked as white dot). As a result, a new range thread T4 (also referred to herein as a substitute range thread) takes over, which creates a new generation record (1362*c*) with GenNum G3, accordingly. As shown in FIG. 13, the generation numbers (GenNums) of all generation records change from G1 to G2 when the system failure 1320 occurs, and from G2 to G3 when a thread failure 1322 occurs, because all key ranges perform the same delta generation process. In other words, all range threads maintain the same generation numbers.

In certain embodiments, a failed range thread may occasionally wake up unexpectedly after some time and start processing its key range again. Because a new substitute range thread is also processing the same key range, both the failed range thread and the substitute range thread are updating the same records and generating blobs for uploading to the Object Store. This situation may lead to data corruption. Therefore, a new generation record (e.g., 1362*c*) is created for the substitute range thread T4. The generation number (GenNum) in generation record 1362*c* for thread T4 should start at G3 (i.e., increment from G2 to G3). However, the GenNum in generation record 1362*b* for the old thread T2 is still G2 because it is unaware of its own failure. As a result, the overlap blob number processed and uploaded by both the failed range thread T2 and new substitute range thread T4 may be associated with different GenNums, which allow the target FS to distinguish the blobs processed by threads T2 and T4.

After a checkpoint is created, the information in the checkpoint record and the generation record for each key range may be consolidated and copied into a checkpoint manifest file that is uploaded to the Object Store. The checkpoint manifest file contains the generation number and its associated blob group for the checkpoint of that key range. This checkpoint manifest file may be downloaded by the target file system, which uses the information to download the blobs from the Object Store and apply key-values and file data to its B-tree. The checkpoint manifest file will be described in more detail later. In some embodiments, the blobs for each key range may be uploaded to an Object Storage path for that specific key range, such as/REPL-<JOB ID>/ . . . /RANGE-<RANGE ID>/BLOB-<BLOB SEQNO>-<GENNUM>. The replication-job id indicates the specific replication between the source and target file system. The range id indicates the specific key range for the blob upload. The uploaded blobs are placed in a specific path under the start blob seqno with its associated GenNum.

Although FIG. 13 illustrates the delta generation in the source file system, it may be applicable to the delta application in the target file system because similar key-range processing is performed in the target FS. In some embodiments, the target FS may also have many key ranges with one range thread processing a key range to perform the download of blobs and manifest files from the Object Store. Each range thread also maintains a checkpoint record and a generation record stored in the target shared database (target SDB) during the delta application process in case of any system crash or thread failure.

End-To-End Process Flow

FIG. 14 is a flow chart illustrating an end-to-end process flow for delta generation and delta application during a cross-region replication, according to certain embodiments. In FIG. 14, at step 1410, upon receiving a replication request, a source FS partitions B-tree keys into multiple key ranges in roughly equal size and assigns a range thread to each key range to perform delta generation concurrently and in parallel. At step 1412, the source FS creates a range manifest file containing information, including at least a total number of key ranges, and transfers it to the target FS via the Object Store to inform the target FS about the total number of key ranges being processed by the source FS for the target FS to prepare accordingly. At step 1420, each range thread working on a key range in the source FS creates and updates a checkpoint record and one or more generation records during the delta generation process. These checkpoint records and generation records may be stored in a source SDB. During the delta generation process, each range thread may restart the delta generation process for its responsible key range based on the information in the checkpoint record if a failure event occurs. Additionally, the generation record for each key range may also be updated to resolve potential data corruption for the failure event. The details for the updates to these records will be discussed in more detail later.

At step 1422, after each checkpoint in a key range, the range thread working on that key range may copy and consolidate information in its checkpoint record and generation record into a checkpoint manifest file. At step 1424, each range thread uploads the checkpoint manifest file to the Object Store for the target FS to download. At step 1426, the target FS may download the checkpoint manifest file for each key range, create key ranges mirroring ones in the source FS, download blobs based on the information in the checkpoint manifest file, and clean up the manifest file afterward. When the target FS detects a final checkpoint manifest file with an end-of-file (eof) field set to true for a key range, it knows the group of blobs it will download are for the last checkpoint stage of that key range. At step 1428, each range thread in the target FS may also create and update a checkpoint record and one or more generation records during the delta application process. These checkpoint records and generation records may be stored in a target SDB. At step 1430, the process repeats steps 1420-1428 until all range threads complete delta generation for their responsible key ranges in the source FS, and delta application for their key ranges in the target FS.

Data Consistency for Disaster Recovery

As discussed earlier in relation to FIG. 13, a generation number (GenNum) may be used to resolve potential data corruption between two range threads processing the same key range. In some embodiments, whenever a replicator obtains a replication job, the range threads processing different key ranges are all assigned a GenNum, which is also recorded in a source shared database (SDB). When a new range thread starts, either for a brand-new job or a takeover job, a generation record is created. The new range thread may check the source SDB for the current generation number, and then increase the number by one. Therefore, no two range threads may write to the same generation record. For example, in FIG. 13, when the delta generation process starts, all generation records of range threads (e.g., T1, T2 and T3) are assigned generation number G1. When range thread T2 processing key range 2 fails, for example, time-out (i.e., lease expire) by not updating its heartbeat status, a new substitute range thread T4 may take over, and resume the delta generation process (or restart from the next key after the most recent checkpoint made by thread T2). The new substitute thread T4 may check the source SDB and find that the generation number for thread T2 is G2. Thus, the new substitute thread T4 may set its generation number to G3. As a result, thread T2 and thread T4, although processing the same key range 2, can update different records (e.g., generation record 1362*b* and generation record 1362*c*), and their processed blobs are associated with different generation numbers (G2 and G3). In certain embodiments, the blobs processed and uploaded by thread T2 and thread T4 may be placed in different buffers assigned to different generation numbers. When the target file system downloads the blobs uploaded by both thread T2 and thread T4, the target file system may discard the overlap blob numbers associated with the lower generation number, G2, and use the overlap blob numbers associated with the higher generation number, G3.

FIG. 15 illustrates a generation record for the delta generation and application processes, according to certain embodiments. In FIG. 15, the generation record 1500 may include key-value pairs, one key-value pair per generation record in a key range. The key-value pairs may be stored in a table format (e.g., an in-memory table stored inside the source SDB). In some embodiments, the fields in the key 1510 may include, but not limited to, replication type, replication ID, range ID and generation number (GenNum). The replication type may indicate whether this generation record is for a source file system or a target file system since both file systems have their respective generation records in the same format. For a source file system, the generation record may be used to track the groups of blobs that have been uploaded to the Object Store. For the target file system, the generation record may be used to track the groups of blobs that have downloaded from the Object Store. The replication ID can be either the source file system ID or the target file system ID for identifying the file systems performing the cross-region replication. The range ID indicates the key range that this generation record is associated with. The generation number is the generation (i.e., number of restarts or system failures or thread ownership changes) for which a group of blobs is processed and uploaded by the range thread that owns this generation record. For example, after a delta generation job starts, the processed and uploaded blobs belong to the first generation (i.e., Gen-Num=1). After a system crash and restart, the processed and uploaded blobs belong to the second generation (i.e., Gen-Num=2), and so on.

In FIG. 15, in some embodiments, the fields in the value 1520 may include, but not limited to, start_blob_seqno and end_blob_seqno. These fields represent the start blob sequence number and the end blob sequence number that define a group of blobs associated with a generation number in the key. For example, in table 1530 for thread T1, processing blobs in key range 1 (1310), may have three key-value pairs to represent the three generations of processed blobs by thread T1, as shown in FIG. 13. Not all fields are listed in the tables for simplicity and illustration purpose. The first key-value pair in the first generation record (i.e., 1352*a* in FIG. 13 or the first entry of table 1530) contains a key with range_id R1 and GenNum G1 associated with a group of blobs from sequence number (seqno or blob number) 1 (or B1) to 35 (or B35). When thread T1 completes blob number 35, the system crashes. Therefore, thread T1 creates a second generation record with the GenNum increased by one to G2.Thread T1 may restart the delta generation process for key range 1 from the next key after the prior checkpoint at B25 (shown in FIG. 13), which is B26. Since blobs B25 to B35 have already been processed and uploaded to the Object Store, GenNum G2 only records blobs B36 and later.

The second key-value pair (i.e., second generation record 1352*b* in FIG. 13 or the second entry of table 1530) contains a key with GenNum G2 associated with a group of blobs from blob number 36 to blob number 70, the point when a thread failure occurs in the key range 2 (1312 in FIG. 13). Although the thread failure does not occur in key range 1, the GenNums in all generation records are updated. Therefore, thread T1 creates a third generation record with the GenNum increased by one again to G3. Thread T1 may restart the delta generation process for key range 1 from the next key after the prior checkpoint at B50 (shown in FIG. 13) until it finishes all 100 blobs. Thus, the third key-value pair (i.e., second generation record 1352*c* in FIG. 13) has GenNum G3 and the value representing a group of blobs from blob numbers 71 to 100.

To further illustrate, key range 2 (1312 of FIG. 13) has both the system crash at B35 and thread failure at B70. In FIG. 15, there are two tables. Table 1532 has two entries of key-value pairs representing two generations of processed blobs (i.e., two generation records) by thread T2 in FIG. 13. Table 1534 has one entry of key-value pair representing one generation of processed blobs by thread T4 in FIG. 13. Referring back to FIG. 13, key range 2 has a system crash at B35 and a thread failure for T2 at B70. Therefore, the first generation record (1362*a*) for thread T2 has a first key-value pair with range ID R2 and GenNum G1 associated with a group of blobs from B1 to B35. Then, thread T2 creates the second generation record (1362*b* in FIG. 13 or the second entry of table 1532), increases GenNum by one to G2 and restarts the delta generation process for key range 2 from the next key after a prior checkpoint B25 until it fails at B70. When thread T2 fails, a new substitute thread T4 takes over and creates a new generation record stored in table 1534. Thread T4 checks source SDB and finds that the current GenNum for key range 2 is G2. Therefore, thread T4 creates the third generation record (1362*c* in FIG. 13 or the first entry of table 1534), increases GenNum by one to G3, and picks up from thread T2's failure point B70 to finish all blobs (up to B100) for key range 2. Thus, table 1534 for thread T4 has GenNum G3 associated with blobs B71 to B100.

However, a failed thread may wake up unexpectedly and continue to process blobs. For example, thread T2 that fails at B70 may wake up and continue to process blobs from B70 until B85 when it fails again. As a result, the second key-value pair (or the second generation record) in table 1532 for thread T2 has GenNum G2 associated with blobs from B36 to B85 because it processes additional blobs (B71-B85) after it wakes up unexpectedly after failing. Because threads T2 and T4, both working on the same key range 2 (range_id R2), have different generation records (i.e., tables 1532 and 1534) with different GenNums, this prevents the data corruption on the overlap processed blobs B71-B85 when thread T2 wakes up unexpectedly. When the information in the generation records for key ranges is transferred to the target FS via the Object Store, the target FS may see a group of overlap blobs (B71-B85) between a key-value pair (GenNum=G2, blobs B36-B85) owned by thread T2 and another key-value pair (GenNum=G3, blobs B71-B100) owned by thread T4. Because the overlap blobs (B71-B85) associated with a higher GenNum are recovered blobs, the target FS may download and apply blobs B1-B35 associated with GenNum G1, blobs B36-B70 associated with GenNum G2, and blobs B71-B100 associated with GenNum G3.

FIG. 16 is a flow chart illustrating key-range processing involving generation records for delta generation and application during a cross-region replication, according to certain embodiments. FIG. 16 may expand and illustrate more details on step 1420 in FIG. 14. At step 1610, each range thread working on a key range creates a generation record by assigning a generation number (GenNum) to a group of blobs with a start sequence number and an end sequence number. The range thread processes this group of blobs by identifying deltas (e.g., key-value pairs) from a B-tree of the source FS, converting the deltas into blob format, and uploading the blobs to the Object Store. When a failure event occurs, the range thread may need to identify whether the failure event is a system crash or a thread failure. At step 1612, if the failure event is a system crash (e.g., 1320 in FIG. 13), then at step 1614, the current range thread may create a new generation record and increase the GenNum (e.g., 1510 in FIG. 15) by one (i.e., creating a new generation number). At step 1616, the current thread may check its corresponding checkpoint record, and restart the delta generation process from the next key to be processed after the prior checkpoint. The delta generation restart process may be described in more detail later.

At step 1620, if the failure event is a thread failure (e.g., 1322 in FIG. 13), then at step 1622, a new substitute range thread (e.g., thread T4 in FIG. 13) may take over the failed thread (e.g., thread T2 in FIG. 13), create a new generation record (e.g., table 1534 in FIG. 15), and increase the GenNum by one (e.g., from G2 to G3 as shown in FIGS. 13 & 15). At step 1624, the substitute range thread may check the checkpoint record of the key range 2 (range id R2), and restart the delta generation process from the next key to be processed after the prior checkpoint. After restarting the delta generation process in response to either the system crash or a thread failure, the process may proceed to step 1630. At step 1630, after processing a predetermined number of blobs (or a predetermined time period) fulfilling checkpoint requirements, the active thread (e.g., either T1 or T4) may copy information in the generation record to a checkpoint manifest file for uploading to the Object Store. Replication Checkpointing FIG. 17 illustrates a checkpoint record for the delta generation and application processes, according to certain embodiments. In FIG. 17, the generation record 1700 may include key-value pairs, one key-value pair per checkpoint in a key range. The key-value pairs may be stored in table format. In some embodiments, the fields in the key 1710 may include, but not limited to, replication type, replication ID, and range_ID. The replication type may indicate whether this checkpoint record is for the source file system or the target file system since both file systems have their respective generation records in the same format. The replication ID can be either the source file system ID or the target file system ID for identifying the file systems performing the cross-region replication. Range ID may be the key range identification for this checkpoint record.

In some embodiments, the fields in the value 1720 may include, but not limited to, information in three categories: 1) data that has been processed, 2) locations of the processed keys, and 3) a generation number for cross-referencing between the generation record and this checkpoint record. The first category, information about data that has been processed, may include, but not limited to, the number of objects or blobs uploaded as part of this checkpoint (i.e., num_objects), the number of keys that have been uploaded by the source file system (i.e., num_keys_uploaded) or applied by the target file system (i.e., num_keys_applied), total accumulated delta size (in terms of bytes) that has been uploaded so far for this replication by the source file system (i.e., total_delta_size_uploaded) or applied by the target system (i.e., total_delta_size_applied). For example, each blob may have 100 bytes. Thus, uploading 10 blobs may have a delta size of 1000 bytes. The total_delta_size_uploaded is measured from the beginning of the whole key range. Since the delta generator partitions the B-tree keys into multiple key ranges, the delta generator has information about the number of keys and blobs for each key range. This information can be used to calculate the accumulated delta size when a thread creates a checkpoint record. The second category, locations of the processed keys, may be the next key to start after this checkpoint (next_delta_key) and the last key to be replicated by this source file system (last_delta_key). Finally, the generation number may help cross-reference between the generation record and this checkpoint record because the checkpoint numbers and the generation numbers, which depend on the location of failure events, may be different.

In certain embodiments, each range thread may checkpoint a predetermined number of processed blobs. Each range thread may have different progress, so the range threads may update their respective checkpoint records at different times after completing a predetermined number of processed blobs. In some embodiments, a blob may contain a fixed number of keys. In other embodiments, the number of keys in a blob may vary depending on the implementations. The number of keys (num_keys_uploaded) and blobs (total_delta_size_uploaded) uploaded by the source file system to the Object Store can inform the target file system how many blobs to download for delta application and the progress of the whole replication process. The next key to start after this checkpoint (next_delta_key) can be used when a system crashes, or a thread fails to allow a working range thread to know where to restart the delta generation process in the source file system or the delta application process in the target file system. As an example of checkpoint usage, after creating a checkpoint, a range thread may continue to process B-tree keys for a key range and upload the converted blobs to the Object Store. At some point, a system crash occurs. The range thread may need to restart the delta generation process after the system returns to life. Instead of going back from the beginning of the file system, each range thread only needs to go back to the immediately preceding checkpoint before the crash point, and resume from there.

FIG. 18 is an example checkpoint record in a table format, according to certain embodiments. For simplicity and illustration purpose, not all fields are listed in the tables. Referring to table 1810 in FIG. 18 for thread T1, it has four key-value pairs for four checkpoints (C1, C2, C3 and C4), one for each checkpoint, such as C1 at B25, C2 at B50, C3 at B75, and C4 at B100 as shown in FIG. 13. For the first key-value pair, the key range ID (range_ID) is R1. The number of objects or blobs for this checkpoint is 25. The total number of delta bytes (total_delta_size_uploaded) uploaded by the source file system is also 2500, assuming each blob has 100 bytes. Assuming ten keys in each blob, the total number of keys processed up to this checkpoint is 250. Therefore, the next key to start (next_delta_key) after this checkpoint is 251. The generation number (GenNum) cross-referenced to the generation record for thread T1 is G1, as shown in FIG. 13. Thereafter, thread T1 may continue to process the B-tree keys up to blob B35 when the system crashes, as shown in FIG. 13. After the system recovers, thread T1, by checking the checkpoint record, knows that blobs B1-B25 have been successfully processed and uploaded to the Object Store. Therefore, thread T1 may only need to restart processing the keys from key number K251 (i.e., next_delta_key or the first key in blob B26) after checkpoint C1. When thread T1 processes another 25 blobs, it may create another checkpoint C2. Thus, the value portion of the key-value pair for checkpoint C2 may have the followings: number of objects (num_objects) is 25, total number of blobs uploaded for key range 2 (total_delta_size_uploaded) is 5000, next key to start (next_delta_key) is 501, and GenNum is G2 because a system crash should cause the generation number to increase by one. A similar process is done for checkpoint C3 and checkpoint C4, when thread T1 completes processing all 100 blobs for key range two. The next_delta_key field may not be used for checkpoint C4 because thread T1 has finished processing the last key in key range 1. The checkpoint C4 exists because if a failure event occurs after the range thread for a key range has uploaded all blobs but before its checkpoint manifest file is uploaded to the Object Store, the range thread may use the checkpoint C4 information to resume the generation and upload of the checkpoint manifest file.

Continue in FIG. 18, for key range 2, since a thread failure occurs between checkpoints C2 and C3 as shown in FIG. 13, thread T2 may have already created and updated a checkpoint record as table 1820 for checkpoint numbers C1 and C2. Thread T4, after taking over thread T2, may continue to update the checkpoint record table 1820 for checkpoint numbers C3 and C4 by obtaining a range-level lock (from the replicator or delta generator) for this checkpoint record to prevent the failed thread T2 from performing any unexpected updates. When thread T4 takes over thread T2, it may restart the delta generation process from the next_delta_key K1501 after checkpoint C2 by looking up table 1820 stored in source SDB or summarized information in a central master checkpoint record to be discussed later.

Each checkpoint record of a key range may have a range-level lock for updating the checkpoint record by range threads of that key range. For example, multiple range threads may process a key range if a thread failure occurs. The new substitute thread (i.e., taking over a failed thread) updating the checkpoint record may obtain the range-level lock such that the failed thread cannot update the same record.

Delta Generation Restart and Checkpoint Status Update

Although all range threads perform delta generation for their key ranges concurrently, in parallel and independently, they need to update a progress byte located in a central master checkpoint record, allowing the source file system to coordinate or synchronize all the range threads. The central master checkpoint may be managed by the replicator of data plane. The master checkpoint record with range_ID set to 0 may contain a summary of the source FS processing information, such as generation number, number of checkpoint records the target FS can expect, the total B-tree key count, and B-tree keys that have been processed. This information may be helpful for reporting replication progress to customers. Upon completing a checkpoint, each range thread may take turns obtaining a mutex replication job-level lock for updating the progress byte. After a range thread completes its update, it may release the lock to allow another range thread to update the progress byte. Additionally, the master checkpoint record may need to write the progress byte to the source share database (SDB) periodically for the control plane of the source file system to track the status of the delta generation progress. Thus, all range threads may be blocked from accessing the progress byte periodically (e.g., for a few minutes) for the master checkpoint record to perform a such update to the SDB. This process may be described in FIG. 19 below.

FIG. 19A is a flow chart illustrating a delta generation restart process utilizing checkpoints, according to certain embodiments. FIG. 19B is a flow chart illustrating a synchronization mechanism for checkpoint status updates among all key ranges, according to certain embodiments. Both FIGS. 19A and 19B flow charts expand on step 1420 of FIG. 14 regarding the checkpoint update.

Referring to FIG. 19A for delta generation restart process, in some embodiments, at step 1910, after fulfilling a checkpoint requirement, such as a predetermined requirement for processing binary tree (B-tree) key-value pairs, each range thread of the source file system creates a checkpoint and updates the checkpoint record of its responsible key range. The predetermined requirement may be processing a predetermined number of keys (i.e., B-tree key-values representing the deltas) or the converted blobs in a source FS, or a predetermined time period (e.g., a few minutes), whichever comes first. At step 1912, each range thread continues to process B-tree keys and create blobs for uploading to the Object Store.

At step 1920, upon encountering a failure event, the process checks whether it is a system crash or thread failure. If the failure event is a thread failure (e.g., thread T2 in FIG. 13), the process goes through an additional step by proceeding to step 1922, where a new thread may take over the failed thread by obtaining the ownership of the checkpoint record before restarting the delta generation process. Additionally, as mentioned in relation to generation record, the new thread also creates a new generation record with a GenNum incremented by one. Otherwise (i.e., non-thread failure event), the process proceeds to step 1924, where all active range threads, including the new thread, restart from the next_delta_key (i.e., B-tree key) after their respective most recent checkpoints in parallel and concurrently by checking and using the next_delta_key field in the checkpoint record. For example, when the failure event occurs between checkpoints C1 and C2, all range threads can restart from the next_delta_key of checkpoint C1 in their respective checkpoint tables. Suppose the failure event is a system crash (1320 of FIG. 13); thread T1 can restart at key number 251 by checking table 1810 (referring to FIG. 18). If the failure event is a thread failure (1322 of FIG. 13), such as thread T2, thread T4 can restart at key number K1501 by checking table 1820 (referring to FIG. 18) after taking over thread T2 at B170 (shown in FIG. 13) and obtaining ownership of this checkpoint record. At step 1926, the process may repeat steps 1910-1924 until all keys in each key range have been processed by its responsible range thread.

Referring to FIG. 19B for checkpoint status update process, in some embodiments, at step 1940, after fulfilling a checkpoint requirement, such as a predetermined requirement for processing binary tree (B-tree) key-value pairs, each range thread of the source file system creates a checkpoint and updates the checkpoint record of its responsible key range. At step 1942, a range thread that creates a checkpoint first (called cp-first thread) may request and obtain a lock from (or is granted the lock by) a lock manager of a central master checkpoint record to update a progress byte, and all other range threads may wait until the cp-first thread completes the update and releases the lock. This is to ensure only one range thread can update the progress byte at a time. At step 1944, all other range threads finishing their respective checkpoints may take turns to obtain the lock and update the status byte. In some embodiments, if two or more threads request the lock at the same time, a conflict resolution policy may be used to resolve such conflict. The conflict resolution policy may include, but not limited to, round robin mechanism, the priority of thread, first-come-first-serve, etc. For example, a round-robin mechanism may be used to select a requesting thread based on the thread IDs of these requesting threads, such as selecting a lower thread ID associated with a thread that starts the delta generation process earlier. The priority of thread may select a range thread designated as a higher priority if applicable. The requests may be queued and serviced to obtain the lock. In certain embodiments, when the threads are waiting to update the progress byte, they can still continue to process the keys in their responsible key ranges.

At step 1946, after updating the central master checkpoint record, the cp-first thread continues its delta generation process for the next checkpoint stage for its responsible key range while other threads are updating the central master checkpoint record. Because each thread proceeds at its own pace, the cp-first thread that obtains the lock in the next checkpoint stage may be a different thread. For example, in FIG. 13, suppose thread T1 reaches checkpoint C1 first (i.e., cp-first thread) in key range 1 (1310) and obtains a lock, then threads T2 and T3 may wait for the lock to be released later. After T1 finishes updating the progress byte, it moves on to the next checkpoint stage to create checkpoint C2 in key range 1; the threads T2 & T3 may take turns obtaining the lock and updating the progress byte. Suppose after updating the progress byte, thread T3 processes faster in the next checkpoint stage and reaches checkpoint C2 in key range 3 (1304) first, which becomes the cp-first thread for checkpoint C2 stage; thread T3 can obtain the lock, and threads T1 and T2 may need to wait for the lock to be released. At step 1948, the process repeats steps 1940~1946 for the remaining checkpoint stage until all range threads complete the delta generation for all key ranges.

A target file system, when performing delta application, may also utilize the same restart process, such as a new substitute thread taking over the ownership of a checkpoint record from a failed thread, and synchronization mechanism for checkpoint status update among its range threads.

Checkpoint Manifest File

As discussed earlier in relation to FIG. 14, the checkpoint record and generation record for each key range may be consolidated to create a checkpoint manifest file after each checkpoint and uploaded to the Object Store by the responsible range thread as a manifest blob. The manifest blob may be uploaded by a range thread after all delta blobs for a checkpoint have been uploaded. Once the target FS detects the presence of a checkpoint manifest blob in the Object Store, the target FS may download the checkpoint manifest blob first, read and use the information in this checkpoint manifest to download the number of the delta blobs uploaded by the source FS, and apply to the corresponding key range in the target FS. The above process continues until the target FS receives a manifest blob with an end-of-file (eof) field set to true, signaling the checkpoint stage of a key range. This checkpoint manifest blob serves as a communication between the source and target file systems with concise information.

FIG. 20 is an example checkpoint manifest file, according to certain embodiments. In some embodiments, the fields in a checkpoint manifest file may include, but not limited to, the number of objects or blobs uploaded as part of this checkpoint (i.e., num_objects), the number of keys that have been uploaded by the source file system (i.e., num_keys_uploaded) or applied by the target file system (i.e., num_keys_applied), total accumulated delta size (in terms of blobs) that has been uploaded so far for this replication by the source file system (i.e., total_delta_size_uploaded) or applied by the target file system (i.e., total_delta_size_applied). Source replication ID (i.e., src_repl_id) and target replication ID (i.e., tgt_repl_id) are used for identifying a particular replication job between the source FS and the target FS. Total accumulated delta size (in terms of bytes) that has been uploaded so far for this replication by the source file system (i.e., total_delta_size_uploaded) or applied by the target FS (i.e., total_delta_size_applied) can help the target to confirm the deltas it has received and applied. The key range used for generating this manifest file (i.e., range_ID) and the total number of range threads (i.e., total_sub_tasks) working on this key range can help the target FS figure out whether more than one thread has worked on this key range, for example, in the event of a failed thread. End-of-file setting (i.e., eof) can help the target FS to track the end of a key range. Finally, the latest generation number (i.e., latest_gennum) and an array of a list of generation numbers (i.e., GenNums) with a corresponding list of blob sequence numbers (i.e., start_blob_segno and end_blob_segno) to track failure events and avoid potential data corruption during the replication process, as discussed in relation to FIG. 15 regarding the generation record. The checkpoint manifest blob has an array of GenNums and groups of blob sequence numbers because multiple failure events may occur during a checkpoint stage.

The checkpoint manifest file may help the target FS figure out the blobs available to download, the progress of the replication process, and resolve potential data corruption issues, as discussed earlier in relation to FIG. 13. Take key range 2 that has a thread failure (e.g., thread T2 at B70 shown in FIG. 13) as an example. Referring to FIG. 20, by the time the delta generation for the key range 2 is complete, this key range may have uploaded the following four checkpoint manifest files/blobs to the Object Store (also refer to FIG. 13 for key range 2 (1312) and FIG. 18 for threads T2 & T4):

First checkpoint manifest blob for C1 (created by thread T2):
    num_objects=25,
    delta_size_uploaded=2500, (assuming 100 bytes per blob)
    total_sub_tasks=1,
    range_id=R2,
    eof=0,
    latest_gennum=G1,
    [G1: start_blob_segno, end_blob_segno)=(1, 25)]
Second checkpoint manifest blob for C2 (created by thread T2):
    num_objects=25,
    delta_size_uploaded=5000,
    total_sub_tasks=1,
    range_id=R2,
    eof=0,
    latest_gennum=G2,
    [G1: (start_blob_segno, end_blob_segno)=(26, 35)]
    [G2: (start_blob_segno, end_blob_segno)=(36, 50)]
Third checkpoint manifest blob for C3 (created by thread T4):
    num_objects=25,
    delta_size_uploaded=7500, total_sub_tasks=2,
range_id=R2,
eof=0,
latest_gennum=G3,
[G2: (start_blob_segno, end_blob_segno)=(51, 70)]
[G3: (start_blob_segno, end_blob_segno)=(71, 75)]
Fourth checkpoint manifest blob for C4 (created by thread
T4):
num_objects=25,
delta_size_uploaded=10000,
total_sub_tasks=2,
range_id=R2,
eof=1,
latest_gennum=G3,
[G3: (start_blob_segno, end_blob_segno)=(76, 100)]
For example, when the target FS receives the second
checkpoint manifest blob for checkpoint C2 of key range2
(range ID R2), the target FS knows it needs to download 25
blobs from the Object Store based on the num_objects field,
and it should have received total 5000 bytes for this key
range so far based on delta_size_uploaded field. Only one
range thread is working on this key range, which is T2, based
on the total_sub_tasks field. These 25 blobs the target FS
plans to download are not the last group of blobs for this key
range, based on the eof field. Finally, this group of blobs
belongs to a generation number G1 associated with sequence
numbers between 26 and 35, and a generation number G2
associated with sequence numbers between 36 and 50,
because a system crash occurred at B35.

When the target FS receives the third checkpoint manifest
blob for C3, the information can help the target FS find out
a failure event occurs in the source FS during the delta
generation process. Based on the total_sub_tasks, range_id,
and GenNum fields, the target FS may know that thread T4
is a substitute thread, which is a second range thread
working on this key range, because the latest generation
number (latest_gennum) has increased from G2 to G3. The
25 blobs the target FS plans to download belong to GenNum
G2 associated with blob sequence numbers between 51 and
70, and GenNum G3 associated with sequence numbers
between 71 and 75. If the failed thread T2 wakes unexpect-
edly after B70 (referring to FIG. 13) and also uploads
another checkpoint manifest blob for C3, but fails again,
then the target FS may receive a fifth checkpoint manifest
blob uploaded by thread T2, although the timing is uncer-
tain:
Fifth checkpoint manifest blob for C3 (by thread T2):
num_objects=25,
delta_size_uploaded=7500,
total_sub_tasks=1,
range_id=R2,
latest_gennum=G2,
eof=0,
[G2: (start_blob_segno, end_blob_segno)=(51, 75)]
The third and fifth checkpoint manifest blobs have over-
lap blob_segnos (51-70 and 71-75). Because this fifth check-
point manifest blob has smaller GenNum G2 for blobs
B71-B75 (by the failed thread T2), the target FS should
discard this group of blobs and use the recovered blobs
B71-B75 (by thread T4) that are associated with GenNum
G3, as discussed earlier in relation to FIG. 15. When the new
substitute thread T4 takes over the failed thread T2, it may
find out from the checkpoint record that a checkpoint
manifest file has not been generated and uploaded. Thread
T4 may proceed to generate and upload a converted check-
point manifest blob and update the checkpoint record indi-
cating that a manifest file has been uploaded. Although the failed thread T2 may upload a checkpoint manifest blob after
it wakes up, it may not be able to update the checkpoint
record for key range 2 and thus cannot generate any check-
point manifest file in the future. For example, if thread T2
wakes up before its job lease expires, it cannot update the
checkpoint record because the ownership of the checkpoint
record changed after thread T4 took over. If thread T2 wakes
up after its job lease has expired, it cannot renew to extend
the lease because thread T4 has taken over the delta gen-
eration job. The checkpoint record ownership and job leas-
ing mechanism may be coordinated between the data plane
(e.g., replicator, delta generator, and range threads), source
SDB, and control plane.

When the target FS receives the fourth checkpoint mani-
fest blob, it knows this is the last group of 25 blobs for this
key range because the eof field is set to one. Once the target
FS downloads the manifest blob and applies the delta blobs
for each checkpoint, it may delete the manifest blobs in the
Object Store to leave more space for future blob uploads by
the source FS. Additionally, in some embodiments, in the
source FS, the checkpoint and one or more generation
records may be deleted in the source SDB once the check-
point manifest file has been created to increase resource
utilization.

Example Cloud Architectures

As noted above, infrastructure as a service (IaaS) is one
particular type of cloud computing. IaaS can be configured
to provide virtualized computing resources over a public
network (e.g., the Internet). In an IaaS model, a cloud
computing provider can host the infrastructure components
(e.g., servers, storage devices, network nodes (e.g., hard-
ware), deployment software, platform virtualization (e.g., a
hypervisor layer), or the like). In some cases, an IaaS
provider may also supply a variety of services to accompany
those infrastructure components (example services include
billing software, monitoring software, logging software,
load balancing software, clustering software, etc.). Thus, as
these services may be policy-driven, IaaS users may be able
to implement policies to drive load balancing to maintain
application availability and performance.

In some instances, IaaS customers may access resources
and services through a wide area network (WAN), such as
the Internet, and can use the cloud provider's services to
install the remaining elements of an application stack. For
example, the user can log in to the IaaS platform to create
virtual machines (VMs), install operating systems (OSs) on
each VM, deploy middleware such as databases, create
storage buckets for workloads and backups, and even install
enterprise software into that VM. Customers can then use
the provider's services to perform various functions, includ-
ing balancing network traffic, troubleshooting application
issues, monitoring performance, managing disaster recov-
ery, etc.

In most cases, a cloud computing model will require the
participation of a cloud provider. The cloud provider may,
but need not be, a third-party service that specializes in
providing (e.g., offering, renting, selling) IaaS. An entity
might also opt to deploy a private cloud, becoming its own
provider of infrastructure services.

In some examples, IaaS deployment is the process of
putting a new application, or a new version of an application,
onto a prepared application server or the like. It may also
include the process of preparing the server (e.g., installing
libraries, daemons, etc.). This is often managed by the cloud
provider, below the hypervisor layer (e.g., the servers,
storage, network hardware, and virtualization). Thus, the
customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 21:
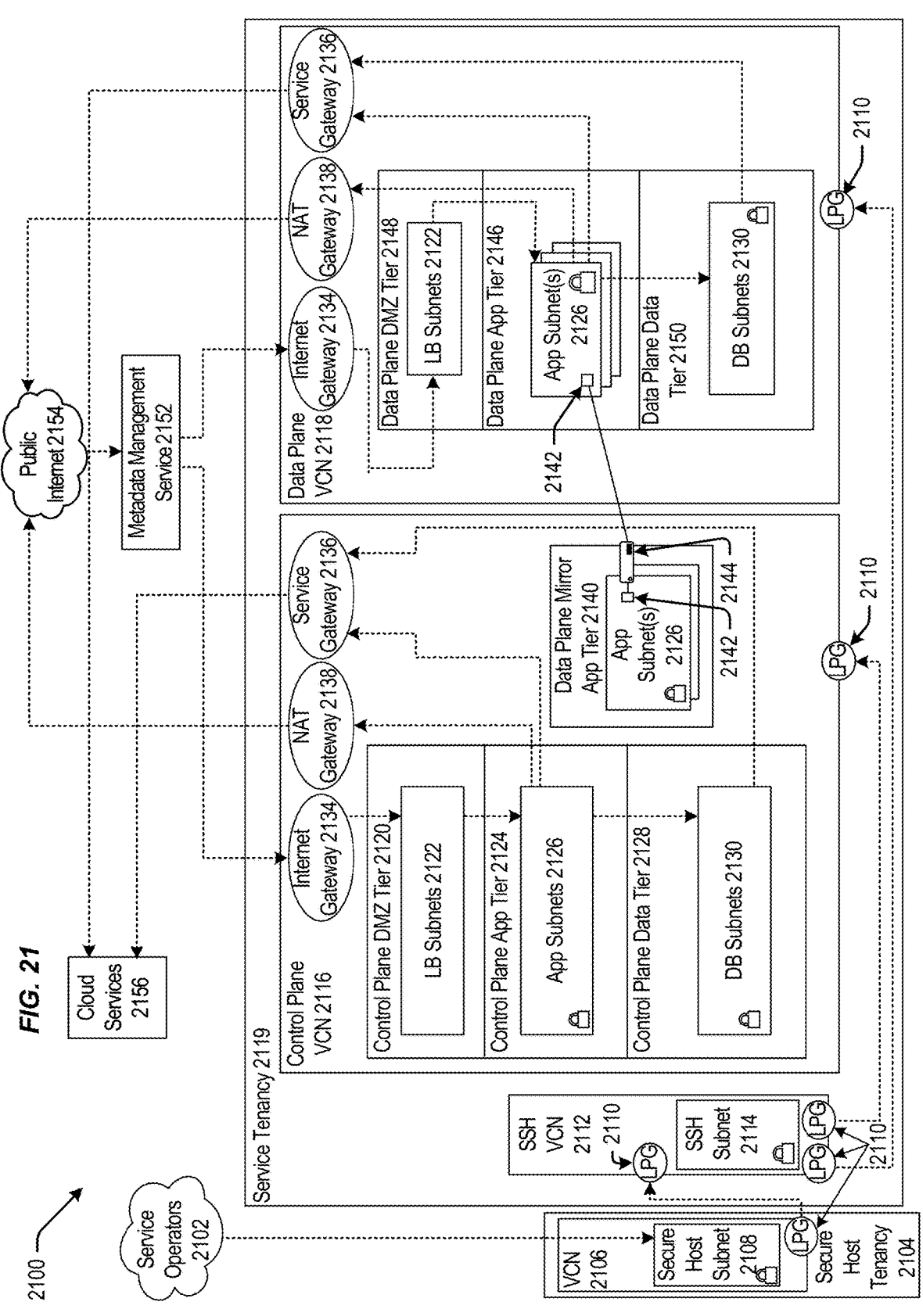
FIG. 21 is a block diagram illustrating one pattern for implementing a cloud infrastructure as a service system, according to at least one embodiment.

FIG. 21 is a block diagram 2100 illustrating an example pattern of an IaaS architecture, according to at least one embodiment. Service operators 2102 can be communicatively coupled to a secure host tenancy 2104 that can include a virtual cloud network (VCN) 2106 and a secure host subnet 2108. In some examples, the service operators 2102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2106 and/or the Internet.

The VCN 2106 can include a local peering gateway (LPG) 2110 that can be communicatively coupled to a secure shell (SSH) VCN 2112 via an LPG 2110 contained in the SSH VCN 2112. The SSH VCN 2112 can include an SSH subnet 2114, and the SSH VCN 2112 can be communicatively coupled to a control plane VCN 2116 via the LPG 2110 contained in the control plane VCN 2116. Also, the SSH VCN 2112 can be communicatively coupled to a data plane VCN 2118 via an LPG 2110. The control plane VCN 2116 and the data plane VCN 2118 can be contained in a service tenancy 2119 that can be owned and/or operated by the IaaS provider.

The control plane VCN 2116 can include a control plane demilitarized zone (DMZ) tier 2120 that acts as a perimeter network (e.g., portions of a corporate network between the corporate intranet and external networks). The DMZ-based servers may have restricted responsibilities and help keep breaches contained. Additionally, the DMZ tier 2120 can include one or more load balancer (LB) subnet(s) 2122, a control plane app tier 2124 that can include app subnet(s) 2126, a control plane data tier 2128 that can include database (DB) subnet(s) 2130 (e.g., frontend DB subnet(s) and/or backend DB subnet(s)). The LB subnet(s) 2122 contained in the control plane DMZ tier 2120 can be communicatively coupled to the app subnet(s) 2126 contained in the control plane app tier 2124 and an Internet gateway 2134 that can be contained in the control plane VCN 2116, and the app subnet(s) 2126 can be communicatively coupled to the DB subnet(s) 2130 contained in the control plane data tier 2128 and a service gateway 2136 and a network address translation (NAT) gateway 2138. The control plane VCN 2116 can include the service gateway 2136 and the NAT gateway 2138.

The control plane VCN 2116 can include a data plane mirror app tier 2140 that can include app subnet(s) 2126. The app subnet(s) 2126 contained in the data plane mirror app tier 2140 can include a virtual network interface controller (VNIC) 2142 that can execute a compute instance 2144. The compute instance 2144 can communicatively couple the app subnet(s) 2126 of the data plane mirror app tier 2140 to app subnet(s) 2126 that can be contained in a data plane app tier 2146.

The data plane VCN 2118 can include the data plane app tier 2146, a data plane DMZ tier 2148, and a data plane data tier 2150. The data plane DMZ tier 2148 can include LB subnet(s) 2122 that can be communicatively coupled to the app subnet(s) 2126 of the data plane app tier 2146 and the Internet gateway 2134 of the data plane VCN 2118. The app subnet(s) 2126 can be communicatively coupled to the service gateway 2136 of the data plane VCN 2118 and the NAT gateway 2138 of the data plane VCN 2118. The data plane data tier 2150 can also include the DB subnet(s) 2130 that can be communicatively coupled to the app subnet(s) 2126 of the data plane app tier 2146.

The Internet gateway 2134 of the control plane VCN 2116 and of the data plane VCN 2118 can be communicatively coupled to a metadata management service 2152 that can be communicatively coupled to public Internet 2154. Public Internet 2154 can be communicatively coupled to the NAT gateway 2138 of the control plane VCN 2116 and of the data plane VCN 2118. The service gateway 2136 of the control plane VCN 2116 and of the data plane VCN 2118 can be communicatively couple to cloud services 2156.

In some examples, the service gateway 2136 of the control plane VCN 2116 or of the data plane VCN 2118 can make application programming interface (API) calls to cloud services 2156 without going through public Internet 2154. The API calls to cloud services 2156 from the service gateway 2136 can be one-way: the service gateway 2136 can make API calls to cloud services 2156, and cloud services 2156 can send requested data to the service gateway 2136. But, cloud services 2156 may not initiate API calls to the service gateway 2136.

In some examples, the secure host tenancy 2104 can be directly connected to the service tenancy 2119, which may be otherwise isolated. The secure host subnet 2108 can communicate with the SSH subnet 2114 through an LPG 2110 that may enable two-way communication over an otherwise isolated system. Connecting the secure host subnet 2108 to the SSH subnet 2114 may give the secure host subnet 2108 access to other entities within the service tenancy 2119.

The control plane VCN 2116 may allow users of the service tenancy 2119 to set up or otherwise provision desired resources. Desired resources provisioned in the control plane VCN 2116 may be deployed or otherwise used in the data plane VCN 2118. In some examples, the control plane VCN 2116 can be isolated from the data plane VCN 2118, and the data plane mirror app tier 2140 of the control plane VCN 2116 can communicate with the data plane app tier 2146 of the data plane VCN 2118 via VNICs 2142 that can be contained in the data plane mirror app tier 2140 and the data plane app tier 2146.

In some examples, users of the system, or customers, can make requests, for example create, read, update, or delete (CRUD) operations, through public Internet 2154 that can communicate the requests to the metadata management service 2152. The metadata management service 2152 can communicate the request to the control plane VCN 2116 through the Internet gateway 2134. The request can be received by the LB subnet(s) 2122 contained in the control plane DMZ tier 2120. The LB subnet(s) 2122 may determine that the request is valid, and in response to this determination, the LB subnet(s) 2122 can transmit the request to app subnet(s) 2126 contained in the control plane app tier 2124. If the request is validated and requires a call to public Internet 2154, the call to public Internet 2154 may be transmitted to the NAT gateway 2138 that can make the call to public Internet 2154. Metadata that may be desired to be stored by the request can be stored in the DB subnet(s) 2130.

In some examples, the data plane mirror app tier 2140 can facilitate direct communication between the control plane VCN 2116 and the data plane VCN 2118. For example, changes, updates, or other suitable modifications to configuration may be desired to be applied to the resources contained in the data plane VCN 2118. Via a VNIC 2142, the control plane VCN 2116 can directly communicate with, and can thereby execute the changes, updates, or other suitable modifications to configuration to, resources contained in the data plane VCN 2118.

In some embodiments, the control plane VCN 2116 and the data plane VCN 2118 can be contained in the service tenancy 2119. In this case, the user, or the customer, of the system may not own or operate either the control plane VCN 2116 or the data plane VCN 2118. Instead, the IaaS provider may own or operate the control plane VCN 2116 and the data plane VCN 2118, both of which may be contained in the service tenancy 2119. This embodiment can enable isolation of networks that may prevent users or customers from interacting with other users', or other customers', resources. Also, this embodiment may allow users or customers of the system to store databases privately without needing to rely on public Internet 2154, which may not have a desired level of threat prevention, for storage.

In other embodiments, the LB subnet(s) 2122 contained in the control plane VCN 2116 can be configured to receive a signal from the service gateway 2136. In this embodiment, the control plane VCN 2116 and the data plane VCN 2118 may be configured to be called by a customer of the IaaS provider without calling public Internet 2154. Customers of the IaaS provider may desire this embodiment since database(s) that the customers use may be controlled by the IaaS provider and may be stored on the service tenancy 2119, which may be isolated from public Internet 2154.

Figure 22:
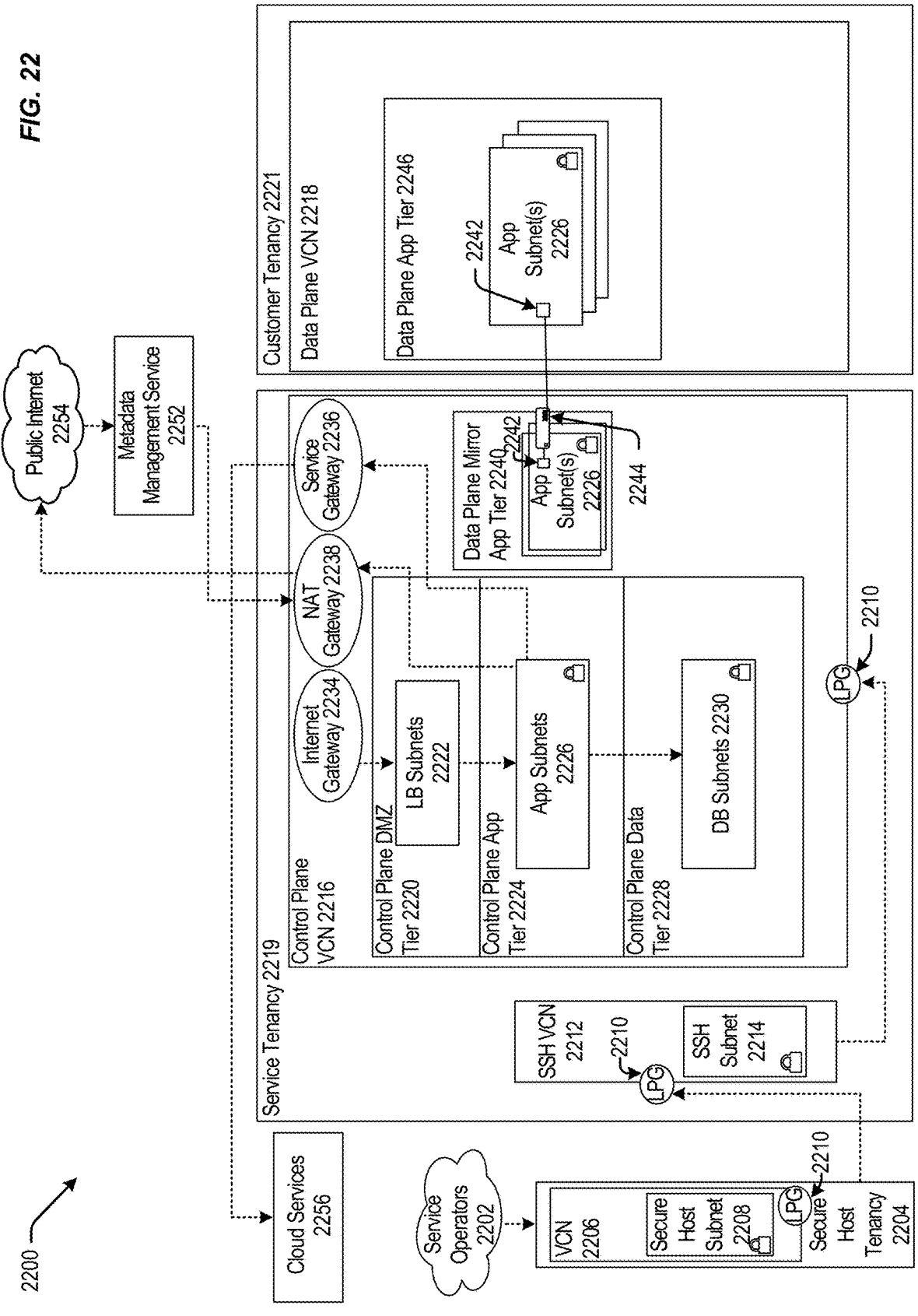
FIG. 22 is a block diagram illustrating another pattern for implementing a cloud infrastructure as a service system, according to at least one embodiment.

FIG. 22 is a block diagram 2200 illustrating another example pattern of an IaaS architecture, according to at least one embodiment. Service operators 2202 (e.g., service operators 2102 of FIG. 21) can be communicatively coupled to a secure host tenancy 2204 (e.g., the secure host tenancy 2104 of FIG. 21) that can include a virtual cloud network (VCN) 2206 (e.g., the VCN 2106 of FIG. 21) and a secure host subnet 2208 (e.g., the secure host subnet 2108 of FIG. 21). The VCN 2206 can include a local peering gateway (LPG) 2210 (e.g., the LPG 2110 of FIG. 21) that can be communicatively coupled to a secure shell (SSH) VCN 2212 (e.g., the SSH VCN 2112 of FIG. 21) via an LPG 2110 contained in the SSH VCN 2212. The SSH VCN 2212 can include an SSH subnet 2214 (e.g., the SSH subnet 2114 of FIG. 21), and the SSH VCN 2212 can be communicatively coupled to a control plane VCN 2216 (e.g., the control plane VCN 2116 of FIG. 21) via an LPG 2210 contained in the control plane VCN 2216. The control plane VCN 2216 can be contained in a service tenancy 2219 (e.g., the service tenancy 2119 of FIG. 21), and the data plane VCN 2218 (e.g., the data plane VCN 2118 of FIG. 21) can be contained in a customer tenancy 2221 that may be owned or operated by users, or customers, of the system.

The control plane VCN 2216 can include a control plane DMZ tier 2220 (e.g., the control plane DMZ tier 2120 of FIG. 21) that can include LB subnet(s) 2222 (e.g., LB subnet(s) 2122 of FIG. 21), a control plane app tier 2224 (e.g., the control plane app tier 2124 of FIG. 21) that can include app subnet(s) 2226 (e.g., app subnet(s) 2126 of FIG. 21), a control plane data tier 2228 (e.g., the control plane data tier 2128 of FIG. 21) that can include database (DB) subnet(s) 2230 (e.g., similar to DB subnet(s) 2130 of FIG. 21). The LB subnet(s) 2222 contained in the control plane DMZ tier 2220 can be communicatively coupled to the app subnet(s) 2226 contained in the control plane app tier 2224 and an Internet gateway 2234 (e.g., the Internet gateway 2134 of FIG. 21) that can be contained in the control plane VCN 2216, and the app subnet(s) 2226 can be communicatively coupled to the DB subnet(s) 2230 contained in the control plane data tier 2228 and a service gateway 2236 (e.g., the service gateway 2136 of FIG. 21) and a network address translation (NAT) gateway 2238 (e.g., the NAT gateway 2138 of FIG. 21). The control plane VCN 2216 can include the service gateway 2236 and the NAT gateway 2238.

The control plane VCN 2216 can include a data plane mirror app tier 2240 (e.g., the data plane mirror app tier 2140 of FIG. 21) that can include app subnet(s) 2226. The app subnet(s) 2226 contained in the data plane mirror app tier 2240 can include a virtual network interface controller (VNIC) 2242 (e.g., the VNIC of 2142) that can execute a compute instance 2244 (e.g., similar to the compute instance 2144 of FIG. 21). The compute instance 2244 can facilitate communication between the app subnet(s) 2226 of the data plane mirror app tier 2240 and the app subnet(s) 2226 that can be contained in a data plane app tier 2246 (e.g., the data plane app tier 2146 of FIG. 21) via the VNIC 2242 contained in the data plane mirror app tier 2240 and the VNIC 2242 contained in the data plane app tier 2246.

The Internet gateway 2234 contained in the control plane VCN 2216 can be communicatively coupled to a metadata management service 2252 (e.g., the metadata management service 2152 of FIG. 21) that can be communicatively coupled to public Internet 2254 (e.g., public Internet 2154 of FIG. 21). Public Internet 2254 can be communicatively coupled to the NAT gateway 2238 contained in the control plane VCN 2216. The service gateway 2236 contained in the control plane VCN 2216 can be communicatively couple to cloud services 2256 (e.g., cloud services 2156 of FIG. 21).

In some examples, the data plane VCN 2218 can be contained in the customer tenancy 2221. In this case, the IaaS provider may provide the control plane VCN 2216 for each customer, and the IaaS provider may, for each customer, set up a unique compute instance 2244 that is contained in the service tenancy 2219. Each compute instance 2244 may allow communication between the control plane VCN 2216, contained in the service tenancy 2219, and the data plane VCN 2218 that is contained in the customer tenancy 2221. The compute instance 2244 may allow resources, that are provisioned in the control plane VCN 2216 that is contained in the service tenancy 2219, to be deployed or otherwise used in the data plane VCN 2218 that is contained in the customer tenancy 2221.

In other examples, the customer of the IaaS provider may have databases that live in the customer tenancy 2221. In this example, the control plane VCN 2216 can include the data plane mirror app tier 2240 that can include app subnet(s) 2226. The data plane mirror app tier 2240 can reside in the data plane VCN 2218, but the data plane mirror app tier 2240 may not live in the data plane VCN 2218. That is, the data plane mirror app tier 2240 may have access to the customer tenancy 2221, but the data plane mirror app tier 2240 may not exist in the data plane VCN 2218 or be owned or operated by the customer of the IaaS provider. The data plane mirror app tier 2240 may be configured to make calls to the data plane VCN 2218 but may not be configured to make calls to any entity contained in the control plane VCN 2216. The customer may desire to deploy or otherwise use resources in the data plane VCN 2218 that are provisioned in the control plane VCN 2216, and the data plane mirror app tier 2240 can facilitate the desired deployment, or other usage of resources, of the customer.

In some embodiments, the customer of the IaaS provider can apply filters to the data plane VCN 2218. In this embodiment, the customer can determine what the data plane VCN 2218 can access, and the customer may restrict access to public Internet 2254 from the data plane VCN 2218. The IaaS provider may not be able to apply filters or otherwise control access of the data plane VCN 2218 to any outside networks or databases. Applying filters and controls by the customer onto the data plane VCN 2218, contained in the customer tenancy 2221, can help isolate the data plane VCN 2218 from other customers and from public Internet 2254.

In some embodiments, cloud services 2256 can be called by the service gateway 2236 to access services that may not exist on public Internet 2254, on the control plane VCN 2216, or on the data plane VCN 2218. The connection between cloud services 2256 and the control plane VCN 2216 or the data plane VCN 2218 may not be live or continuous. Cloud services 2256 may exist on a different network owned or operated by the IaaS provider. Cloud services 2256 may be configured to receive calls from the service gateway 2236 and may be configured to not receive calls from public Internet 2254. Some cloud services 2256 may be isolated from other cloud services 2256, and the control plane VCN 2216 may be isolated from cloud services 2256 that may not be in the same region as the control plane VCN 2216. For example, the control plane VCN 2216 may be located in "Region 1," and cloud service "Deployment 21," may be located in Region 1 and in "Region 2." If a call to Deployment 21 is made by the service gateway 2236 contained in the control plane VCN 2216 located in Region 1, the call may be transmitted to Deployment 21 in Region 1. In this example, the control plane VCN 2216, or Deployment 21 in Region 1, may not be communicatively coupled to, or otherwise in communication with, Deployment 21 in Region 2.

Figure 23:
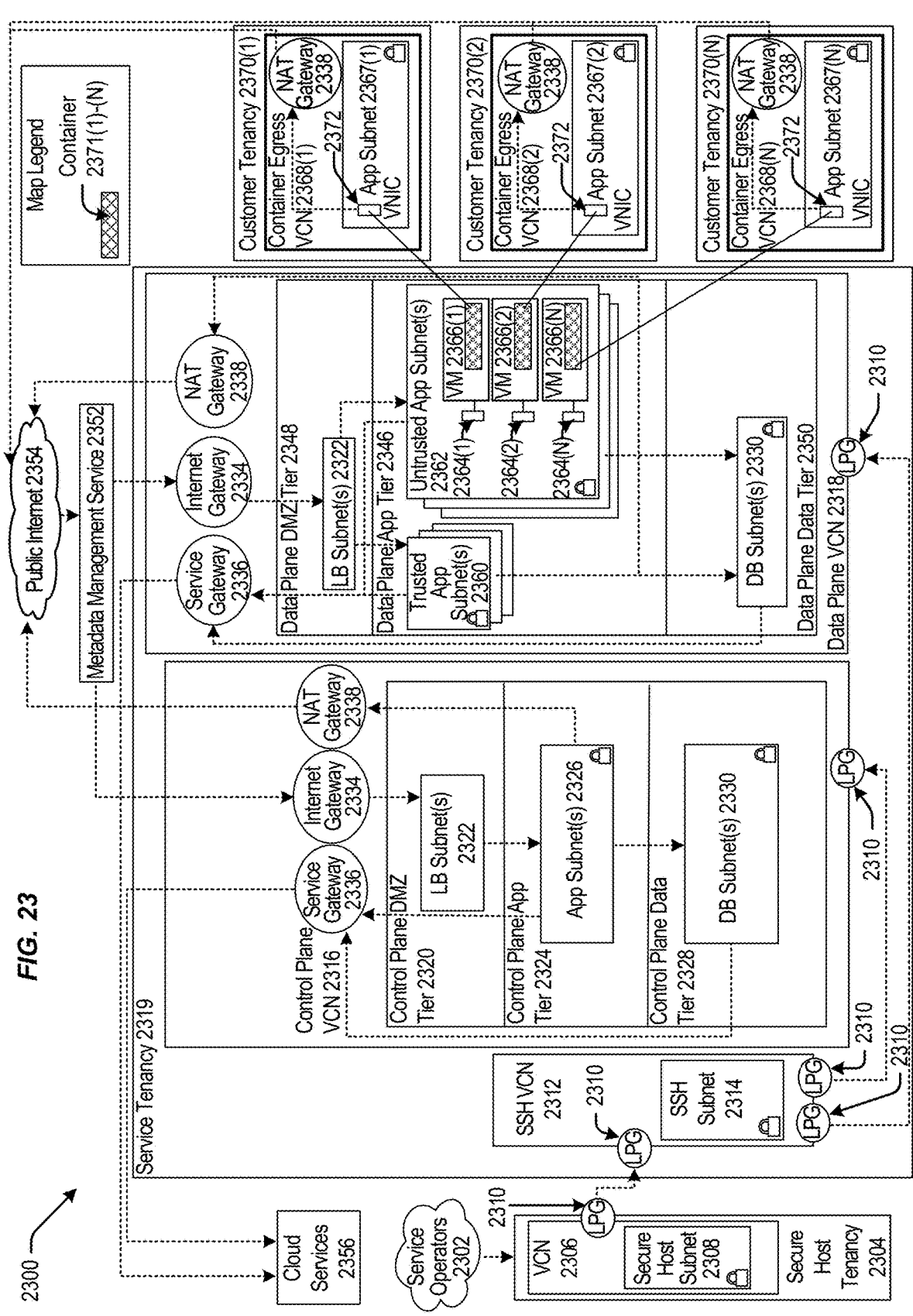
FIG. 23 is a block diagram illustrating another pattern for implementing a cloud infrastructure as a service system, according to at least one embodiment.

FIG. 23 is a block diagram 2300 illustrating another example pattern of an IaaS architecture, according to at least one embodiment. Service operators 2302 (e.g., service operators 2102 of FIG. 21) can be communicatively coupled to a secure host tenancy 2304 (e.g., the secure host tenancy 2104 of FIG. 21) that can include a virtual cloud network (VCN) 2306 (e.g., the VCN 2106 of FIG. 21) and a secure host subnet 2308 (e.g., the secure host subnet 2108 of FIG. 21). The VCN 2306 can include an LPG 2310 (e.g., the LPG 2110 of FIG. 21) that can be communicatively coupled to an SSH VCN 2312 (e.g., the SSH VCN 2112 of FIG. 21) via an LPG 2310 contained in the SSH VCN 2312. The SSH VCN 2312 can include an SSH subnet 2314 (e.g., the SSH subnet 2114 of FIG. 21), and the SSH VCN 2312 can be communicatively coupled to a control plane VCN 2316 (e.g., the control plane VCN 2116 of FIG. 21) via an LPG 2310 contained in the control plane VCN 2316 and to a data plane VCN 2318 (e.g., the data plane 2118 of FIG. 21) via an LPG 2310 contained in the data plane VCN 2318. The control plane VCN 2316 and the data plane VCN 2318 can be contained in a service tenancy 2319 (e.g., the service tenancy 2119 of FIG. 21).

The control plane VCN 2316 can include a control plane DMZ tier 2320 (e.g., the control plane DMZ tier 2120 of FIG. 21) that can include load balancer (LB) subnet(s) 2322 (e.g., LB subnet(s) 2122 of FIG. 21), a control plane app tier 2324 (e.g., the control plane app tier 2124 of FIG. 21) that can include app subnet(s) 2326 (e.g., similar to app subnet(s) 2126 of FIG. 21), a control plane data tier 2328 (e.g., the control plane data tier 2128 of FIG. 21) that can include DB subnet(s) 2330. The LB subnet(s) 2322 contained in the control plane DMZ tier 2320 can be communicatively coupled to the app subnet(s) 2326 contained in the control plane app tier 2324 and to an Internet gateway 2334 (e.g., the Internet gateway 2134 of FIG. 21) that can be contained in the control plane VCN 2316, and the app subnet(s) 2326 can be communicatively coupled to the DB subnet(s) 2330 contained in the control plane data tier 2328 and to a service gateway 2336 (e.g., the service gateway of FIG. 21) and a network address translation (NAT) gateway 2338 (e.g., the NAT gateway 2138 of FIG. 21). The control plane VCN 2316 can include the service gateway 2336 and the NAT gateway 2338.

The data plane VCN 2318 can include a data plane app tier 2346 (e.g., the data plane app tier 2146 of FIG. 21), a data plane DMZ tier 2348 (e.g., the data plane DMZ tier 2148 of FIG. 21), and a data plane data tier 2350 (e.g., the data plane data tier 2150 of FIG. 21). The data plane DMZ tier 2348 can include LB subnet(s) 2322 that can be communicatively coupled to trusted app subnet(s) 2360 and untrusted app subnet(s) 2362 of the data plane app tier 2346 and the Internet gateway 2334 contained in the data plane VCN 2318. The trusted app subnet(s) 2360 can be communicatively coupled to the service gateway 2336 contained in the data plane VCN 2318, the NAT gateway 2338 contained in the data plane VCN 2318, and DB subnet(s) 2330 contained in the data plane data tier 2350. The untrusted app subnet(s) 2362 can be communicatively coupled to the service gateway 2336 contained in the data plane VCN 2318 and DB subnet(s) 2330 contained in the data plane data tier 2350. The data plane data tier 2350 can include DB subnet(s) 2330 that can be communicatively coupled to the service gateway 2336 contained in the data plane VCN 2318.

The untrusted app subnet(s) 2362 can include one or more primary VNICs 2364(1)-(N) that can be communicatively coupled to tenant virtual machines (VMs) 2366(1)-(N). Each tenant VM 2366(1)-(N) can be communicatively coupled to a respective app subnet 2367(1)-(N) that can be contained in respective container egress VCNs 2368(1)-(N) that can be contained in respective customer tenancies 2370(1)-(N). Respective secondary VNICs 2372(1)-(N) can facilitate communication between the untrusted app subnet(s) 2362 contained in the data plane VCN 2318 and the app subnet contained in the container egress VCNs 2368(1)-(N). Each container egress VCNs 2368(1)-(N) can include a NAT gateway 2338 that can be communicatively coupled to public Internet 2354 (e.g., public Internet 2154 of FIG. 21).

The Internet gateway 2334 contained in the control plane VCN 2316 and contained in the data plane VCN 2318 can be communicatively coupled to a metadata management service 2352 (e.g., the metadata management system 2152 of FIG. 21) that can be communicatively coupled to public Internet 2354. Public Internet 2354 can be communicatively coupled to the NAT gateway 2338 contained in the control plane VCN 2316 and contained in the data plane VCN 2318. The service gateway 2336 contained in the control plane VCN 2316 and contained in the data plane VCN 2318 can be communicatively couple to cloud services 2356.

In some embodiments, the data plane VCN 2318 can be integrated with customer tenancies 2370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2346. Code to run the function may be executed in the VMs 2366(1)-(N), and the code may not be configured to run anywhere else on the data plane VCN 2318. Each VM 2366(1)-(N) may be connected to one customer tenancy 2370. Respective containers 2371(1)-(N) contained in the VMs 2366(1)-(N) may be configured to run the code. In this case, there can be a dual isolation (e.g., the containers 2371(1)-(N) running code, where the containers 2371(1)-(N) may be contained in at least the VM 2366(1)-(N) that are contained in the untrusted app subnet(s) 2362), which may help prevent incorrect or otherwise undesirable code from damaging the network of the IaaS provider or from damaging a network of a different customer. The containers 2371(1)-(N) may be communicatively coupled to the customer tenancy 2370 and may be configured to transmit or receive data from the customer tenancy 2370. The containers 2371(1)-(N) may not be configured to transmit or receive data from any other entity in the data plane VCN 2318. Upon completion of running the code, the IaaS provider may kill or otherwise dispose of the containers 2371(1)-(N).

In some embodiments, the trusted app subnet(s) 2360 may run code that may be owned or operated by the IaaS provider. In this embodiment, the trusted app subnet(s) 2360 may be communicatively coupled to the DB subnet(s) 2330 and be configured to execute CRUD operations in the DB subnet(s) 2330. The untrusted app subnet(s) 2362 may be communicatively coupled to the DB subnet(s) 2330, but in this embodiment, the untrusted app subnet(s) may be configured to execute read operations in the DB subnet(s) 2330. The containers 2371(1)-(N) that can be contained in the VM 2366(1)-(N) of each customer and that may run code from the customer may not be communicatively coupled with the DB subnet(s) 2330.

In other embodiments, the control plane VCN 2316 and the data plane VCN 2318 may not be directly communicatively coupled. In this embodiment, there may be no direct communication between the control plane VCN 2316 and the data plane VCN 2318. However, communication can occur indirectly through at least one method. An LPG 2310 may be established by the IaaS provider that can facilitate communication between the control plane VCN 2316 and the data plane VCN 2318. In another example, the control plane VCN 2316 or the data plane VCN 2318 can make a call to cloud services 2356 via the service gateway 2336. For example, a call to cloud services 2356 from the control plane VCN 2316 can include a request for a service that can communicate with the data plane VCN 2318.

Figure 24:
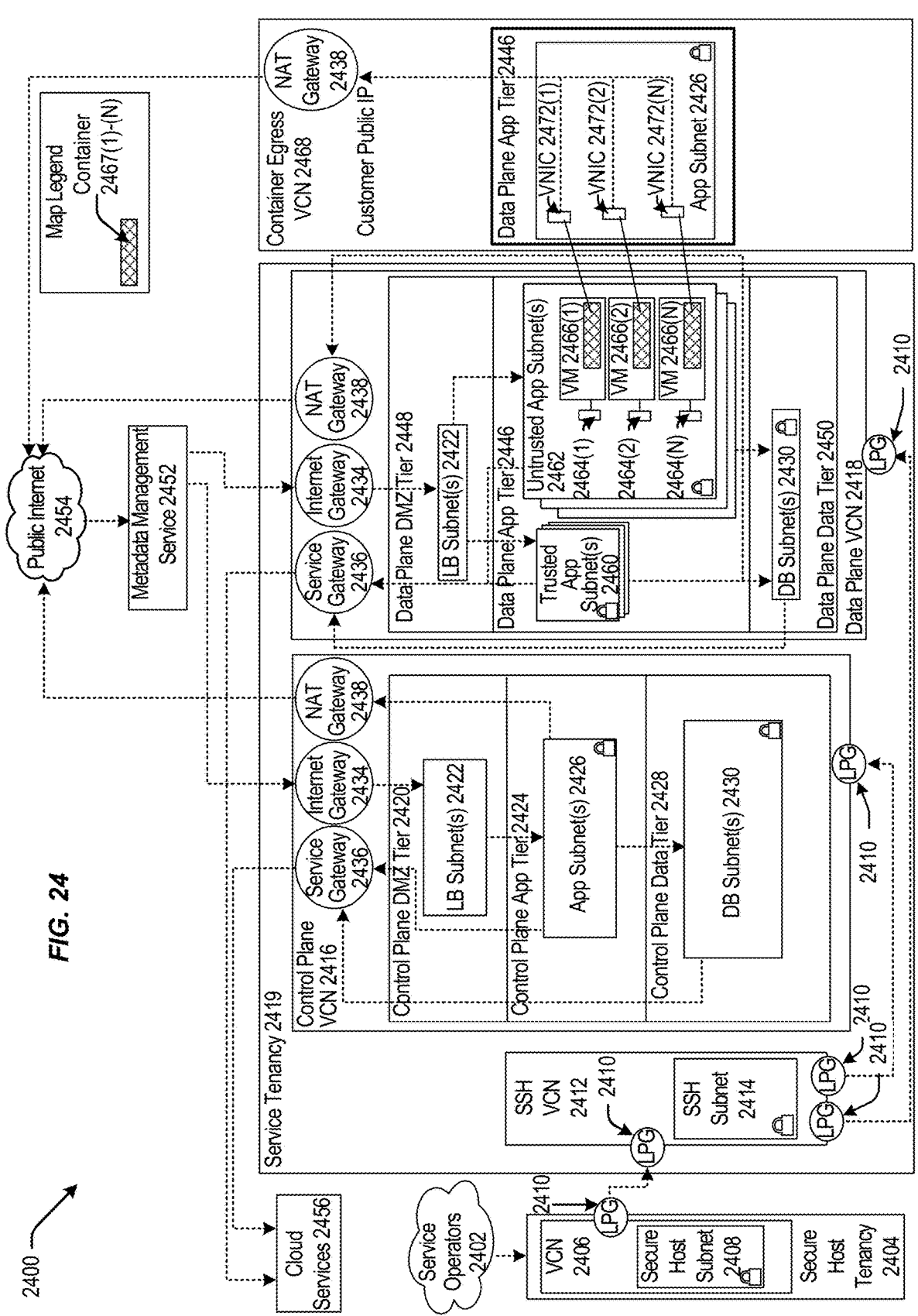
FIG. 24 is a block diagram illustrating another pattern for implementing a cloud infrastructure as a service system, according to at least one embodiment.

FIG. 24 is a block diagram 2400 illustrating another example pattern of an IaaS architecture, according to at least one embodiment. Service operators 2402 (e.g., service operators 2102 of FIG. 21) can be communicatively coupled to a secure host tenancy 2404 (e.g., the secure host tenancy 2104 of FIG. 21) that can include a virtual cloud network (VCN) 2406 (e.g., the VCN 2106 of FIG. 21) and a secure host subnet 2408 (e.g., the secure host subnet 2108 of FIG. 21). The VCN 2406 can include an LPG 2410 (e.g., the LPG 2110 of FIG. 21) that can be communicatively coupled to an SSH VCN 2412 (e.g., the SSH VCN 2112 of FIG. 21) via an LPG 2410 contained in the SSH VCN 2412. The SSH VCN 2412 can include an SSH subnet 2414 (e.g., the SSH subnet 2114 of FIG. 21), and the SSH VCN 2412 can be communicatively coupled to a control plane VCN 2416 (e.g., the control plane VCN 2116 of FIG. 21) via an LPG 2410 contained in the control plane VCN 2416 and to a data plane VCN 2418 (e.g., the data plane 2118 of FIG. 21) via an LPG 2410 contained in the data plane VCN 2418. The control plane VCN 2416 and the data plane VCN 2418 can be contained in a service tenancy 2419 (e.g., the service tenancy 2119 of FIG. 21).

The control plane VCN 2416 can include a control plane DMZ tier 2420 (e.g., the control plane DMZ tier 2120 of FIG. 21) that can include LB subnet(s) 2422 (e.g., LB subnet(s) 2122 of FIG. 21), a control plane app tier 2424 (e.g., the control plane app tier 2124 of FIG. 21) that can include app subnet(s) 2426 (e.g., app subnet(s) 2126 of FIG. 21), a control plane data tier 2428 (e.g., the control plane data tier 2128 of FIG. 21) that can include DB subnet(s) 2430 (e.g., DB subnet(s) 2330 of FIG. 23). The LB subnet(s) 2422 contained in the control plane DMZ tier 2420 can be communicatively coupled to the app subnet(s) 2426 contained in the control plane app tier 2424 and to an Internet gateway 2434 (e.g., the Internet gateway 2134 of FIG. 21) that can be contained in the control plane VCN 2416, and the app subnet(s) 2426 can be communicatively coupled to the DB subnet(s) 2430 contained in the control plane data tier 2428 and to a service gateway 2436 (e.g., the service gateway of FIG. 21) and a network address translation (NAT) gateway 2438 (e.g., the NAT gateway 2138 of FIG. 21). The control plane VCN 2416 can include the service gateway 2436 and the NAT gateway 2438.

The data plane VCN 2418 can include a data plane app tier 2446 (e.g., the data plane app tier 2146 of FIG. 21), a data plane DMZ tier 2448 (e.g., the data plane DMZ tier 2148 of FIG. 21), and a data plane data tier 2450 (e.g., the data plane data tier 2150 of FIG. 21). The data plane DMZ tier 2448 can include LB subnet(s) 2422 that can be communicatively coupled to trusted app subnet(s) 2460 (e.g., trusted app subnet(s) 2360 of FIG. 23) and untrusted app subnet(s) 2462 (e.g., untrusted app subnet(s) 2362 of FIG. 23) of the data plane app tier 2446 and the Internet gateway 2434 contained in the data plane VCN 2418. The trusted app subnet(s) 2460 can be communicatively coupled to the service gateway 2436 contained in the data plane VCN 2418, the NAT gateway 2438 contained in the data plane VCN 2418, and DB subnet(s) 2430 contained in the data plane data tier 2450. The untrusted app subnet(s) 2462 can be communicatively coupled to the service gateway 2436 contained in the data plane VCN 2418 and DB subnet(s) 2430 contained in the data plane data tier 2450. The data plane data tier 2450 can include DB subnet(s) 2430 that can be communicatively coupled to the service gateway 2436 contained in the data plane VCN 2418.

The untrusted app subnet(s) 2462 can include primary VNICs 2464(1)-(N) that can be communicatively coupled to tenant virtual machines (VMs) 2466(1)-(N) residing within the untrusted app subnet(s) 2462. Each tenant VM 2466(1)-(N) can run code in a respective container 2467(1)-(N), and be communicatively coupled to an app subnet 2426 that can be contained in a data plane app tier 2446 that can be contained in a container egress VCN 2468. Respective secondary VNICs 2472(1)-(N) can facilitate communication between the untrusted app subnet(s) 2462 contained in the data plane VCN 2418 and the app subnet contained in the container egress VCN 2468. The container egress VCN can include a NAT gateway 2438 that can be communicatively coupled to public Internet 2454 (e.g., public Internet 2154 of FIG. 21).

The Internet gateway 2434 contained in the control plane VCN 2416 and contained in the data plane VCN 2418 can be communicatively coupled to a metadata management service 2452 (e.g., the metadata management system 2152 of FIG. 21) that can be communicatively coupled to public Internet 2454. Public Internet 2454 can be communicatively coupled to the NAT gateway 2438 contained in the control plane VCN 2416 and contained in the data plane VCN 2418. The service gateway 2436 contained in the control plane VCN 2416 and contained in the data plane VCN 2418 can be communicatively couple to cloud services 2456.

In some examples, the pattern illustrated by the architecture of block diagram 2400 of FIG. 24 may be considered an exception to the pattern illustrated by the architecture of block diagram 2300 of FIG. 23 and may be desirable for a customer of the IaaS provider if the IaaS provider cannot directly communicate with the customer (e.g., a disconnected region). The respective containers 2467(1)-(N) that are contained in the VMs 2466(1)-(N) for each customer can be accessed in real-time by the customer. The containers 2467(1)-(N) may be configured to make calls to respective secondary VNICs 2472(1)-(N) contained in app subnet(s) 2426 of the data plane app tier 2446 that can be contained in the container egress VCN 2468. The secondary VNICs 2472(1)-(N) can transmit the calls to the NAT gateway 2438 that may transmit the calls to public Internet 2454. In this example, the containers 2467(1)-(N) that can be accessed in real-time by the customer can be isolated from the control plane VCN 2416 and can be isolated from other entities contained in the data plane VCN 2418. The containers 2467(1)-(N) may also be isolated from resources from other customers.

In other examples, the customer can use the containers 2467(1)-(N) to call cloud services 2456. In this example, the customer may run code in the containers 2467(1)-(N) that requests a service from cloud services 2456. The containers 2467(1)-(N) can transmit this request to the secondary VNICs 2472(1)-(N) that can transmit the request to the NAT gateway that can transmit the request to public Internet 2454. Public Internet 2454 can transmit the request to LB subnet(s) 2422 contained in the control plane VCN 2416 via the Internet gateway 2434. In response to determining the request is valid, the LB subnet(s) can transmit the request to app subnet(s) 2426 that can transmit the request to cloud services 2456 via the service gateway 2436.

It should be appreciated that IaaS architectures 2100, 2200, 2300, 2400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 25:
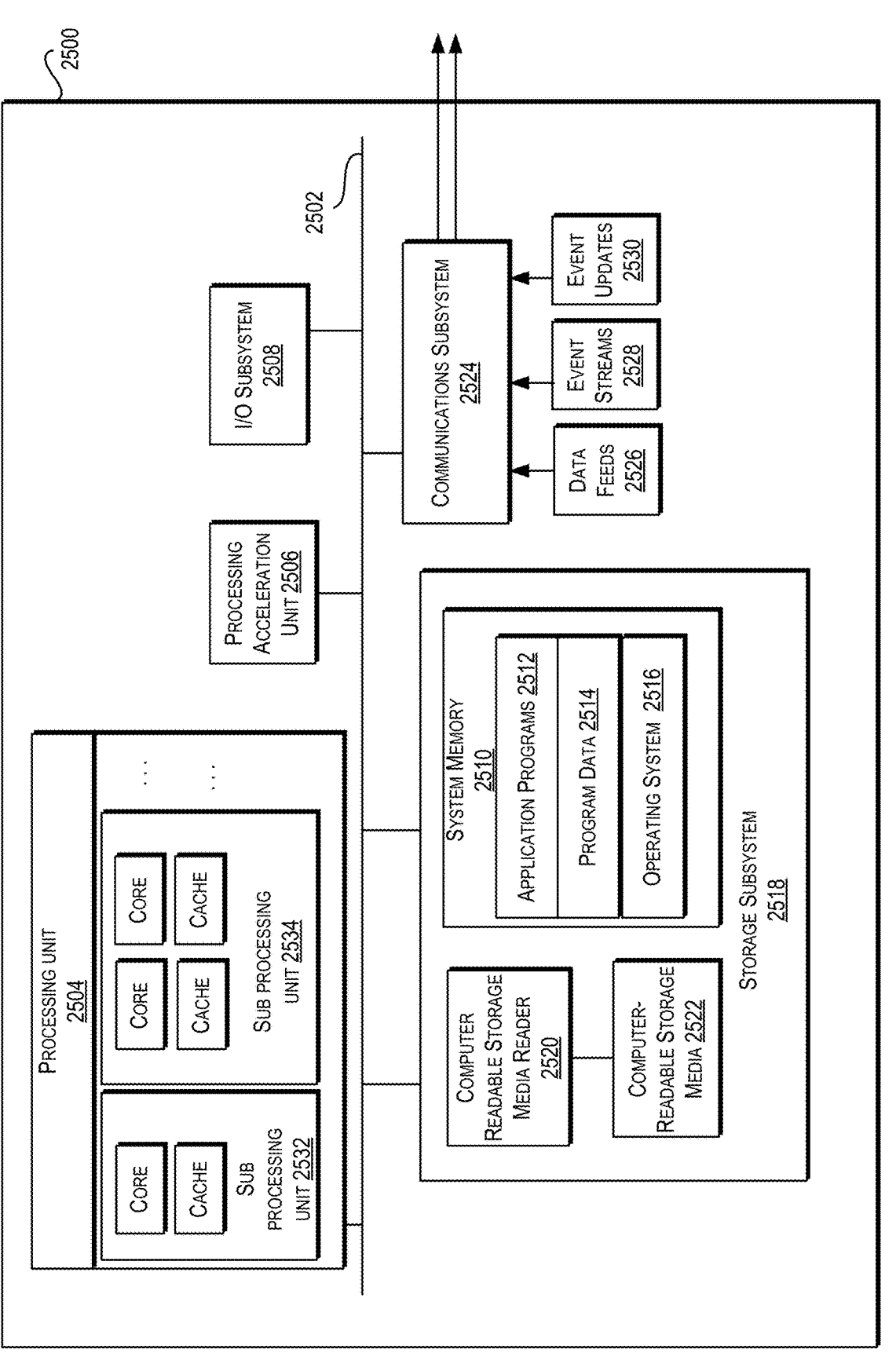
FIG. 25 is a block diagram illustrating an example computer system, according to at least one embodiment.

FIG. 25 illustrates an example computer system 2500, in which various embodiments may be implemented. The system 2500 may be used to implement any of the computer systems described above. As shown in the figure, computer system 2500 includes a processing unit 2504 that communicates with a number of peripheral subsystems via a bus subsystem 2502. These peripheral subsystems may include a processing acceleration unit 2506, an I/O subsystem 2508, a storage subsystem 2518 and a communications subsystem 2524. Storage subsystem 2518 includes tangible computer-readable storage media 2522 and a system memory 2510.

Bus subsystem 2502 provides a mechanism for letting the various components and subsystems of computer system 2500 communicate with each other as intended. Although bus subsystem 2502 is shown schematically as a single bus, alternative embodiments of the bus subsystem may utilize multiple buses. Bus subsystem 2502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2504, which can be implemented as one or more integrated circuits (e.g., a conventional microprocessor or microcontroller), controls the operation of computer system 2500. One or more processors may be included in processing unit 2504. These processors may include single core or multicore processors. In certain embodiments, processing unit 2504 may be implemented as one or more independent processing units 2532 and/or 2534 with single or multicore processors included in each processing unit. In other embodiments, processing unit 2504 may also be implemented as a quad-core processing unit formed by integrating two dual-core processors into a single chip.

In various embodiments, processing unit 2504 can execute a variety of programs in response to program code and can maintain multiple concurrently executing programs or processes. At any given time, some or all of the program code to be executed can be resident in processor(s) 2504 and/or in storage subsystem 2518. Through suitable programming, processor(s) 2504 can provide various functionalities described above. Computer system 2500 may additionally include a processing acceleration unit 2506, which can include a digital signal processor (DSP), a special-purpose processor, and/or the like.

I/O subsystem 2508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2500 may comprise a storage subsystem 2518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2504 provide the functionality described above. Storage subsystem 2518 may also provide a repository for storing data used in accordance with the present disclosure.

As depicted in the example in FIG. 25, storage subsystem 2518 can include various components including a system memory 2510, computer-readable storage media 2522, and a computer readable storage media reader 2520. System memory 2510 may store program instructions that are loadable and executable by processing unit 2504. System memory 2510 may also store data that is used during the execution of the instructions and/or data that is generated during the execution of the program instructions. Various different kinds of programs may be loaded into system memory 2510 including but not limited to client applications, Web browsers, mid-tier applications, relational database management systems (RDBMS), virtual machines, containers, etc.

System memory 2510 may also store an operating system 2516. Examples of operating system 2516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2500 executes one or more virtual machines, the virtual machines along with their guest operating systems (GOSs) may be loaded into system memory 2510 and executed by one or more processors or cores of processing unit 2504.

System memory 2510 can come in different configurations depending upon the type of computer system 2500. For example, system memory 2510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2510 may include a basic input/output system (BIOS) containing basic routines that help to transfer information between elements within computer system 2500, such as during start-up.

Computer-readable storage media 2522 may represent remote, local, fixed, and/or removable storage devices plus storage media for temporarily and/or more permanently containing, storing, computer-readable information for use by computer system 2500 including instructions executable by processing unit 2504 of computer system 2500.

Computer-readable storage media 2522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2522 may include, but is not limited to, Zip® drives, flash memory cards, universal serial bus (USB) flash drives, secure digital (SD) cards, DVD disks, digital video tape, and the like. Computer-readable storage media 2522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2500.

Machine-readable instructions executable by one or more processors or cores of processing unit 2504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2524 provides an interface to other computer systems and networks. Communications subsystem 2524 serves as an interface for receiving data from and transmitting data to other systems from computer system 2500. For example, communications subsystem 2524 may enable computer system 2500 to connect to one or more devices via the Internet. In some embodiments communications subsystem 2524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2524 can provide wired network connectivity (e.g., Ethernet) in addition to or instead of a wireless interface.

In some embodiments, communications subsystem 2524 may also receive input communication in the form of structured and/or unstructured data feeds 2526, event streams 2528, event updates 2530, and the like on behalf of one or more users who may use computer system 2500.

By way of example, communications subsystem 2524 may be configured to receive data feeds 2526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2524 may also be configured to receive data in the form of continuous data streams, which may include event streams 2528 of real-time events and/or event updates 2530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2524 may also be configured to output the structured and/or unstructured data feeds 2526, event streams 2528, event updates 2530, and the like to one or more databases that may be in communication with one or more streaming data source computers coupled to computer system 2500.

Computer system 2500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing system, a request for a file system replication between a source file system and a target file system, the source file system and the target file system being in different regions;
   processing, by the computing system, a plurality of binary tree (B-tree) key-value pairs that are different between two snapshots of a source file system;
   generating, by the computing system, a delta generation record for each failure event during the file system replication, the delta generation record being configured for distinguishing different generations of processed deltas and comprising at least a first delta generation record and a second delta generation record;
   generating, by the computing system for each failure event, a checkpoint record;
   assigning, by the computing system, a first delta generation number to a first group of key-value pairs of the plurality of B-tree key-value pairs;
   assigning, by the computing system, a second delta generation number to a second group of key-value pairs of the plurality of B-tree key-value pairs upon detecting the failure event during the file system replication;
   generating, by the computing system, a manifest file that comprises at least the first delta generation record, the second delta generation record, and the checkpoint record; and
   completing, by the computing system, the file system replication based at least in part on the manifest file, such that the target file system is updated with the processed deltas associated with the second delta generation record,
   wherein the first group of key-value pairs of the plurality of B-tree key-value pairs is processed by the first processing thread, and the second group of key-value pairs of the plurality of B-tree key-value pairs is processed by a second processing thread.

2. The method of claim 1, wherein the processing comprises identifying and uploading the plurality of B-tree key-value pairs to an object storage.

3. The method of claim 1, wherein the failure event is caused by a failure of a first processing thread.

4. The method of claim 1, further comprising creating a record associated with the second processing thread for tracking the second group of key-value pairs of the plurality of B-tree key-value pairs, the record associated with the second processing thread is different from a record associated with the first processing thread for tracking the first group of key-value pairs of the plurality of B-tree key-value pairs.

5. The method of claim 1, wherein the failure event is caused by a system crash.

6. The method of claim 5, wherein both the first and second groups of key-value pairs of the plurality of B-tree key-value pairs are processed by a single process thread.

7. The method of claim 1, wherein the first delta generation number and the second delta generation number are numeric numbers, and wherein the second delta generation number has a higher number than the first delta generation number.

8. The method of claim 7, further comprising discarding an overlap portion of the first group of key-value pairs of the plurality of B-tree key-value pairs by the target file system if the first group and the second group have overlap key-value pairs based, at least in part, on the second delta generation number having the higher number than the first delta generation number.

9. The method of claim 1, wherein the plurality of B-tree key-value pairs belong to a key range of a plurality of key ranges.

10. The method of claim 1, wherein the failure event is of a plurality of failure events, wherein the plurality of failure events comprise at least one of a first type of failure and a second type of failure, wherein the first type of failure comprises a system crash, and wherein the second type of failure comprises a processing thread failure.

11. The method of claim 10, wherein one processing thread is used for the file system replication involving the first type of failure, and two or more other processing threads are used for the file system replication involving the second type of failure.

12. A non-transitory computer-readable medium storing computer-executable instructions that, when executed by one or more processors of a computing system, cause the one or more processors to perform operations comprising:

receiving, by the computing system, a request for a file system replication between a source file system and a target file system, the source file system and the target file system being in different regions;

processing, by the computing system, a plurality of binary tree (B-tree) key-value pairs that are different between two snapshots of a source file system;

generating, by the computing system, a delta generation record for each failure event during the file system replication, the delta generation record for distinguishing different generations of processed deltas and comprising at least a first delta generation number and a second delta generation number;

generating, for each failure event, a checkpoint record;

assigning, by the computing system, the first delta generation number to a first group of key-value pairs of the plurality of B-tree key-value pairs;

assigning, by the computing system, the second delta generation number to a second group of key-value pairs of the plurality of B-tree key-value pairs upon detecting a failure event during the file system replication;

generating, by the computing system, a manifest file that comprises at least the first delta generation number, the second delta generation number, and the checkpoint record;

completing, by the computing system, the file system replication based at least in part on the manifest file, such that the target file system is updated with the processed deltas associated with the second delta generation number; and discarding an overlap portion of the first group of key-value pairs of the plurality of B-tree key-value pairs by the target file system if the first group and the second group have overlap key-value pairs based, at least in part, on the second delta generation number having a higher number than the first delta generation number, wherein the first delta generation number and the second delta generation number are numeric numbers, and wherein the second delta generation number has the higher number than the first delta generation number.

13. The non-transitory computer-readable medium of claim 12, wherein the failure event is caused by a system crash.

14. The non-transitory computer-readable medium of claim 13, wherein both the first and second groups of key-value pairs of the plurality of B-tree key-value pairs are processed by a single process thread.

15. A system, comprising:

one or more processors; and one or more computer readable media storing computer-executable instructions that, when executed by the one or more processors, cause the system to:

receive a request for a file system replication between a source file system and a target file system, the source file system and the target file system being in different regions;

process a plurality of binary tree (B-tree) key-value pairs that are different between two snapshots of a source file system;

generate a delta generation record for each failure event during the file system replication, the delta generation record for distinguishing different generations of processed deltas and comprising at least a first delta generation number and a second delta generation record;

generate, for each failure event, a checkpoint record;

assign the first delta generation number to a first group of key-value pairs of the plurality of B-tree key-value pairs;

assign the second delta generation number to a second group of key-value pairs of the plurality of B-tree key-value pairs upon detecting a failure event during the file system replication;

generate a manifest file that comprises at least the first delta generation number, the second delta generation number, and the checkpoint record; and complete the file system replication based at least in part on the manifest file, such that the target file system is updated with the processed deltas associated with the second delta generation number, wherein the failure event is caused by a failure of a first processing thread; and wherein the first group of key-value pairs of the plurality of B-tree key-value pairs is processed by the first processing thread, and the second group of key-value pairs of the plurality of B-tree key-value pairs is processed by a second processing thread.

16. The system of claim 15, wherein the failure event is caused by a system crash; and wherein both the first and second groups of key-value pairs of the plurality of B-tree key-value pairs are processed by a single process thread.

17. The system of claim 15, wherein the system is further caused to discard an overlap portion of the first group of key-value pairs of the plurality of B-tree key-value pairs by the target file system if the first group and the second group have overlap key-value pairs based, at least in part, on the second delta generation number having a higher number than the first delta generation number, wherein the first delta generation number and the second delta generation number are numeric numbers, and wherein the second delta generation number has the higher number than the first delta generation number.

\* \* \* \* \*